US009081697B2

(12) United States Patent
Sakurai

(10) Patent No.: US 9,081,697 B2
(45) Date of Patent: Jul. 14, 2015

(54) STORAGE CONTROL APPARATUS AND STORAGE CONTROL METHOD

(71) Applicant: FUJITSU LIMITED, Kawasaki-shi, Kanagawa (JP)

(72) Inventor: Hiroshi Sakurai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 345 days.

(21) Appl. No.: 13/850,482

(22) Filed: Mar. 26, 2013

(65) Prior Publication Data

US 2013/0219248 A1    Aug. 22, 2013

Related U.S. Application Data

(63) Continuation of application No. PCT/JP2010/068561, filed on Oct. 21, 2010.

(51) Int. Cl.
*G06F 11/00* (2006.01)
*G06F 11/10* (2006.01)
*G06F 11/16* (2006.01)
*G06F 11/20* (2006.01)

(52) U.S. Cl.
CPC ............ *G06F 11/10* (2013.01); *G06F 11/1084* (2013.01); *G06F 11/1662* (2013.01); *G06F 11/2097* (2013.01); *G06F 2201/82* (2013.01)

(58) Field of Classification Search
CPC . G06F 11/10; G06F 11/1083; G06F 11/1662; G06F 11/1076
USPC .................. 714/5.11, 6.12, 54, 746, 769–770
See application file for complete search history.

(56) References Cited

U.S. PATENT DOCUMENTS

| 5,533,190 | A | 7/1996 | Binford et al. |
| 5,787,460 | A | 7/1998 | Yashiro et al. |
| 6,016,553 | A | 1/2000 | Schneider et al. |
| 6,931,576 | B2 * | 8/2005 | Morrison et al. ............... 714/54 |

(Continued)

FOREIGN PATENT DOCUMENTS

| JP | 6-119126 | 4/1994 |
| JP | 8-263227 | 10/1996 |
| JP | 9-190370 | 7/1997 |

(Continued)

OTHER PUBLICATIONS

PCT Preliminary Report on Patentability mailed May 16, 2013 in corresponding International Application No. PCT/JP2010/068561.

(Continued)

*Primary Examiner* — Shelly A Chase
(74) *Attorney, Agent, or Firm* — Staas & Halsey LLP

(57) ABSTRACT

A storage control apparatus receives a write request for a storage apparatus. When the storage control apparatus receives the write request, the storage control apparatus duplicates into a specific storage area, data stored in a storage area of the storage apparatus and parity data whose generation source is the data. The storage control apparatus determines whether one of the storage apparatuses is started up for which a writing process is executed in response to the write request. When the storage apparatus is re-started, the storage control apparatus writes the data duplicated in the specific storage area into the storage area of the duplication source of the storage apparatus and writes the parity data duplicated in the specific storage area into the storage area of the duplication source of the storage apparatus.

10 Claims, 27 Drawing Sheets

(56) References Cited

U.S. PATENT DOCUMENTS 7,085,953 B1 *  8/2006  Hsu et al. .................. 714/5.11
8,286,029 B2 * 10/2012  Anderson et al. ............ 714/6.32

FOREIGN PATENT DOCUMENTS

| JP | 11-95933 | 4/1999 |
|---|---|---|
| JP | 2004-504645 | 2/2004 |
| JP | 2005-78430 | 3/2005 |
| JP | 2010-26812 | 2/2010 |

OTHER PUBLICATIONS

Japanese Office Action mailed Sep. 17, 2013 in corresponding Japanese Application No. 2012-539521.

International Search Report of PCT/JP2010/068561 mailed Jan. 25, 2011.

* cited by examiner

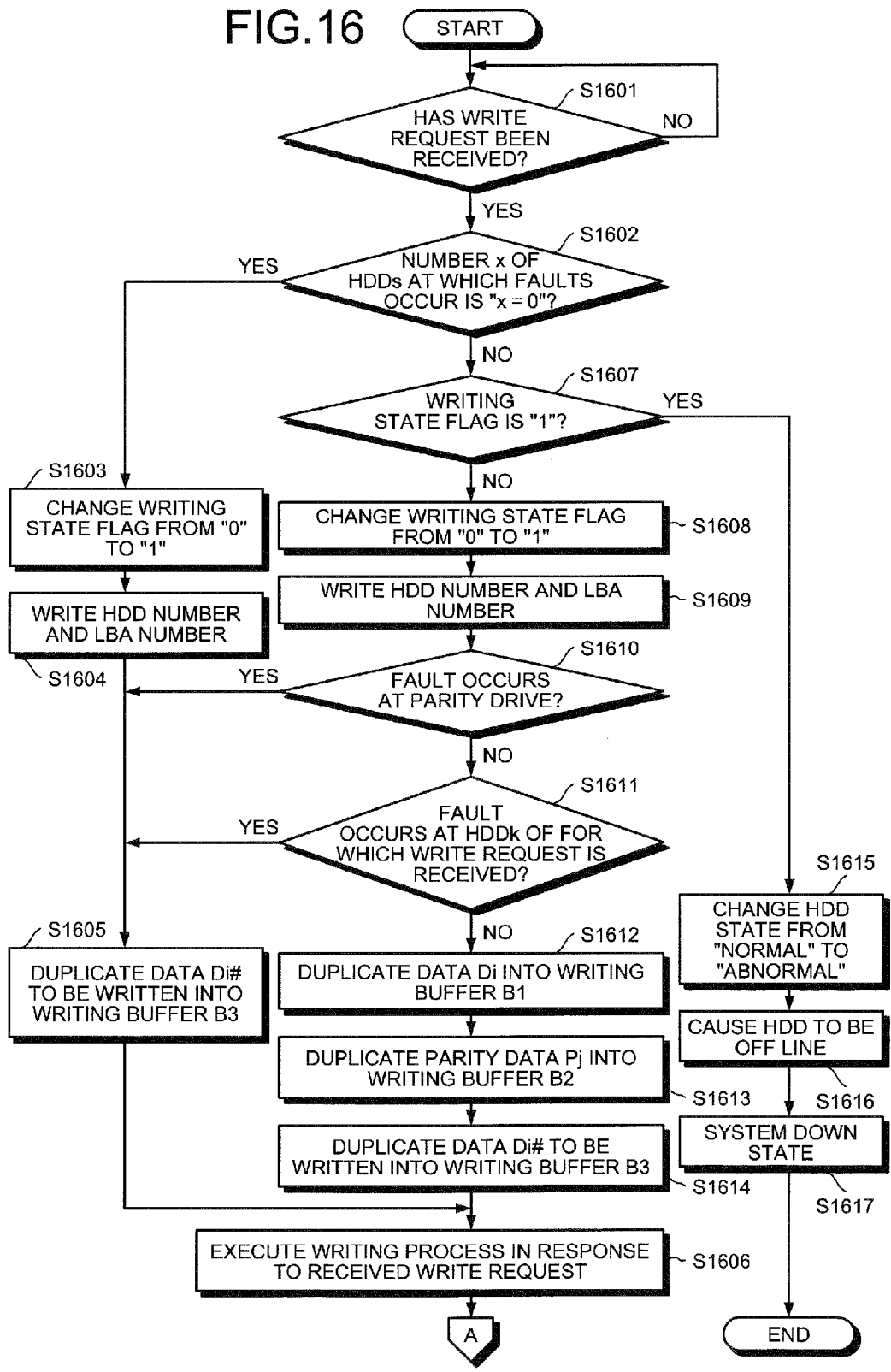

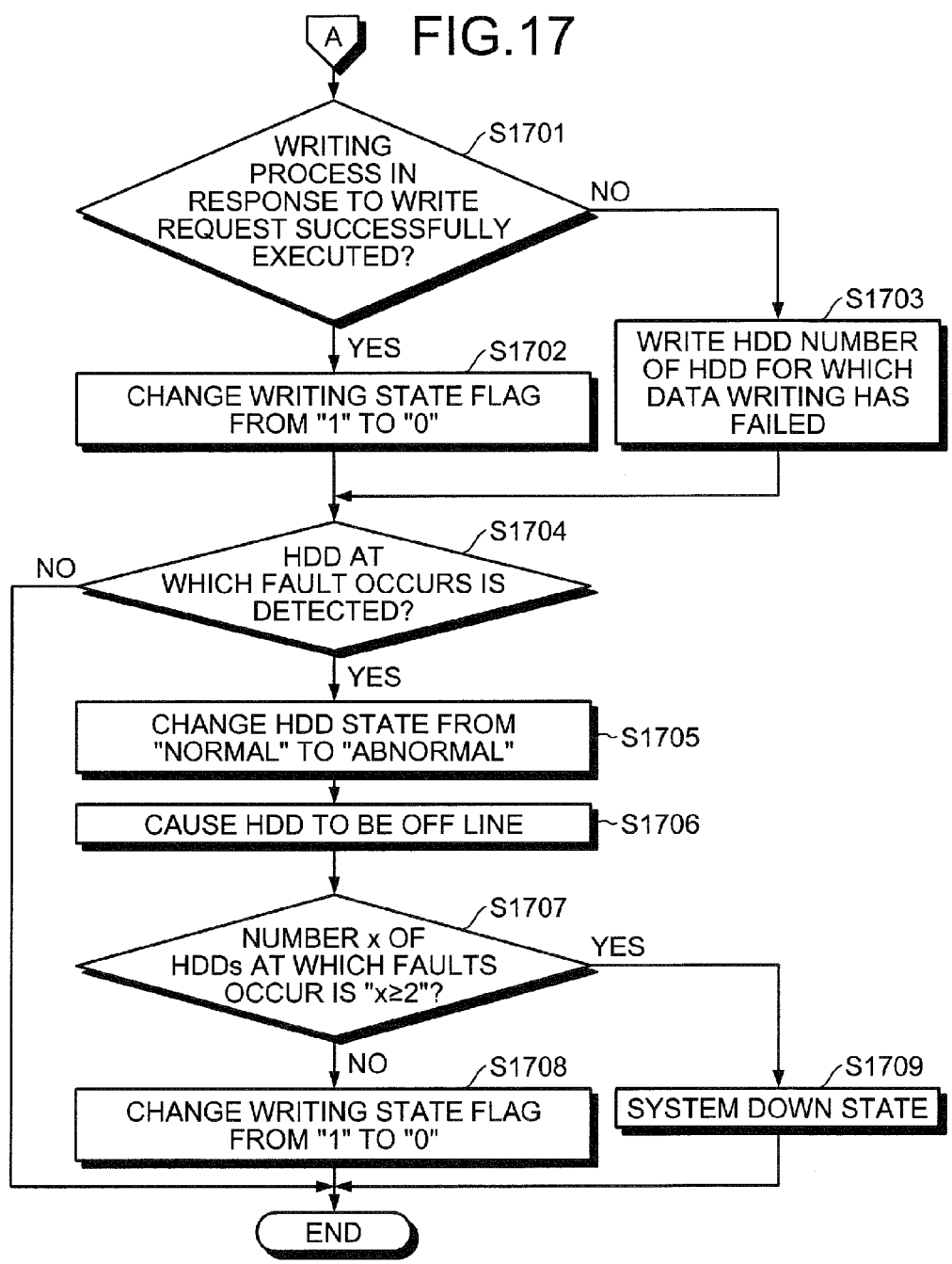

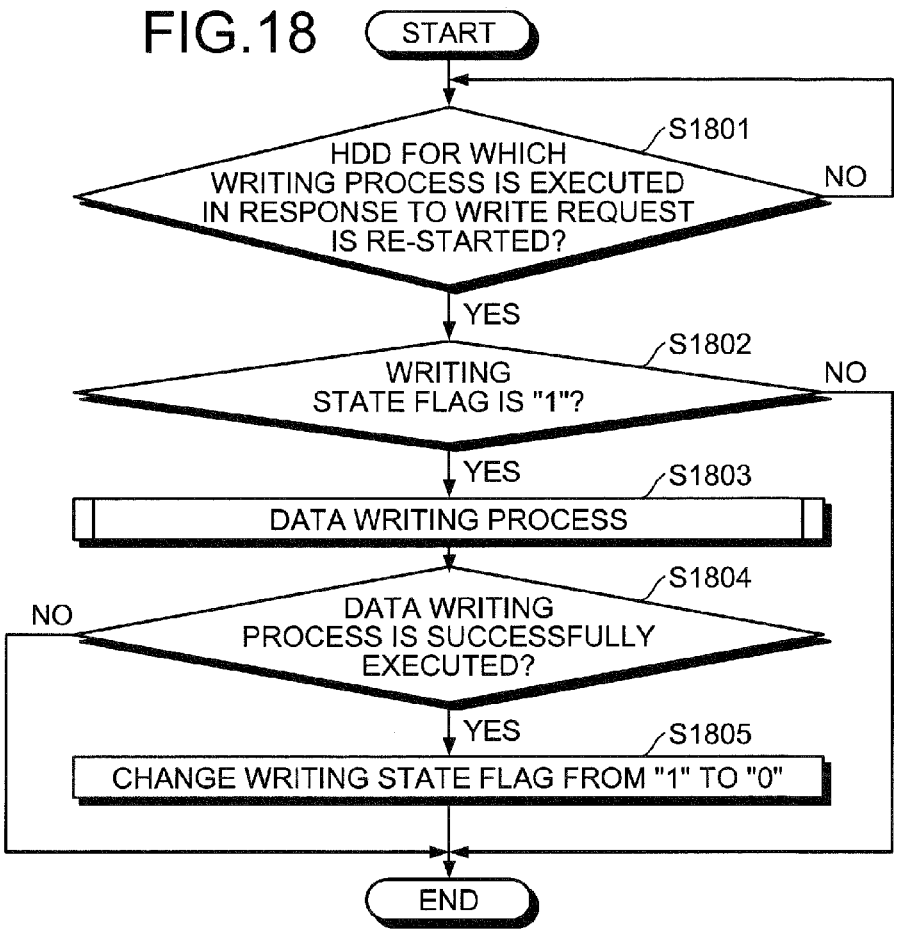
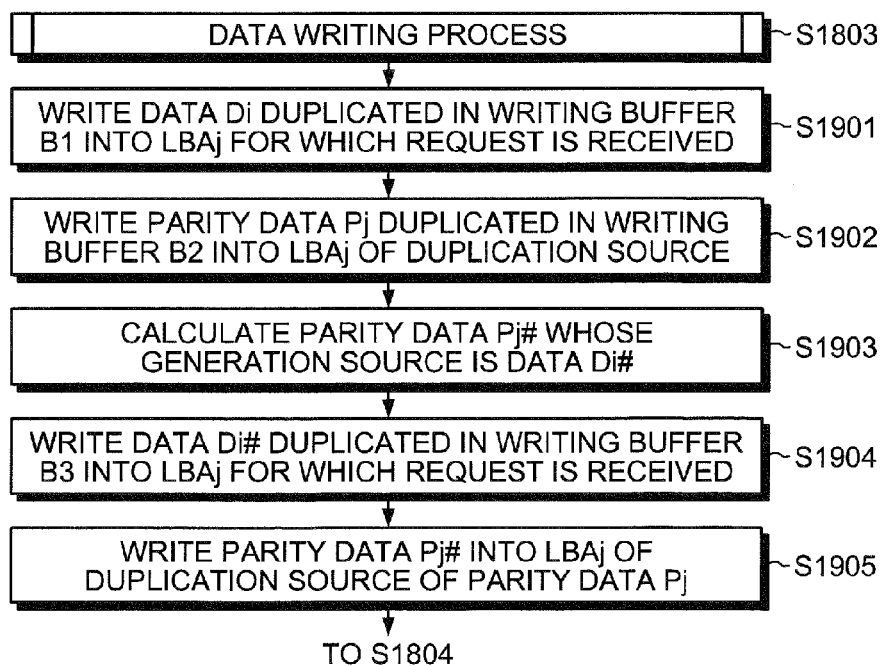

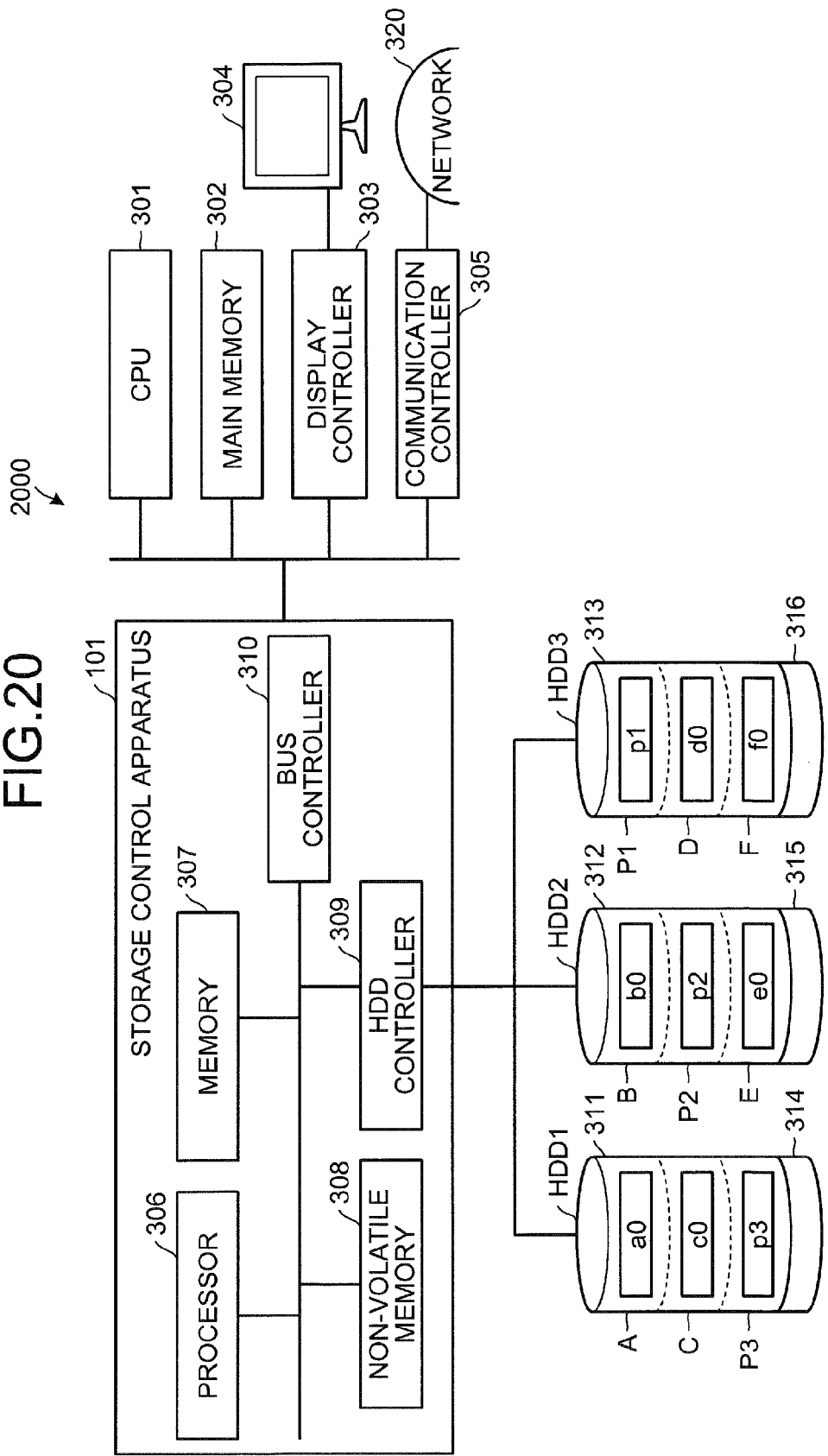

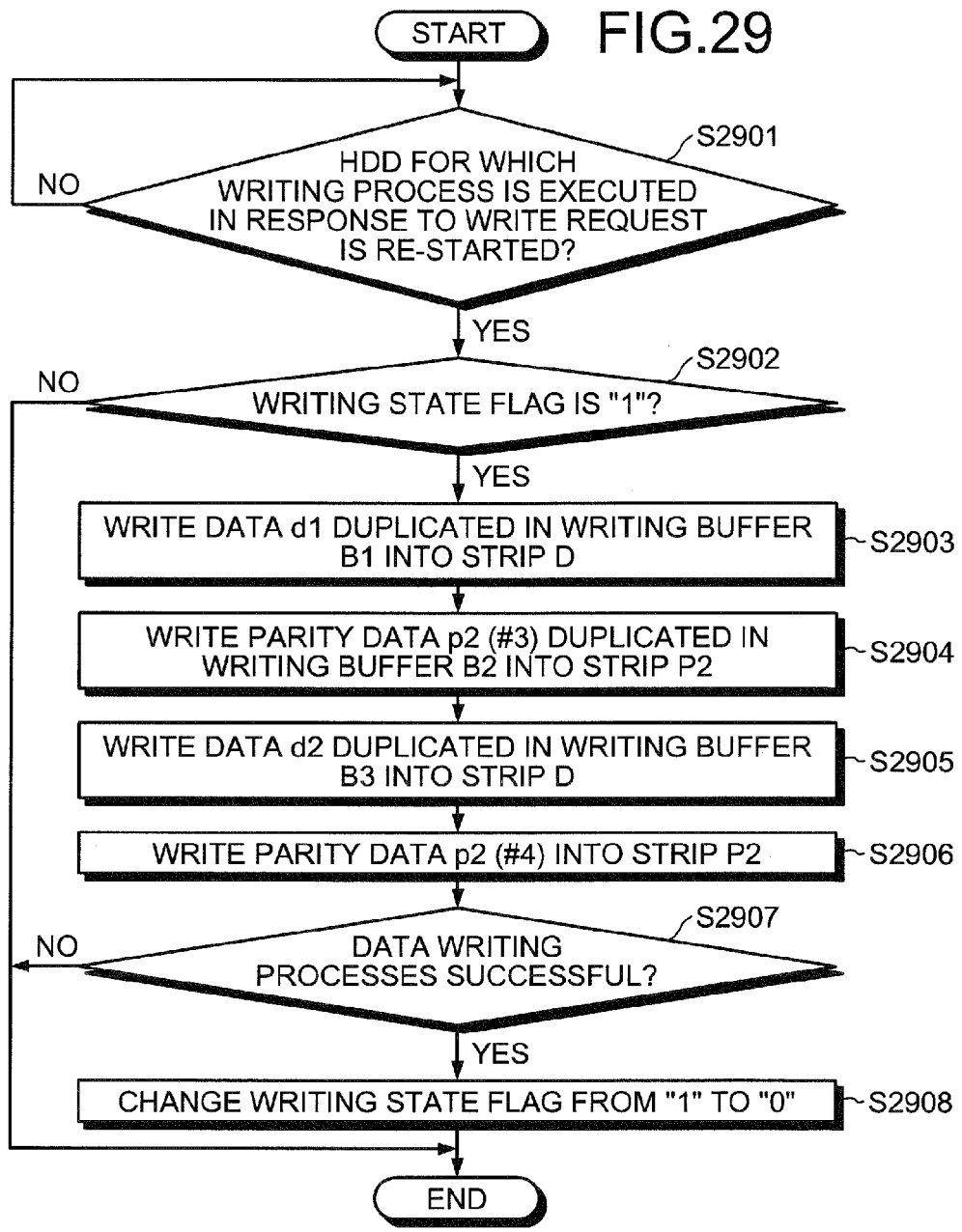

STORAGE CONTROL APPARATUS AND STORAGE CONTROL METHOD

CROSS REFERENCE TO RELATED APPLICATIONS

This application is a continuation application of International Application PCT/JP2010/068561, filed on Oct. 21, 2010 and designating the U.S., the entire contents of which are incorporated herein by reference.

FIELD

The embodiments discussed herein are related to a storage control apparatus and a storage control method that control storage apparatuses.

BACKGROUND

When a fault occurs in a disk apparatus of a redundant storage system such as a redundant array of independent disks (RAID-3, -5), the system disconnects the disk apparatus where the fault has occurred. When the storage system disconnects the disk apparatus, the storage system records and updates data using the remaining disk apparatuses excluding the disconnected disk apparatus.

If another fault subsequently occurs at another disk apparatus, the storage system disconnects the disk apparatus where the fault occurred. In the following description, this state will be referred to as a "multi-dead state" where a fault occurs at a disk apparatus in the storage system and consequently, the storage system loses its redundancy and thereafter, another disk apparatus is further disconnected.

A fault that causes the disconnection of the disk apparatus can be, for example, thermal off-tracking, contamination, noise, or poor electrical contact. The fault of a disk apparatus such as thermal off-tracking, contamination, noise, and poor electrical contact is often restored by resetting the corresponding hardware or resupplying power after suspending the power (turning off and on the power).

By executing a resetting of the hardware or by turning off and on the power for the disk apparatus that has been disconnected due to the occurrence of a fault, the disk apparatus can be restored as a disk apparatus that operates normally. Therefore, when a storage system in a multi-dead state is restored, for example, the hardware of the storage system is reset and thereby, the state is restored to the state maintained before the storage system entered the multi-dead state.

Documents disclosing techniques to restore a storage system having a disk apparatus that has failed include, for example, Japanese Laid-Open Patent Publication Nos. H11-95933, 2005-78430, and 2010-26812.

However, according to the conventional techniques, a problem arises in that, even if the state of a storage system is restored to the state maintained before the storage system entered the multi-dead state by resetting the hardware, etc. to restore the storage system, data corruption may occur due to inconsistency of data among the disk apparatuses.

SUMMARY

According to an aspect of an embodiment, a storage control apparatus includes a processor configured to receive a write request for any one among storage apparatuses in a system storing for each data group, data items of the data group and correction codes generated from the data group, the data items and correction codes being stored in different storage apparatuses; duplicate to a specific storage area and upon receiving the write request, data stored in a storage area of the storage apparatus for which the request is received and the correction code whose generation source is the data; determine, after duplicating the data and the correction code into the specific storage area, whether the storage apparatus for which a writing process is executed in response to the write request has been re-started; and write, upon determining that the storage apparatus is re-started, the data duplicated in the specific storage area into a storage area of the storage apparatus for which the request is received and write the correction code duplicated in the specific storage area into a storage area of the storage apparatus from which the correction code is duplicated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 16 and 17 are flowcharts of an example of a data duplication process procedure of the storage control apparatus according to the first embodiment;

FIG. 18 is a flowchart of an example of a system restoration process procedure of the storage control apparatus 101 according to the first embodiment;

FIG. 19 is a flowchart of the example of the specific process procedure of the data writing process at step S1803;

FIG. 20 is a block diagram of a hardware configuration of a storage system 2000 according to a second embodiment;

FIG. 29 is a flowchart of an example of the system restoration process procedure of the storage control apparatus 101.

DESCRIPTION OF EMBODIMENTS

Preferred embodiments of a storage control apparatus and a storage control method according to the present invention will be explained with reference to the accompanying drawings.

Figure 1:
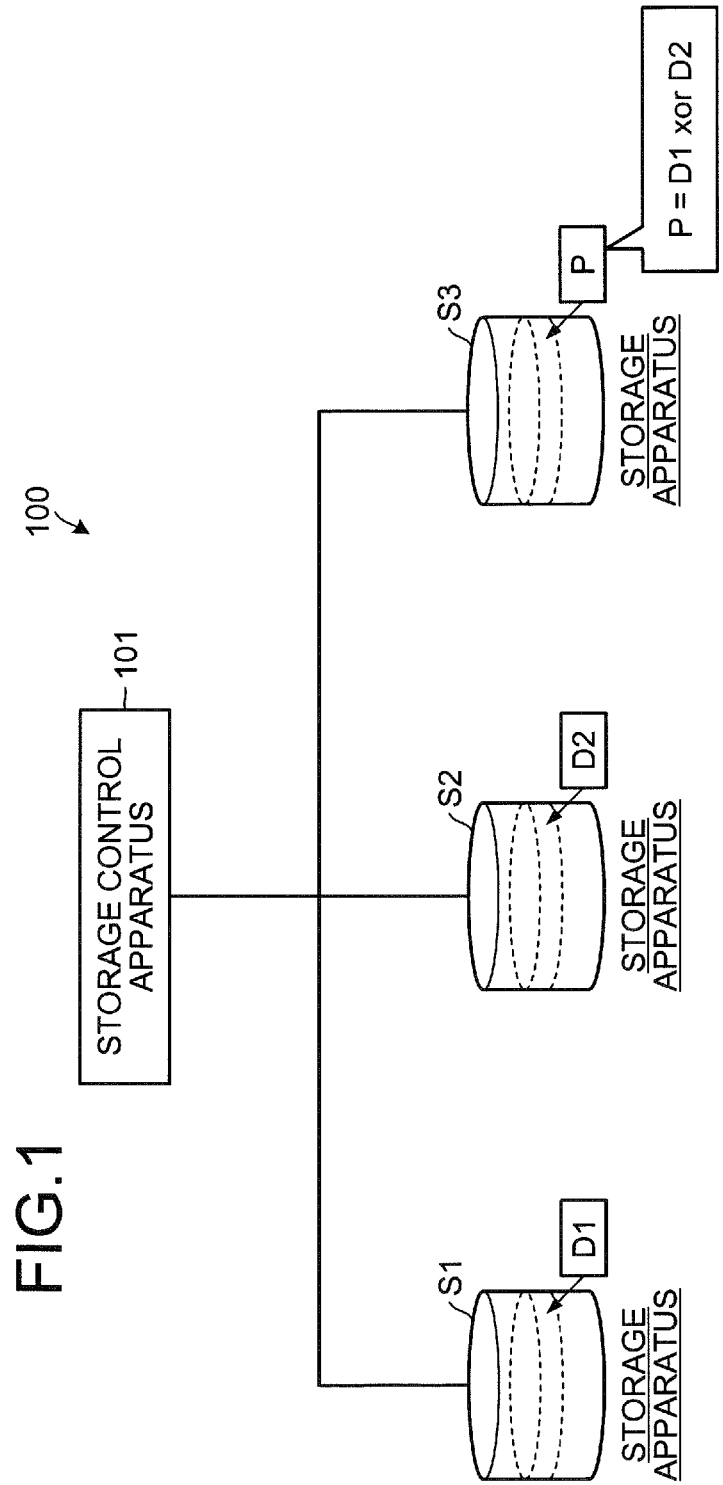
FIG. 1 is an explanatory diagram of an example of a storage system 100 according to a first embodiment.

FIG. 1 is an explanatory diagram of an example of a storage system 100 according to a first embodiment. In FIG. 1, the storage system 100 includes a storage control apparatus 101 and storage apparatuses S1 to S3. The storage control apparatus 101 is a computer that controls the storage apparatuses S1 to S3. The storage apparatuses S1 to S3 are storage devices that each store data. The storage apparatuses S1 to S3 each include a storage medium such as, for example, a hard disk, an optical disk, a flash memory or a magnetic tape.

The storage system 100 is a redundant system such as a RAID-3, or a RAID-5 system. The storage system 100 has, for each data group, data items of the data group and correction codes each generated from the data items of the data group stored in the storage apparatus distributing the data groups each to be stored in the storage apparatus different from that of each other. The "data group" is a set of the data items that are mutually related to each other. The "data item" is data in, for example bits, bytes, or blocks (sectors).

The "correction code" is redundant code having a generation source that is a data item constituting the data group. Correction code can be used as correction code that can restore any one data item of the data group that is the generation source of the correction code, together with the rest of the data items of the data group. For example, the correction code is realized by using parity, a Hamming code, an error correcting code (ECC), a cyclic redundancy check (CRC) code, etc. In the following description, description will be made taking an example of parity data formed by taking an exclusive OR of the data item constituting the data group that is the generation source, as an example of the correction code.

In the example of FIG. 1, data items D1 and D2 and parity data P generated from the data items D1 and D2 are stored in the storage apparatuses, distributed to be stored in the storage destination storage apparatus that is different from that of each other. The parity data P is data formed by taking the exclusive OR of the data items D1 and D2. In the following description, for example, the parity data P formed by taking the exclusive OR of the data items D1 and D2 and is expressed as Eq. (1) below where "xor" represents an exclusive OR.

$$P = D1 \text{ xor } D2 \quad (1)$$

The storage system 100 disconnects a storage apparatus at which a fault occurs. The expression "to disconnect a storage apparatus at which a fault occurs" means to discontinue accessing the storage apparatus. As a result, the storage system 100 changes from a redundant configuration to a non-redundant configuration. The "redundant configuration" refers to a state where the redundancy of the data is assured. The "non-redundant configuration" refers to a state where the redundancy of the data is lost from the redundant configuration due to the disconnection of a storage apparatus to which a fault has occurred.

Even when the storage system 100 changes from the redundant configuration to the non-redundant configuration, the storage system 100 can restore the data stored in the storage apparatus that is disconnected due to the occurrence of the fault (lost data) using the parity data and the data items stored in the other storage apparatuses. Therefore, the storage system 100 can continuously operate even when the storage system 100 changes from the redundant configuration to the non-redundant configuration.

For example, when a fault occurs at the storage apparatus S2, the storage system 100 changes from the redundant configuration to the non-redundant configuration and the data D2 can not be read from the storage apparatus S2. In this case, the storage system 100 restores the data D2 by taking the exclusive OR of the data D1 stored in the storage apparatus S1 and the parity data P stored in the storage apparatus S3 and is expressed as Eq. (2) below.

$$D2 = D1 \text{ xor } P = D1 \text{ xor } D1 \text{ xor } D2 \quad (2)$$

When the storage system 100 changes from the non-redundant state to a state where a storage apparatus is further disconnected (the multi-dead state), the storage system 100 changes to a "system down" state because the storage system 100 can not restore the lost data. The "system down" state refers to a state where the reading process and the writing process of data can not be executed normally.

An example of the writing process of data will be described. The case will be described where the data D1 stored in the storage apparatus S1 is updated to data D1# in the storage system 100 that is in the non-redundant configuration after the storage apparatus S2 is disconnected.

For example, the storage control apparatus 101 reads the data D1 from the storage apparatus S1. The storage control apparatus 101 reads the parity data P from the storage apparatus S3. The storage control apparatus 101 calculates the data D2 by taking the exclusive OR of the data D1 and the parity data P read from the storage apparatuses. Thereby, the data D2 is restored to that which is stored in the storage apparatus S2 disconnected from the storage system 100.

The storage control apparatus 101 calculates new parity data P# by taking the exclusive OR of the data D1# to be written and the calculated data D2 (P#=D1#xorD2). The storage control apparatus 101 writes the data D1# into the storage apparatus S1. The storage control apparatus 101 writes the parity data P# into the storage apparatus S3.

In this manner, when the storage system 100 updates the data D1 to the data D1#, the storage system 100 restores the lost data (the data D2 in the example), assuring the consistency of the data between the storage apparatuses, and simultaneously executes the updating of the parity data.

The writing of data into the storage apparatus may fail due to a fault such as thermal off-tracking, contamination, noise, or poor electrical contact. For example, the following (a) to (c) are examples of the failed writing occurring when the data D1 is updated to the data D1#.

(a) A case where the writing of the data D1# into the storage apparatus S1 fails and a portion of the data D1# can not be written into the storage apparatus S1.

In this case, the data stored in the storage apparatus S1 is data Dx that is different from both the data items D1 and D1# (Dx≠D1, D1#). When the writing of the data D1# into the storage apparatus S1 has failed, the storage apparatus S1 is disconnected from the storage system 100. As a result, the storage system 100 changes from the non-redundant configuration to the multi-dead state and changes to the system down state. Therefore, the data stored in the storage apparatus S3 still remains to be the parity data P (P=D1xorD2).

(b) A case where the data D1# is successfully written into the storage apparatus S1 and thereafter, the writing of the parity data P# into the storage apparatus S3 fails, and a portion of the parity data P# can not be written into the storage apparatus S3.

In this case, the data stored in the storage apparatus S1 is the data D1#. On the other hand the data stored in the storage apparatus S3 is data Px that is different from both the parity data P and the parity data P# (Px≠P, P#). When the writing of the parity data P# into the storage apparatus S3 has failed, the storage apparatus S3 is disconnected from the storage system 100. As a result, the storage system 100 changes from the non-redundant configuration to the multi-dead state and changes to the system down state.

(c) A case where the data D1# is successfully written into the storage apparatus S1 and thereafter, the writing of the parity data P# into the storage apparatus S3 fails, and none of the parity data P# can not be written into the storage apparatus S3.

In this case, the data stored in the storage apparatus S1 is the data D1#. On the other hand the data stored in the storage apparatus S3 is the parity data P. When the writing of the parity data P# into the storage apparatus S3 has failed, the storage apparatus S3 is disconnected from the storage system 100. As a result, the storage system 100 changes from the non-redundant configuration to the multi-dead state and changes to the system down state.

As above, in any case of (a) to (c) above, the storage system 100 changes from the non-redundant configuration to the multi-dead state due to a writing failure and changes to the system down state. A fault of the storage apparatus such as thermal off-tracking, contamination, noise, or poor electrical contact can often be restored by resetting the hardware of the storage apparatus or, by turning off and on of the power.

Therefore, the non-redundant configuration of the storage system 100 maintained immediately before the storage system 100 changes to the system down state, can be restored by resetting the hardware of the storage apparatus (the storage apparatus S1 or S3) disconnected due to the failure in the writing or, by turning off and on of the power of the disconnected storage apparatus. However, in any case of (a) to (c) above, even if the non-redundant configuration of the storage system 100 maintained immediately before the storage system 100 changes to the system down state can be restored, the consistency of the data is not established between the storage apparatuses S1 and S3.

In (a) above, the data currently stored in the storage apparatus S1 is "Dx≠D1" and the parity data stored in the storage apparatus S3 is "P=D1xorD2" based on the data D1 stored in the storage apparatus S1. Therefore, the data D2 can not be restored even by taking the exclusive OR of the data Dx and the parity data P as expressed in Eq. (3) below.

$$D2 \neq Dx \text{ xor } P = Dx \text{ xor } D1 \text{ xor } D2 \qquad (3)$$

In (b) above, the data currently stored in the storage apparatus S1 is "D1#" and the parity data stored in the storage apparatus S3 is "Px≠P#=D1#xorD2". Therefore, the data D2 can not be restored even by taking the exclusive OR of the data D1# and the parity data Px as expressed in Eq. (4) below.

$$D2 \neq D1\# \text{ xor } Px \qquad (4)$$

In (c) above, the data currently stored in the storage apparatus S1 is "D1#" and the parity data stored in the storage apparatus S3 is "P" based on the data D1 stored in the storage apparatus S1. Therefore, the data D2 can not be restored even by taking the exclusive OR of the data D1# and the parity data P as expressed in Eq. (5) below.

$$D2 \neq D1\# \text{ xor } P = D1\# \text{ xor } D1 \text{ xor } D1 \text{ xor } D2 \qquad (5)$$

Based on the above, even when the non-redundant configuration of the storage system 100, i.e., the state where the storage apparatus S2 is disconnected is restored, which is the state maintained immediately before the storage system 100 changes to the system down state, the data D2 can not be correctly restored when the data D2 needs to be read thereafter.

In the first embodiment, when the data is updated associated with updating of the parity data, the data and the parity data maintained before the updating are saved to a specific storage area. In the first embodiment, when the storage apparatus is re-started after the failure in the writing, inconsistency of the data between the storage apparatuses due to the failure in the writing can be prevented by returning the saved data and the saved parity data to the original storage areas. An example of a storage control approach according to the first embodiment will be described with reference to FIG. 2.

Figure 2:
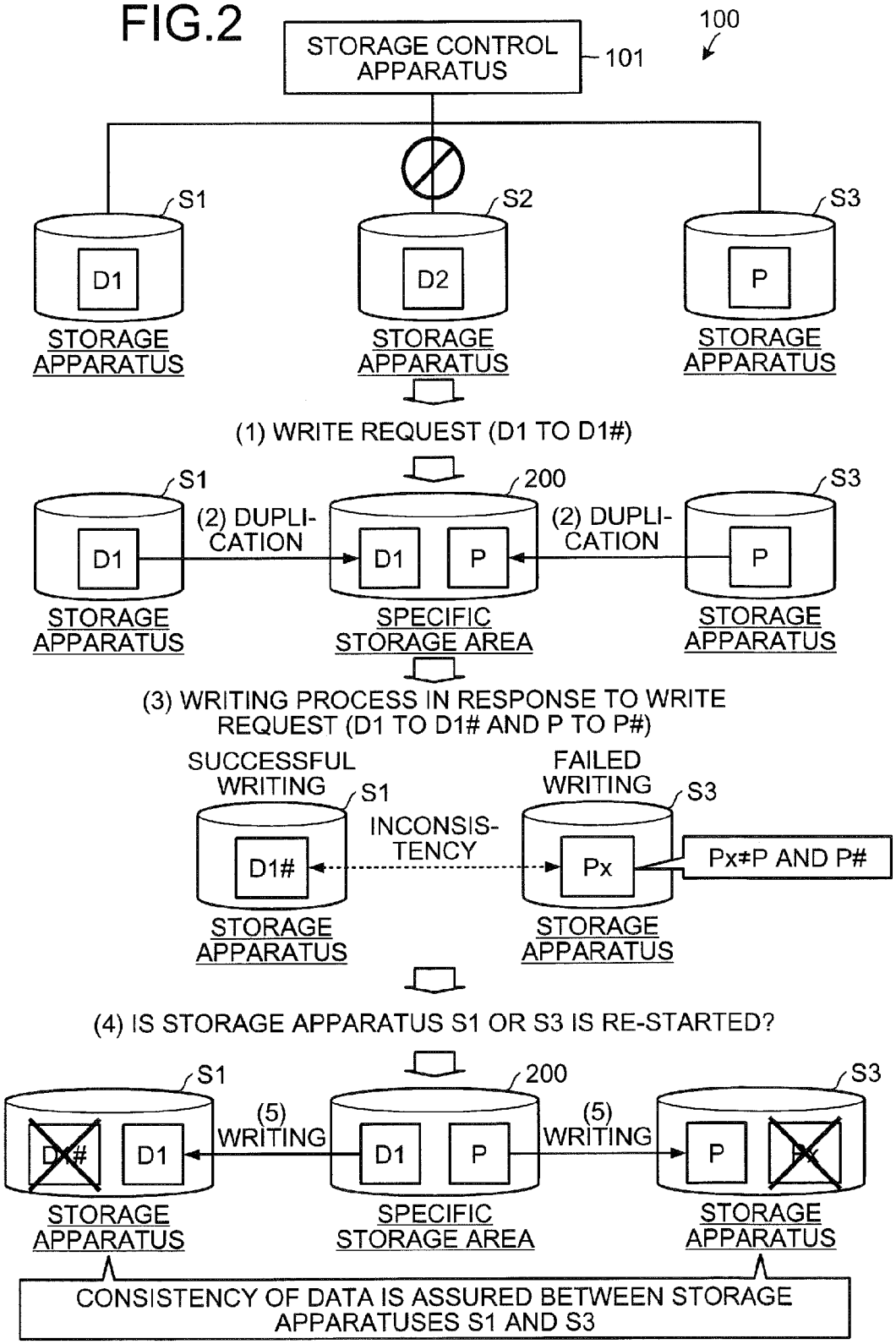
FIG. 2 is an explanatory diagram of an example of a storage control approach according to the first embodiment.

FIG. 2 is an explanatory diagram of an example of the storage control approach according to the first embodiment. In the example, description will be made taking an example of a case where the data D1 stored in the storage apparatus S1 is updated to the data D1# in the storage system 100 depicted in FIG. 1 in the non-redundant configuration in which storage apparatus S2 is disconnected.

(1) The storage control apparatus 101 receives a write request. The write request includes the data D1# to be written into the storage apparatus S1 and an address of the storage area of the storage apparatus S1 of the request destination. For example, the storage control apparatus 101 may receive the write request from an external computer or may receive the write request by an operational input by a user.

(2) When the storage control apparatus 101 receives the write request, the storage control apparatus 101 duplicates the data D1 stored in the storage area of the storage apparatus S1 that corresponds to the write request and the parity data P whose generation source is the data D1, into a specific storage area 200. For example, the storage control apparatus 101 reads the data D1 from the storage apparatus S1; writes the read data D1 into the specific storage area 200; reads the parity data P from the storage apparatus S3; and writes the read parity data P into the specific storage area 200.

The specific storage area 200 is a non-volatile storage area different from the storage areas that are the storage destinations of the data items of the data groups and the parity data generated from each of the data groups stored in the storage system 100. For example, the specific storage area 200 may be disposed in the storage control apparatus 101 or in each of the storage apparatuses S1 to S3.

(3) The storage control apparatus 101 executes a writing process in response to the received write request. For example, the storage control apparatus 101 writes the data D1# into the storage area of the storage apparatus S1; and writes the new parity data P# (P#=D1#xorD2) into the storage area that is the storage destination of the parity data P in the storage apparatus S3. For example, the storage control apparatus 101 restores the data D2 of the disconnected storage apparatus S2, from the data D1 in the storage apparatus S1 and the parity data P in the storage apparatus S3; calculates the new parity data P# from the data D1# to be written and the restored data D2; and writes the calculated new parity data P# into the storage area that is the storage destination of the parity data P in the storage apparatus S3.

When the writing into the storage apparatus S1 or S3 has failed, the storage apparatus S1 or S3 into which the wiring has failed is disconnected from the storage system 100 and the storage system 100 changes to the multi-dead state and changes to the system down state. In the example, a case is assumed where the writing of the parity data P# into the storage apparatus S3 has failed and a portion of the parity data P# can not be written into the storage apparatus S3.

In this case, the disconnected storage apparatus S3 is re-started to restore the non-redundant configuration of the storage system 100 maintained immediately before the storage system 100 changes to the system down state. In this case, a case is assumed where the storage apparatus S3 is re-started and as a result, is restored as a normally operating storage apparatus.

(4) The storage control apparatus 101 determines whether the storage apparatus disconnected in (3) is re-started. For example, the storage control apparatus 101 receives a completion notification for the re-starting up from the storage apparatus S3 and thereby, determines that the storage apparatus S3 is re-started.

(5) When the storage apparatus S1 or S3 is re-started, the storage control apparatus 101 writes the data D1 duplicated in the specific storage area 200 into the duplication source storage area in the storage apparatus S1 and writes the parity data P duplicated in the specific storage area 200 into the duplication source storage area in the storage apparatus S3.

In this manner, according to the storage control approach according to the first embodiment, when the data is updated associated with the updating of the parity data, the data and the parity data maintained before the updating are saved to the specific storage area 200. When the storage apparatus is re-started due to the failure in the writing, inconsistency of the data between the storage apparatuses due to the failure in the writing can be prevented by returning the data and the parity data saved to the specific storage area 200 to their original storage area storage areas.

In the first embodiment, assuming that recovery from a fault such as thermal off-tracking is by re-starting up the storage apparatus, the data and the parity data maintained before the updating are temporarily saved to the specific storage area 200 for each write request. Thereby, even when the writing into the storage apparatus has failed due to a fault such as thermal off-tracking, the consistency of the data between the storage apparatuses can be established by returning the saved data and the saved parity data to their original storage area storage areas after the re-starting up of the storage apparatus.

For example, when the writing of the parity data P# into the storage apparatus S3 has failed in (3) above, inconsistency of the data occurs between the storage apparatuses S1 and S3, and the data D2 in the storage apparatus S2 can not be restored. Therefore, returning the data D1 and the parity data P saved to the specific storage area 200 to their original storage area storage areas in (5) above enables prevention of the inconsistency of the data between the storage apparatuses S1 and S3 due to the failure in the writing and also enables the restoration of the data D2 using the data D1 and the parity data P that are returned.

A case will be described where the storage control apparatus 101 according to the first embodiment is applied to a RAID-3 storage system 300. The "RAID 3" is a scheme according to which a data group is distributed to and recorded in plural hard disk drives (HDDs) and the parity data generated from the data group is recorded in a dedicated HDD (what-is-called parity drive).

In an example of FIG. 3, description will be made taking an example of the case where the number of HDDs in the storage system 300 is three, that is, HDD1 to HDD3. However, the number of HDDs included in the storage system 300 is not limited to this. For the RAID-3 storage system 300, an arbitrary number can be employed as the number of HDDs when three or more HDDs including one parity drive are included therein.

Figure 3:
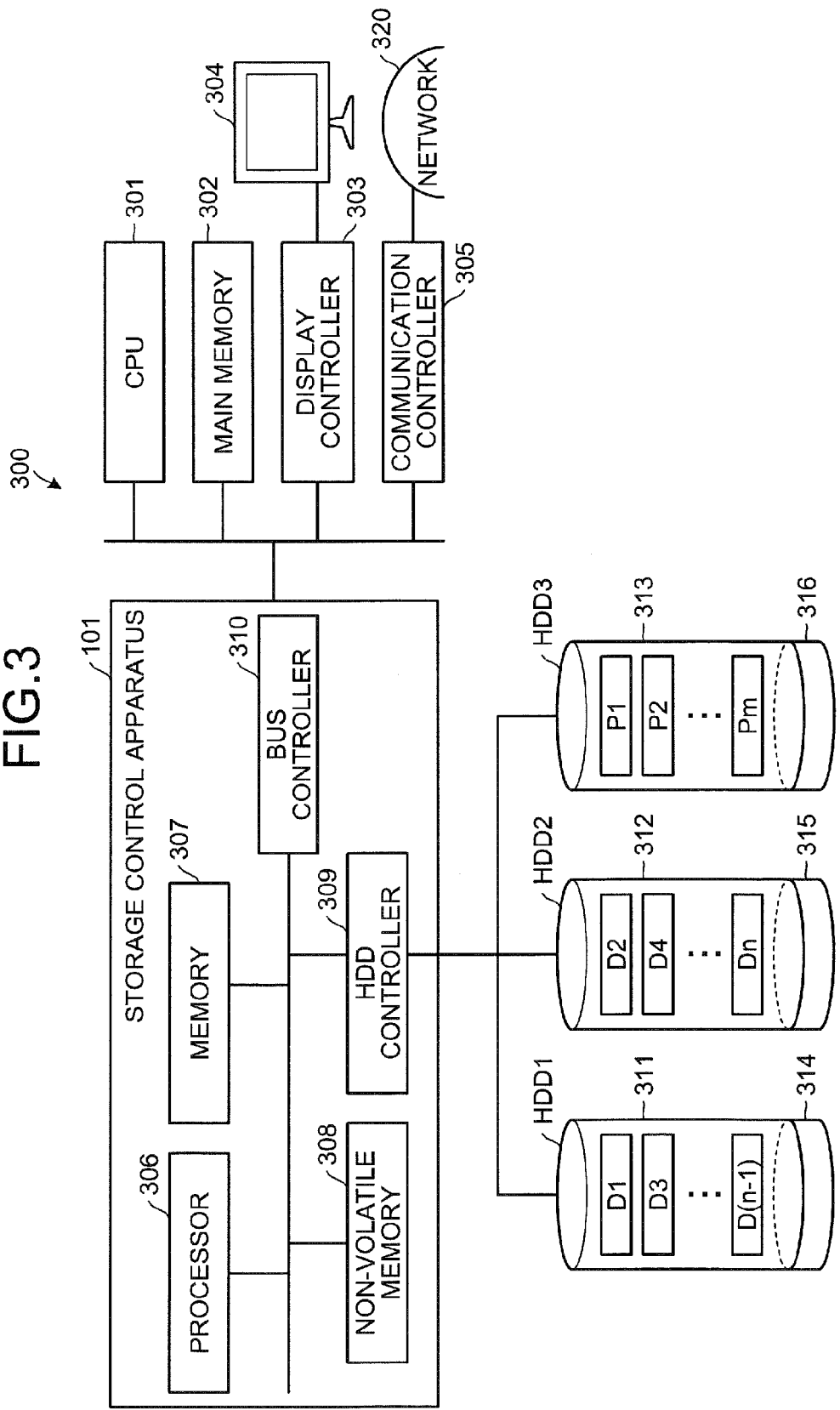
FIG. 3 is a block diagram of a hardware configuration of a storage system 300 according to the first embodiment.

FIG. 3 is a block diagram of a hardware configuration of the storage system 300 according to the first embodiment. In FIG. 3, the storage system 300 includes a central processing unit (CPU) 301, a main memory 302, a display controller 303, a display 304, a communication controller 305, the storage control apparatus 101, and the HDD1 to HDD3.

The CPU 301 generally controls the storage system 300. The main memory 302 includes a random access memory (RAM). For example, the CPU 301 expands an operating system (OS) of the storage system 300 on the main memory 302 and starts up the OS.

The display controller 303 controls the display on the display 304 under the control of the CPU 301. The display 304 displays data such as a document, an image, or a function information in addition to a cursor, an icon, or a tool box. For example, a CRT, a TFT liquid crystal display, a plasma display, etc. can be employed as the display 304.

The communication controller 305 is connected to a network 320 such as a local area network (LAN), a wide area network (WAN), or the Internet through a communication line and is connected to an external computer through the network 320. The communication controller 305 supervises the network 320 and an internal interface, and controls the input and output of data with respect to the external computer. The storage system 300 may include an input device such as a keyboard or a mouse, and an output device such as a scanner or a printer.

The storage control apparatus 101 includes a processor 306, a memory 307, a non-volatile memory 308, an HDD controller 309, and a bus controller 310. The processor 306 executes various programs such as the storage control program stored in the memory 307.

The processor 306 controls access to the HDD1 to HDD3 through the HDD controller 309, and controls the connections to the HDD1 to HDD3 through the HDD controller 309. In the following description, the expression "connection of the storage control apparatus 101 and the HDD1 to HDD3 to each other" will be referred to as "to be on line" and the expression "disconnection the storage control apparatus 101 and the HDD1 to HDD3 from each other" will be referred to as "to be off line".

The non-volatile memory 308 is a storage medium that has a property that its storage content is not erased even when the supply of the power from the power source is suspended, and is, for example, a non-volatile RAM (NVRAM), a flash memory, etc. The HDD controller 309 accesses the HDD1 to HDD3 under the control of the processor 306. The bus controller 310 controls transmission and reception of data between the storage control apparatus 101 and the CPU 301.

The HDD1 to HDD3 are each a storage device whose magnetic head reads and writes data by causing a disk applied with a magnetic material (hard disk) to rotate at a high speed.

The HDD1 to HDD3 correspond to, for example, the storage apparatuses S1 to S3. The storage areas of the HDD1 to HDD3 are divided into data areas 311, 312, and 313 and system areas 314, 315, and 316.

The capacity of each of the data areas 311 to 313 and the system areas 314 to 316 is variable within a range of the data capacity of each of the HDD1 to HDD3. The processor 306 can access each of the system areas 314 to 316 of the HDD1 to HDD3 through the HDD controller 309 irrespective of being "off line" or "on line".

In the storage system 300, the HDD1 and HDD2 are HDDs that collectively store the data items of the data group, and the HDD3 is an HDD that stores the parity data that is the exclusive OR of each data item of the data group (the parity drive). The data areas 311 and 312 of the HDD1 and HDD2 collectively store the data items D1 to Dn. The data area 313 of the HDD3 stores parity data P1 to Pm. For example, the data items D1 and D2 are collectively stored among the data areas 311 and 312 of the HDD1 and HDD2. The parity data P1 that is the exclusive OR of the data items D1 and D2 is stored in the data area 313 of the HDD3.

The term "data" is data that is one of data items formed by dividing each of the OS, application programs, user information, etc. in the storage system 300. The data size of the data is, for example, in bits or bytes. Data items of each data group and the parity data generated from this data group are managed by, for example, assigning the same logical block addressing (LBA) number thereto.

The "LBA" is a scheme of assigning serial numbers to all the sectors in a hard disk and designating a sector using the serial number thereof. An access to (reading from or writing into) each of the HDD1 to HDD3 is made for each LBA. For example, it is assumed that a LBA1 is assigned to the data items D1 and D2 and the parity data P1.

In this case, the storage area of the HDD1 storing the data D1 can be identified and accessed by designating the LBA1 of the HDD1; the storage area of the HDD2 storing the data D2 can be identified and accessed by designating the LBA1 of the HDD2; and the storage area of the HDD3 storing the parity data P1 can be identified and accessed by designating the LBA1 of the HDD3.

The system areas 314 to 316 of the HDD1 to HDD3 store, for example, the management data of the storage system 300. The management data includes, for example, information that indicates whether a fault has occurred at any one of the HDD1 to HDD3. The management data are updated by the processor 306 through the HDD controller 309. A specific example of the management data will be described.

Figure 4:
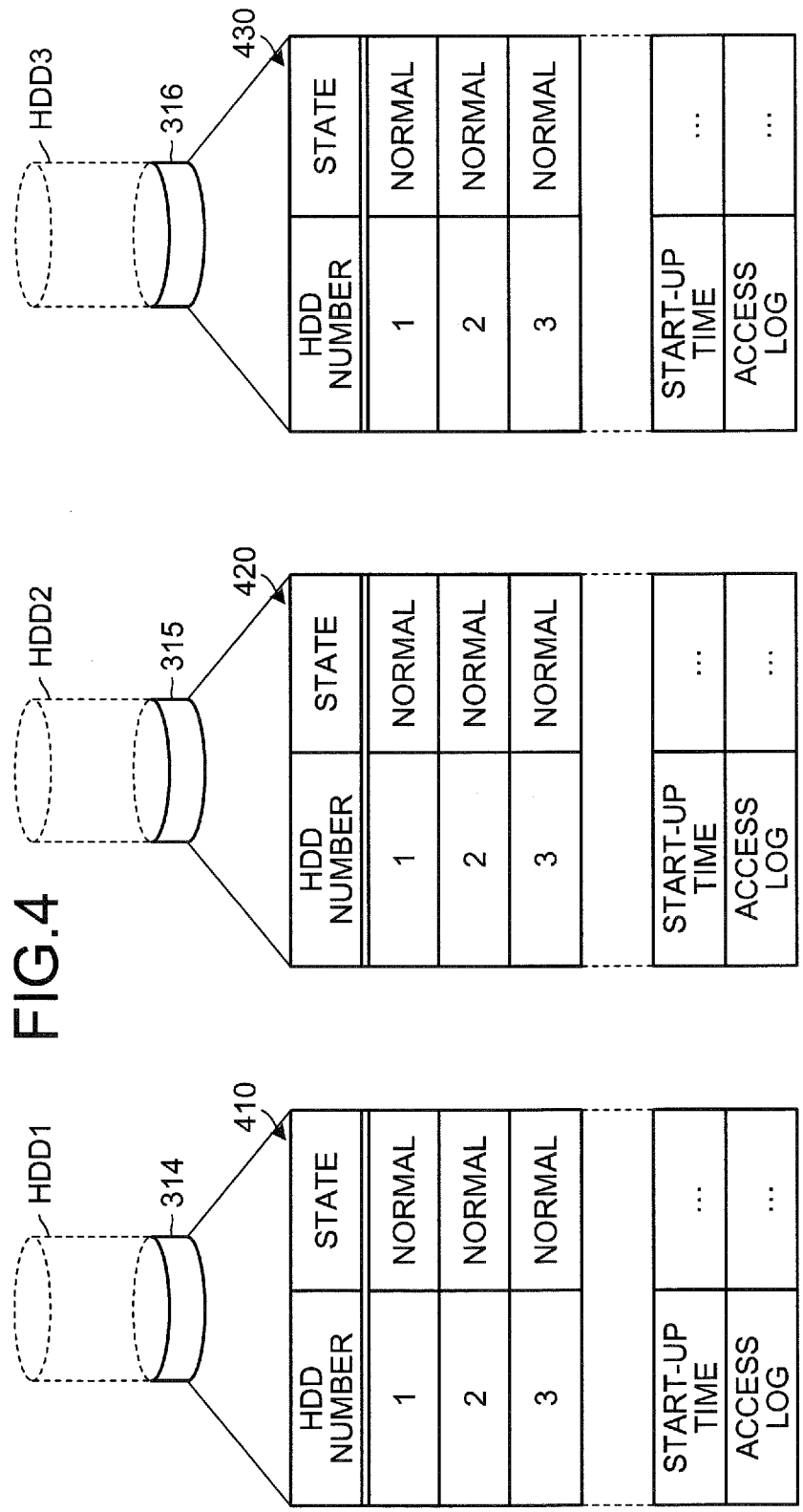
FIG. 4 is an explanatory diagram of a specific example of management data 410, 420, and 430.

FIG. 4 is an explanatory diagram of a specific example of management data 410, 420, and 430. In FIG. 4: the management data 410 is the management data stored in the system area 314 of the HDD1; the management data 420 is the management data stored in the system area 315 of the HDD2; and the management data 430 is the management data stored in the system area 316 of the HDD3.

The management data 410 to 430 each store an HDD number to identify the HDD and the state of the HDD correlating these items with each other. The state of the HDD is "normal" in the initial state and is updated from "normal" to "abnormal" when any fault occurs at the HDD. The state of the HDD is updated from "abnormal" to "normal" when the HDD is restored from the fault state.

The management data 410 and 420 respectively store the starting-up times and access logs of the HDD1 and HDD2. The access logs of the management data 410 and 420 are information that respectively include access times at which the HDD controller 309 accesses the HDD1 and HDD2 last.

The management data 430 stores the starting-up times and access logs of the HDD3. The access logs of the management data 430 are information that respectively include access times at which the HDD controller 309 accesses the HDD3 last. An HDD at while a fault has occurred can be identified by the management data 410, 420, and 430. Further, the start up times and the access times of the HDD1 to HDD3 can be identified by the management data 410, 420, and 430.

Figure 5:
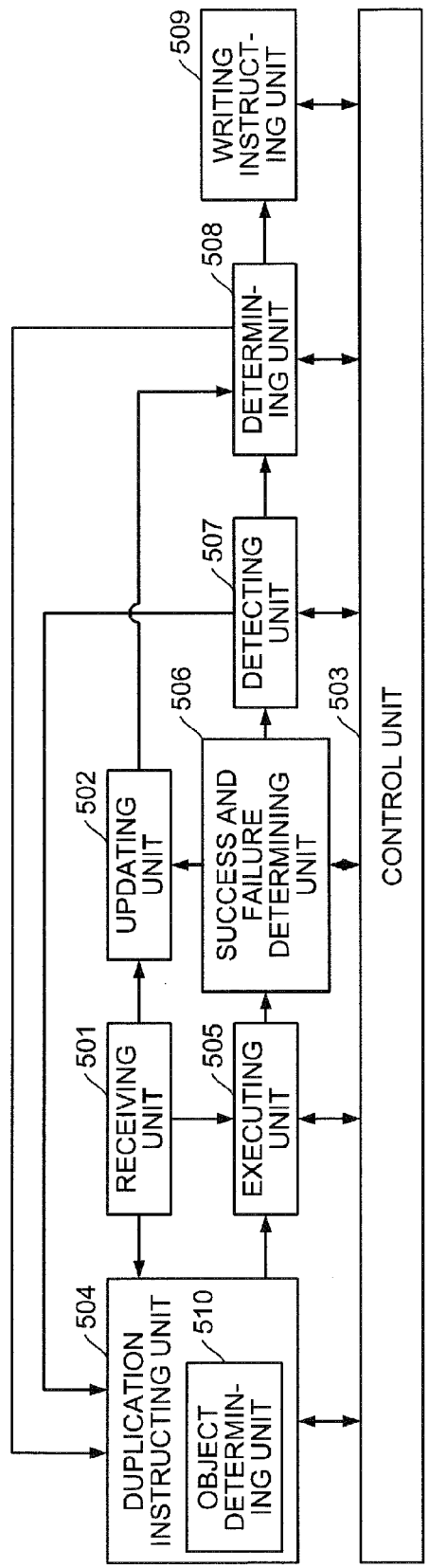
FIG. 5 is a block diagram of a functional configuration of a storage control apparatus 101 according to the first embodiment.

FIG. 5 is a block diagram of a functional configuration of the storage control apparatus 101 according to the first embodiment. In FIG. 5, the storage control apparatus 101 includes a receiving unit 501, an updating unit 502, a control unit 503, a duplication instructing unit 504, an executing unit 505, a success and failure determining unit 506, a detecting unit 507, a determining unit 508, a writing instructing unit 509, and an object determining unit 510. Functions of the functional units (the receiving unit 501 to the object determining unit 510) are implemented, for example, by causing the processor 306 to execute programs stored in the memory 307 depicted in FIG. 3, or by using the HDD controller 309 and the bus controller 310. The result of processing by each of the functional units (the receiving unit 501 to the object determining unit 510) is stored to the memory 307 unless otherwise specified.

The receiving unit 501 has a function of receiving a write request for the LBAj of the HDDk (for example, k=1, 2, and 3, and j=1, 2, ..., m). The write request includes, for example, an HDD number "k" that identifies an HDDk of the request destination, an LBA number "j" that identifies the LBAj of the request destination, and data to be written (hereinafter, referred to as "data to be written"). For example, the receiving unit 501 receives a write request from the CPU 301 through the bus controller 310. A specific example of the write request will be described later with reference to FIG. 6.

The updating unit 502 has a function of, when the receiving unit 502 receives a write request, updating writing state information used to identify whether a writing process is normally completed in response to the write request. The expression "a writing process is normally completed" means that the writing of data occurring associated with the write request is normally completed. A specific example of a writing state table storing the writing state information will be described later with reference to FIG. 7.

Figure 6:
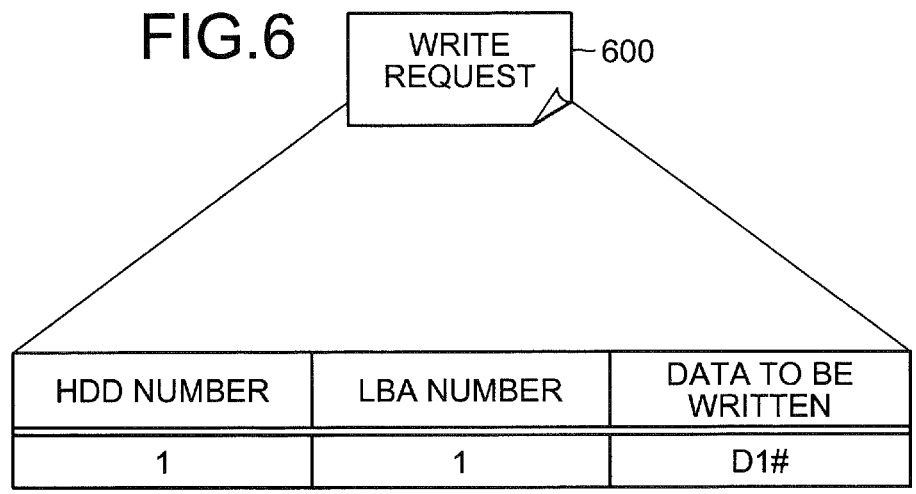
FIG. 6 is an explanatory diagram of a specific example of a write request 600.

FIG. 6 is an explanatory diagram of a specific example of a write request 600. In FIG. 6, the write request 600 includes an HDD number "1" that identifies the HDDk of the request destination, an LBA number "1" that identifies the LBAj of the request destination, and data to be written "D1#". The write request 600 of FIG. 6 is to update the data D1 of the LBA1 of the HDD1 to the data D1# to be written.

Figure 7:
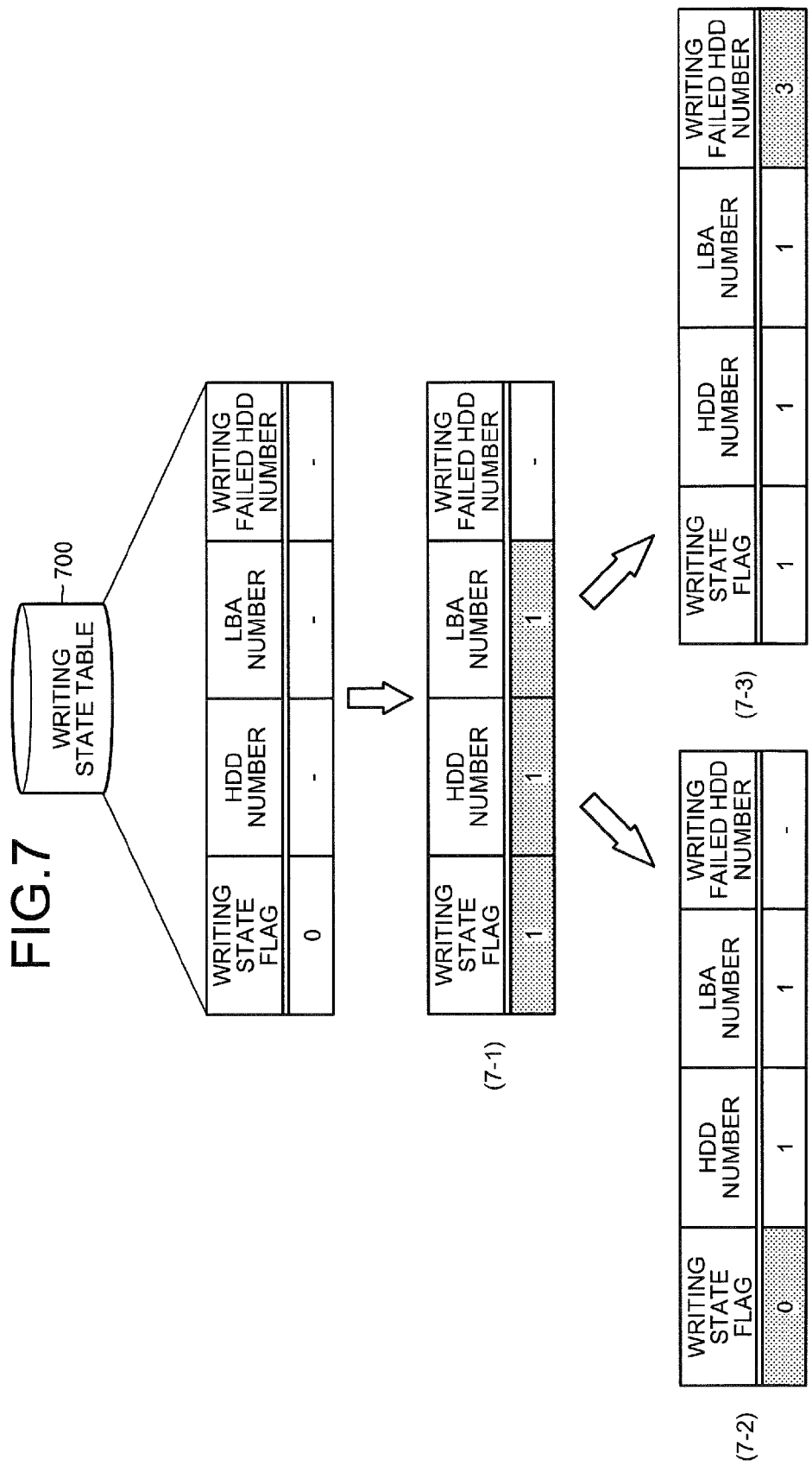
FIG. 7 is an explanatory diagram of a specific example of a writing state table 700.

FIG. 7 is an explanatory diagram of a specific example of the writing state table 700. In FIG. 7, the writing state table 700 includes fields for a writing state flag, the HDD number, the LBA number, and a writing failed HDD number. By setting information in each of the fields, the writing state information is stored in the writing state table 700 as a record.

The writing state flag is a flag that indicates whether a writing process is normally completed in response to a write request. The writing state flag represents "0" in the initial state and is changed from "0" to "1" when the write request is received, and is changed from "1" to "0" when the writing process is normally completed in response to the write request. When the writing state flag represents "1", this indicates that a writing process is currently executed in response to a write request.

The HDD number is an identifier of the HDDk of the request destination. The LBA number is an identifier of the LBAj of the request destination. The writing failed HDD number is an identifier of the HDD for which the writing of the data occurring associated with the write request has failed as the result of executing the writing process in response to the write request.

In FIG. 7, (7-1) is an example of updating of the writing state information executed when the write request 600 depicted in FIG. 6 is received. When the write request 600 is received, the updating unit 502 changes the writing state flag of the writing state table 700 from "0" to "1"; writes the HDD number "1" included in the write request 600 into the HDD number field of the writing state table 700; and also writes the LBA number "1" included in the write request 600 into the LBA number field of the writing state table 700.

According to the writing state table 700, the HDD number and the LBA number of the request destination of the received write request can be identified and it can be determined whether the writing process is successfully executed in response to the write request. The writing state table 700 is realized, for example, by the non-volatile memory 308 depicted in FIG. 3.

Returning to the description with reference to FIG. 5, the control unit 503 has a function of controlling access to the HDD1 to HDD3. For example, the control unit 503 controls access to the HDD1 to HDD3 according to instructions by the duplication instructing unit 504, the executing unit 505, and the writing instructing unit 509 described later. The control unit 503 is realized, for example, by the HDD controller 309 depicted in FIG. 3. The following description will be made taking an example of the HDD controller 309 as an example of the control unit 503.

The duplication instructing unit 504 has a function of, when the write request is received, instructing the HDD controller 309 to duplicate data Di stored in the LBAj of the HDDk of the request destination into a writing buffer B (i=1, 2, ..., n) and also has another function of, when the write request is received, instructing the HDD controller 309 to duplicate parity data Pj whose generation source is the data Di into the writing buffer B.

The writing buffer B corresponds to "the specific storage area 200" depicted in FIG. 2 and is, for example, a non-volatile storage area that is different from the data areas 311, 312, and 313 of the HDD1 to HDD3, and is disposed, for example, in each of the system areas 314 to 316 of the HDD1 to HDD3 and the non-volatile memory 308 of the storage control apparatus 101.

The following description will be made taking an example of the case where the writing buffer B is disposed in each of the system areas 314 to 316 of the HDD1 to HDD3. A specific example of the writing buffer B will be described.

Figure 8:
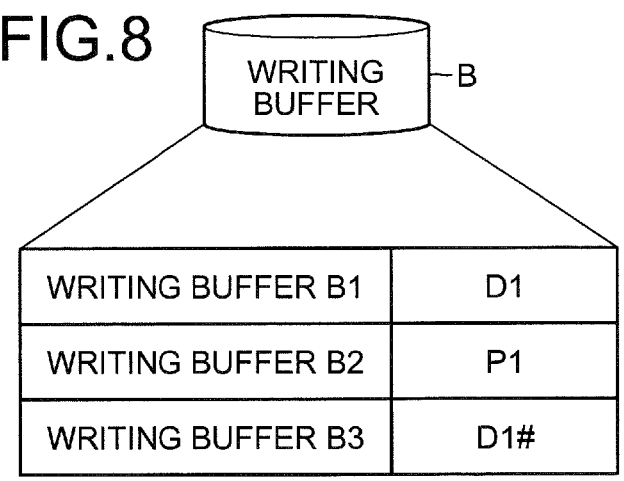
FIG. 8 is an explanatory diagram of a specific example of a writing buffer B.

FIG. 8 is an explanatory diagram of a specific example of the writing buffer B. In FIG. 8, the writing buffer B includes writing buffers B1, B2, and B3. The writing buffer B1 is a storage area to be the duplication destination of the data Di stored in the LBAj of the HDDk of the request destination of the received write request.

The writing buffer B2 is a storage area to be the duplication destination of the parity data Pj whose generation source is the data Di stored in the LBAj of the HDDk of the request destination of the received write request. The writing buffer B3 is a storage area to be the duplication destination of the data to be written included in the write request (hereinafter, referred to as "data Di# to be written"). The writing buffer B3 will be described later in detail.

For example, when the write request 600 is received, the duplication instructing unit 504 instructs the HDD controller 309 to duplicate the data D1 stored in the LBA1 of the HDD1 into the writing buffer B1. As a result, the HDD controller 309 reads the data D1 stored in the LBA1 of the HDD1 and writes the data D1 into the writing buffer B1 of each of the HDD1 to HDD3. Thereby, the data D1 stored in the LBA1 of the HDD1 is duplicated into the writing buffer B1 of each of the HDD1 to HDD3.

When the write request 600 is received, the duplication instructing unit 504 instructs the HDD controller 309 to duplicate the parity data P1 whose generation source is the data D1 stored in the LBA1 of the HDD1 into the writing buffer B2. As a result, the HDD controller 309 reads the parity data P1 stored in the LBA1 of the HDD3 and write the parity data P1 into the writing buffer B2 of each of the HDD1 to HDD3. Thereby, the parity data P1 is duplicated into the writing buffer B2 of each of the HDD1 to HDD3.

When multiple parity data are present whose generation sources are each the data Di, the duplication instructing unit 504 instructs the HDD controller 309 to duplicate the parity data whose generation sources are each the data Di into the writing buffer B. For example, for a RAID-6 storage system, two kinds of parity data are present and therefore, the duplication instructing unit 504 instructs the HDD controller 309 to duplicate the two kinds of parity data whose generation sources are each the data Di into the writing buffer B.

For simplicity of the description, unless otherwise indicated, the expression "to instruct the HDD controller 309 to read or write data and the data is read or written" will be expressed as "the data is read or written through the HDD controller 309".

Returning to the description with reference to FIG. 5, the executing unit 505 has a function of executing the writing process in response to the write request after the data Di and the parity data Pj are duplicated into the writing buffer B. Specific examples (A) to (C) of the writing process in response to the write request executed by the executing unit 505 will be described. However, the description will be made taking examples of the cases where the writing processes are each successfully executed in response to the write request.

(A) Writing Process Executed in Redundant Configuration

A writing process will first be described that is executed in the redundant configuration in response to the write request 600 (a process that needs writing of data D1# to be written, into the storage apparatus S1). For example, the executing unit 505 first reads the data D2 (that does not need to be written) stored in the LBA1 of the HDD2 through the HDD controller 309 and calculates the new parity data P1# by taking the exclusive OR of the data D1# included in the write request 600 and the read data D2 (P1#=D1#xorD2).

The executing unit 505 writes the data D1# to be written, into the LBA1 of the HDD1 through the HDD controller 309 and also writes the calculated parity data P1# into the LBA1 of the HDD3 through the HDD controller 309. As a result, the data D1 in the LBA1 of the HDD1 is updated to the data D1# to be written and the parity data P1 in the LBA1 of the HDD3 is updated to the new parity data P1#.

(B) Writing Process Executed in Non-Redundant Configuration (Part I)

A writing process will be described that is executed in response to the write request 600 in the non-redundant configuration whose HDD2 is off line (a process of updating the data D1 to the data D1# to be written). For example, when the executing unit 505 receives the write request, the executing unit 505 reads the data D1 stored in the LBA1 of the HDD1 through the HDD controller 309 and the parity data P1 stored in the LBA1 of the HDD3 through the HDD controller 309.

The executing unit 505 calculates the data D2 stored in the LBA1 of the HDD2 by taking the exclusive OR of the read data D1 and the read parity data P1. Thereby, the data D2 can be restored that is stored in the LBA1 of the HDD2 that is off line. Thereafter, the executing unit 505 calculates the new parity data P1# by taking the exclusive OR of the data D1# to be written included in the write request 600 and the calculated data D2.

The executing unit 505 writes the data D1# to be written, into the LBA1 of the HDD1 through the HDD controller 309 and also writes the calculated parity data P1# into the LBA1 of the HDD3 through the HDD controller 309. As a result, the data D1 in the LBA1 of the HDD1 is updated to the data D1# to be written and the parity data P1 in the LBA1 of the HDD3 is updated to the new parity data P1#.

(C) Writing Process Executed in Non-Redundant Configuration (Part II)

A writing process will be described that is executed in the non-redundant configuration whose HDD2 is off line and that is executed in response to the write request for updating the data D2 in the LBA1 of the HDD2 to data D2# to be written. In this case, because the HDD2 is off line, updating of the parity data P1 stored in the LBA1 of the HDD3 is executed according to the following procedure.

For example, the executing unit 505 first reads the data D1 stored in the LBA1 of the HDD1 through the HDD controller 309 and thereafter, calculates the new parity data P1# by taking the exclusive OR of the read data D1 and the data D2# to be written included in the write request.

The executing unit 505 writes the calculated parity data P1# into the LBA1 of the HDD3 through the HDD controller 309. As a result, the parity data P1 in the LBA1 of the HDD3 is updated to the new parity data P1# on which the content of the updating of the data D2 (D2 to D2#) is reflected.

The receiving unit 501 has a function of receiving a read request for the LBAj of the HDDk. The read request includes, for example, the HDD number "k" that identifies the HDDk of the request destination and the LBA number "j" that identifies the LBAj of the request destination. For example, the receiving unit 501 receives the read request from the CPU 301 through the bus controller 310.

The executing unit 505 has a function of executing the reading process in response to the received read request. For example, the executing unit 505 reads the data Di stored in the LBAj of the HDDk of the request destination through the HDD controller 309. When the HDDk of the request destination is off line, the executing unit 505 restores the data Di using the parity data Pj whose generation source is the data Di stored in the LBAj of the HDDk of the request destination and the data stored in another HDD. A reading process will be described of reading the data D2 of the LBA1 of the HDD2 taking an example of the case where the HDD2 is off line.

For example, the executing unit 505 receives the read request; reads the data D1 stored in the LBA1 of the HDD1 through the HDD controller 309; also reads the parity data P1 stored in the LBA1 of the HDD3 through the HDD controller 309; and calculates the data D2 stored in the LBA1 of the HDD2 by taking the exclusive OR of the read data D1 and the read parity data P1. Thereby, the data D2 can be restored that is stored in the LBA1 of the HDD2 that is off line, and can be used as the read data.

The success and failure determining unit 506 has a function of determining whether a writing process is successfully executed in response to a write request, based on the processing result of the writing process executed in response to the write request. For example, the success and failure determining unit 506 determines that the writing process is successfully executed in response to the write request when writing of data occurring associated with the write request is wholly completed normally.

In the examples of (A) and (B), when the writing of the data D1# to be written and the parity data P1# is normally completed, the success and failure determining unit 506 determines that the writing process is successfully executed. On the other hand when the writing of at least either of the data D1# to be written and the parity data P1# is not normally completed, the success and failure determining unit 506 determines that the writing process has failed.

In the example of (C), when the writing of the parity data P1# is normally completed, the success and failure determining unit 506 determines that the writing process is successfully executed. On the other hand when the writing of the parity data P1# is not normally completed, the success and failure determining unit 506 determines that the writing process has failed.

The determination as to whether the writing of the data is normally completed is made based on, for example, the determination as to whether a CRC code of the data Di# to be written, to be written into the HDDk and a CRC code of the data actually written thereinto coincide with each other. When the CRC codes coincide with each other, the success and failure determining unit 506 determines that the writing of the data Di# to be written is normally completed. On the other hand when the CRC codes do not coincide with each other, the success and failure determining unit 506 determines that the writing of the data Di# to be written is not normally completed.

When the writing process is executed in response to the write request, the updating unit 502 updates the writing state information that is for identifying whether the writing process is normally completed in response to the write request. For example, the updating unit 502 updates the writing state table 700 depicted in FIG. 7 based on the result of the determination made by the success and failure determining unit 506.

For example, when the success and failure determining unit 506 determines that the writing process is successfully executed in response to the write request, the updating unit 502 changes the writing state flag of the writing state table 700 from "1" to "0". On the other hand when the success and failure determining unit 506 determines that the writing process executed in response to the write request has failed, the updating unit 502 writes the HDD number of the HDDk into which the writing of the data is not normally completed, into the writing failed HDD number field of the writing state table 700.

In FIG. 7, (7-2) is an example of updating of the writing state information executed when the writing process is successfully executed in response to the write request 600. For example, when the writing process is normally completed in response to the write request 600, the updating unit 502 updates the writing state flag of the writing state table 700 from "1" to "0".

In FIG. 7, (7-3) is an example of updating of the writing state information executed when the writing process executed in response to the write request 600 has failed. The description will be made taking an example of the case where the writing of the parity data P1# into the LBA1 of the HDD3 is not normally completed. In this case, the updating unit 502 writes the HDD number "3" of the HDD3 into the writing failed HDD number field of the writing state table 700.

When the writing process is successfully executed in response to the write request, the updating unit 502 may delete the data Di and the parity data Pj stored in the writing buffer B. The storage control apparatus 101 may be configured to overwrite new data Di and new parity data Pj onto the writing buffer B when the storage control apparatus 101 receives a new write request. In this case, the storage control apparatus 101 does not need to delete the data Di and the parity data Pj stored in the writing buffer B each time the writing process is successfully executed in response to the write request.

Returning to the description with reference to FIG. 5, the detecting unit 507 has a function of detecting an HDD at which a fault occurs, through the HDD controller 309. For example, the detecting unit 507 detects an HDD into which the writing of the data is not normally executed as an HDD at which a fault occurs, from the HDD1 to HDD3.

For example, when the writing of the data D1# to be written is not normally completed into the LBA1 of the HDD1 as the result of the execution of the writing process in (A) above, the detecting unit 507 detects the HDD1 as the HDD at which a fault occurs. When the writing of the parity data P1# is not normally completed into the LBA1 of the HDD3 as the result of the execution of the writing process in (A) above, the detecting unit 507 detects the HDD3 as the HDD at which a fault occurs.

For example, the detecting unit 507 refers to the writing state table 700 and detects the HDD of the HDD number set in the writing failed HDD number field as the HDD in which the fault occurs. Thereby, the detecting unit 507 can detect the HDD for which the writing of the data is not normally executed as the HDD in which the fault occurs.

The detecting unit 507 detects the HDD for which the reading of the data is not normally executed through the HDD controller 309 as the HDD at which a fault occurs. For example, when the data read from the HDD includes information that indicates a reading error, the detecting unit 507 detects the HDD as the HDD in which the fault occurs.

The detecting unit 507 may transmit a diagnosis command to each of the HDD1 to HDD3 through the HDD controller 309. The detecting unit 507 transmits the diagnosis command through the HDD controller 309 and determines whether the detecting unit 507 receives a response signal responding to the diagnosis command from each of the HDD1 to HDD3 within a predetermined time period after transmitting the diagnosis command.

For example, the detecting unit 507 transmits the diagnosis command to the HDD1 through the HDD controller 309. Thereafter, when the detecting unit 507 receives a response signal responding to the diagnosis command from the HDD1 within a predetermined time period, the detecting unit 507 detects the HDD1 as an HDD to which no fault occurs. On the other hand when the detecting unit 507 does not receive the response signal responding to the diagnosis command within the predetermined time period, the detecting unit 507 detects the HDD1 as an HDD in which the fault occurs.

When the detecting unit 507 detects an HDD in which the fault occurs, the detecting unit 507 causes the HDD in which the fault occurs at be off line (disconnected) and updates the management data 410 to 430 of the HDD1 to HDD3 depicted in FIG. 4 through the HDD controller 309. An example of the updating of the management data 410 to 430 of the HDD1 to HDD3 will be described.

Figure 9:
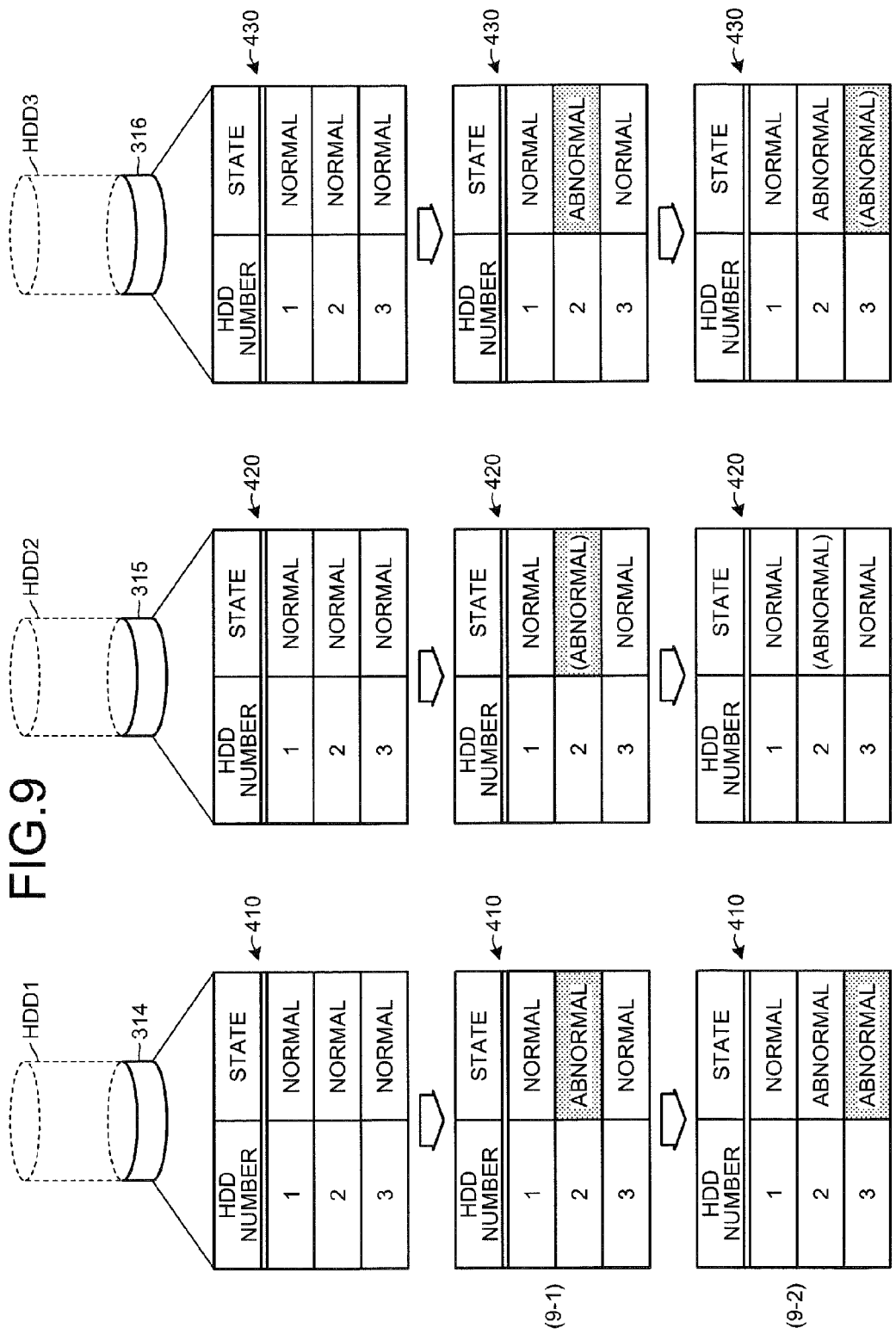
FIG. 9 is an explanatory diagram (Part I) of an example of updating of the management data 410 to 430.

FIG. 9 is an explanatory diagram (Part I) of the example of the updating of the management data 410 to 430. In FIG. 9, (9-1) is an example of the updating of the management data 410 to 430 executed when a fault occurs at the HDD2. When the detecting unit 507 detects the HDD2 at which the fault occurs, the detecting unit 507 updates the state of the HDD2 of the management data 410 from "normal" to "abnormal" through the HDD controller 309.

The detecting unit 507 updates the state of the HDD2 of the management data 420 and 430 through the HDD controller 309 from "normal" to "abnormal". According to the management data 410 to 430 of (9-1), it can be identified that the state of the HDD2 is "abnormal" of the HDD1 to HDD3.

The management data 420 is stored in the system area 315 of the HDD2 in which the fault occurs. Therefore, due to the fault of the HDD2, the HDD controller 309 may be unable to access the system area 315 of the HDD2 and may be unable to update the management data 420. The state "(abnormal)" of the HDD2 of the management data 420 depicted in (9-1) represents that the state of the HDD2 in the management data 420 is "abnormal" when the HDD controller 309 can update the management data 420.

In FIG. 9, (9-2) is an example of the updating of the management data 410 and 430 executed when another fault further occurs to the HDD3 after the fault occurs at the HDD2. When the detecting unit 507 detects the HDD3 to which the other fault occurs, the detecting unit 507 updates the state of the HDD3 of the management data 410 from "normal" to "abnormal" through the HDD controller 309.

The detecting unit 507 updates the state of the HDD3 of the management data 430 from "normal" to "abnormal" through the HDD controller 309. In this case, because the HDD2 is disconnected, the detecting unit 507 does not update the management data 420 of the HDD2 to which the fault already occurs. According to the management data 410 and 430 of (9-2), it can be identified that the states of the HDD2 and HDD3 are each "abnormal", of the HDD1 to HDD3.

The management data 430 is stored in the system area 316 of the HDD3 to which the other fault occurs. Therefore, due to the other fault of the HDD3, the HDD controller 309 may be unable to access the system area 316 of the HDD3 and may be unable to update the management data 430. The state "(abnormal)" of the HDD3 of the management data 430 depicted in (9-2) represents that the state of the HDD3 in the management data 430 becomes "abnormal" when the HDD controller 309 can update the management data 430.

Figure 10:
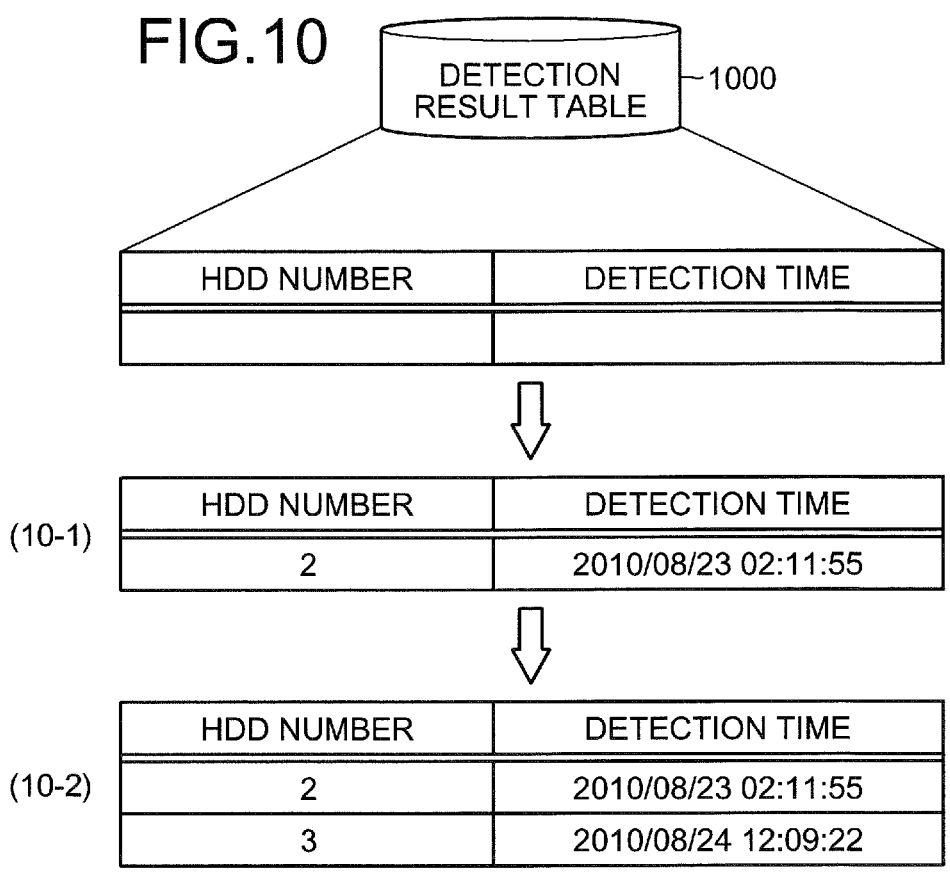
FIG. 10 is an explanatory diagram of a specific example of a detection result table 1000.

The result of the detection may be stored in a detection result table 1000 depicted in FIG. 10. The detection result table 1000 is realized, for example, by the memory 307. A specific example of the detection result table 1000 will be described.

FIG. 10 is an explanatory diagram of the specific example of the detection result table 1000. In FIG. 10, the detection result table 1000 has therein fields for the HDD number and the detection time, and the detection result is stored as a record by setting information in each of the fields. The HDD number is an identifier of an HDD at which a fault occurs. The detection time is the time at which the HDD is detected at which a fault occurs.

In FIG. 10, (10-1) is an example of updating of the detection result table 1000 executed when the HDD2 is detected as the HDD at which a fault occurs. In this case, the detecting unit 507 writes the HDD number "2" of the HDD2 into the HDD number field of the detection result table 1000 and also writes the detection time "02:11:55 on 2010/Aug/23" at which the HDD2 is detected.

In FIG. 10, (10-2) is an example of updating of the detection result table 1000 executed when the HDD3 is detected as the HDD at which a fault occurs. In this case, the detecting unit 507 writes the HDD number "3" of the HDD3 into the HDD number field of the detection result table 1000 and also writes the detection time "12:09:22 on 2010/Aug/24" at which the HDD2 is detected.

When a fault occurs at each of two or more of the HDDs in the storage system 300 (multi-dead state), the storage system 300 can not restore the data in the HDDs in which the faults occur and therefore, changes to the system down state. The determining unit 508 determines whether the storage system 300 needs to run to the system down state.

The determining unit 508 has a function of determining whether the number "x" of HDDs to which faults occur is greater than or equal to a predetermined number "X" based on the result of the detection. The predetermined number X is set to be a value such that the storage system 300 changes to the multi-dead state when a fault occurs at each of X or more HDDs therein. For example, the predetermined number X is set to be a value "X=Y+1" acquired by adding one to the number "Y" of parity drives.

Because the storage system 300 is a RAID-3 system, the number Y of parity drives is "Y=1". Therefore, the predetermined number X is "X=2". For a RAID-5 storage system (for example, a storage system 2000 described later), the number Y of parity drives is "Y=1". Therefore, the predetermined number X is "X=2". For a RAID-6 storage system, the number Y of parity drives is "Y=2". Therefore, the predetermined number X is "X=3".

For example, the determining unit 508 refers to the management data 410 to 430 of the HDD1 to HDD3 through the HDD controller 309 and identifies the numbers x1, x2, and x3 of HDDs whose states are "abnormal" of the HDD1 to HDD3.

In the example of (9-1) depicted in FIG. 9, the determining unit 508, refers to the management data 410 of the HDD1 and identifies the number x1 that is "x1=1" of HDD whose state is "abnormal" of the HDD1 to HDD3; refers to the management data 420 of the HDD2 and identifies the number x2 that is "x2=1" of HDD whose state is "abnormal" of the HDD1 to HDD3; and refers to the management data 430 of the HDD3 and identifies the number x3 that is "x3=1" of HDD whose state is "abnormal" of the HDD1 to HDD3.

The determining unit 508 identifies the largest value of the numbers x1, x2, and x3 of HDD as the number x of HDDs in which the faults occur. In the above, all the values of the number of HDD x1, x2, x3 are "one" and therefore, the number x of HDDs in which the faults occur is "x=1". Therefore, the determining unit 508 determines that the number x (x=1) of HDD in which the fault occurs is smaller than the predetermined number X (X=2).

In the example of (9-2) depicted in FIG. 9, the determining unit 508, refers to the management data 410 of the HDD1 and identifies the number x1 that is "x1=2" of HDD whose state is "abnormal" of the HDD1 to HDD3; refers to the management data 420 of the HDD2 and identifies the number x2 that is "x2=1" of HDD whose state is "abnormal" of the HDD1 to HDD3; and refers to the management data 430 of the HDD3 and identifies the number x3 that is "x3=2" of HDD whose state is "abnormal" of the HDD1 to HDD3.

The determining unit 508 identifies the largest value of the numbers x1, x2, and x3 of HDD as the number x of HDDs in which the faults occur. In the above, the values of the number of HDD x1, x3 stored in the management data 410 or the management data 430 are "two" and the maximum. Therefore, the number x of HDDs in which the faults occur is "x=2". Therefore, the determining unit 508 determines that the number x (x=2) of HDD in which the fault occurs is greater than or equal to the predetermined number X (X=2).

When the number x of HDDs in which the faults occur is greater than or equal to the predetermined number X, the determining unit 508 notifies the CPU 301 that the number x of HDDs in which the faults occur is greater than or equal to the predetermined number X. Because the storage system 300 is in the multi-dead state, the determining unit 508 demands the CPU 301 to cause the storage system 300 to run to the system down state.

When the determining unit 508 notifies the CPU 301 that the number x of HDDs in which the faults occur is greater than or equal to the predetermined number X, the CPU 301 causes the storage system 300 to run to the system down state. Because the storage system 300 is in the multi-dead state, the CPU 301 causes the storage system 300 to run to the system down state.

When the storage system 300 is restored from the system down state, for example, the configuration of the storage system 300 is returned to the non-redundant configuration maintained immediately before the storage system 300 changes to the system down state. For example, resetting of the hardware of (or turning off and on of the power of) the storage system 300 is executed by the CPU 301 or an operational input by the user.

The processor 306 identifies the order of occurrences of the faults for the plural HDDs in which the faults occur. The specific content of the process of identifying the order of the occurrences of the faults to HDDs will be described later. Thereafter, the processor 306 causes the HDDs other than the HDD in which the fault occurs last to be off line, of the plural HDDs in which the faults occur. The processor 306 causes only the HDD in which the fault occurs last to be off line, of the plural HDDs in which the faults occur.

In this case, the processor 306 updates the state of the HDD in which the fault occurs last in each of the management data 410 to 430 of the HDD1 to HDD3 through the HDD controller 309. However, the management data to be updated is the management data of the HDD that is on line. In the example depicted in (9-2) of FIG. 9, the processor 306 changes the state of the HDD3 in each of the management data 410 and 430 of the HDD1 and HDD3 that are on line from "abnormal" to "normal".

The storage system 300 is re-started by the CPU 301 or an operational input by the user. For this re-starting up, the CPU 301 may output a start-up notification for the storage system 300 to the processor 306. Thereby, the configuration of the storage system 300 can be returned to the non-redundant configuration maintained immediately before the storage system 300 changes to the system down state. The storage system 300 is re-started by the CPU 301 or the operational input by the user in this case, the processor 306 may re-start the storage system 300.

The determining unit 508 has a function of determining whether the HDDs are re-started for which the writing processes are executed in response to the write request. In this case, the HDDs for which the writing processes are executed in response to the write requests are the HDD1 and HDD3 for, for example, the writing processes of (A) and (B). The HDD for which the writing process is executed in response to the write request is the HDD3 for the writing process of (C).

For example, when the determining unit 508 receives from the CPU 301 the start-up notification for the storage system 300, the determining unit 508 determines that the HDD is re-started for which the writing process is executed in response to the write request. The determining unit 508 may determine that the HDD is re-started for which the writing process is executed in response to the write request when the determining unit 508 receives a start-up completion notification from the HDD for which the writing process is executed in response to the write request.

The writing instructing unit 509 has a function of instructing the HDD controller 309 to write the data Di duplicated in the writing buffer B into the LBA of the duplication source when the determining unit 508 determines that the HDD is re-started for which the writing process is executed in response to the write request. The "LBA of the duplication source of the data Di" is the LBAj of the HDDk of the request destination of the write request.

The writing instructing unit 509 has a function of instructing the HDD controller 309 to write the parity data Pj duplicated in the writing buffer B into the LBA of the duplication source when the determining unit 508 determines that the HDD is re-started for which the writing process is executed in response to the write request. The "LBA of the duplication source of the parity data Pj" is the LBAj that is the storage destination of the parity data Pj whose generation source is the data Di stored in the LBAj of the HDDk of the request destination.

In the example depicted in FIG. 8, the writing instructing unit 509 instructs the HDD controller 309 to write the data D1 duplicated in the writing buffer B1 into the LBA1 of the HDD1. As a result, the HDD controller 309 reads the data D1 stored in the writing buffer B1 and writes the data D1 into the LBA1 of the HDD1. In this case, for example, the HDD controller 309 reads the data D1 from an arbitrary accessible writing buffer B1 of the writing buffers B1 of the HDD1 to HDD3. Thereby, the data D1 is written back into the LBA1 of the duplication source of the HDD1.

The writing instructing unit 509 instructs the HDD controller 309 to write the parity data P1 duplicated in the writing buffer B2 into the LBA1 of the HDD3. As a result, the HDD controller 309 reads the parity data P1 stored in the writing buffer B2 and writes the parity data P1 into the LBA1 of the HDD3. In this case, for example, the HDD controller 309 reads the parity data P1 from an arbitrary accessible writing buffer B2 of the writing buffers B2 of the HDD1 to HDD3. Thereby, the parity data P1 is written back into the LBA1 of the duplication source of the HDD3. As a result, the consistency of the data can be established between the HDD1 and HDD3.

When multiple parity data are duplicated in the writing buffer B, the writing instructing unit 509 instructs the HDD controller 309 to write the multiple parity data duplicated in the writing buffer B into the LBA of the duplication source. For example, for a RAID-6 storage system, the duplication instructing unit 504 instructs the HDD controller 309 to write two kinds of parity data duplicated in the writing buffer B into the LBA of the duplication source.

An example will be described of a transition of the storage content of the LBA1 of each of the HDD1 to HDD3 occurring when the storage system 300 changes from the multi-dead state into the non-redundant configuration. The description will be made taking an example of the case where the writing process (in (B) above) is executed in response to the write request 600 in the storage system 300 in the non-redundant configuration whose HDD2 is off line.

Figure 11:
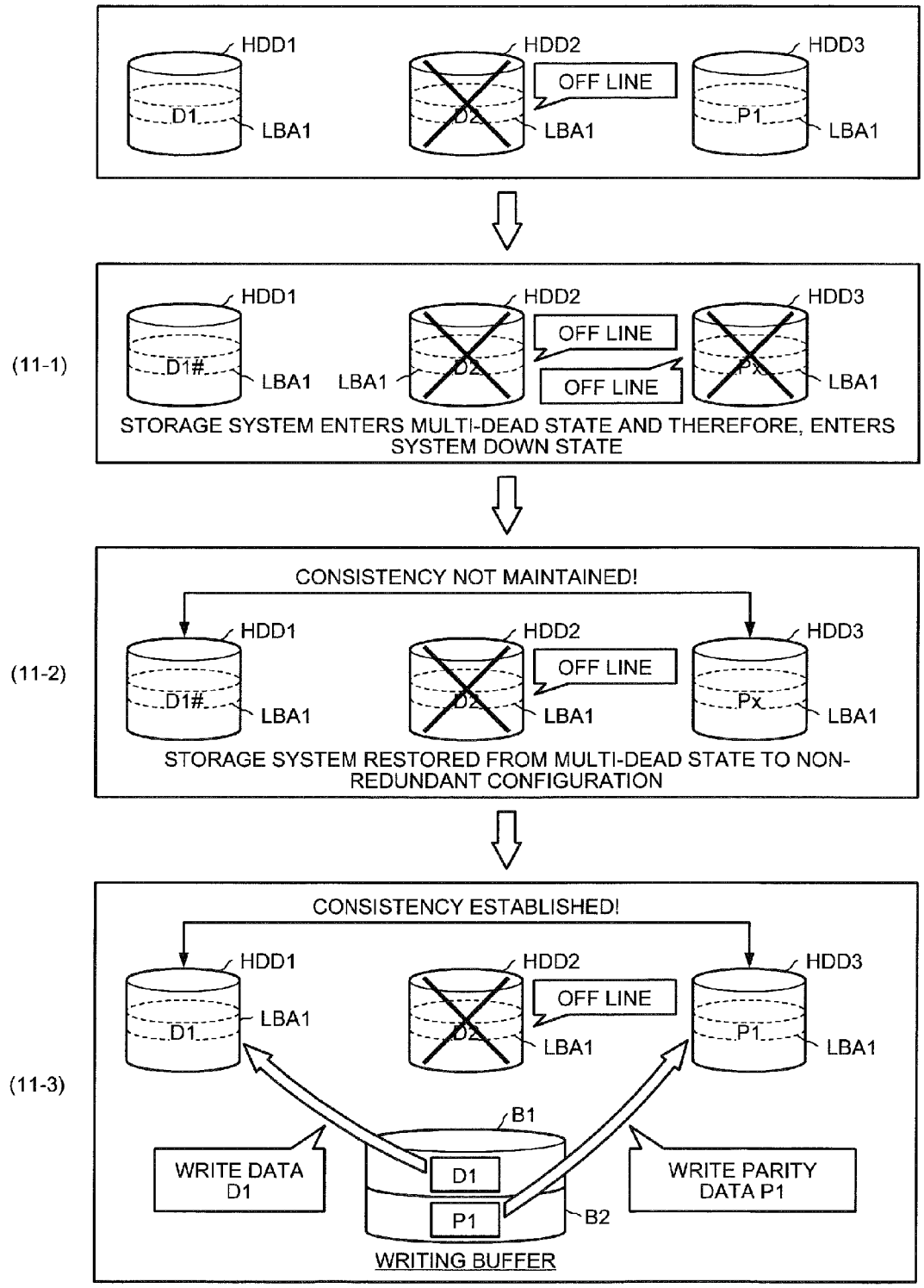
FIG. 11 is an explanatory diagram (Part I) of an example of transition of the storage content of LBA1 of each of HDD1 to HDD3.

FIG. 11 is an explanatory diagram (Part I) of an example of the transition of the storage content of the LBA1 of each of the HDD1 to HDD3. In (11-1) of FIG. 11, the writing process is executed in response to the write request 600 and as a result, the writing of the data D1# to be written is successfully executed for the LBA1 of the HDD1 and the writing of the new parity data P1# into the LBA1 of the HDD3 has failed.

For example, a portion of the parity data P1# can not be written into the LBA1 of the HDD3 and therefore, the storage content of the LBA1 of the HDD3 is the parity data Px that is different from the parity data P1#. In this case, the HDD3 is detected as the HDD in which the fault occurs and is caused to be off line. Therefore, the storage system 300 changes to the multi-dead state and changes to the system down state.

In (11-2) of FIG. 11, the hardware of the storage system 300 is reset and as a result, the HDD3 is re-started and the storage system 300 is restored from the multi-dead state to the non-redundant configuration. The parity data Px stored in the LBA1 of the HDD3 is data that is different from the original parity data P1#. Therefore, at this moment, inconsistency of the data occurs between the HDD1 and HDD3.

In (11-3) of FIG. 11, the data D1 duplicated in the writing buffer B1 is written into the LBA1 of the HDD1 and the parity data P1 duplicated in the writing buffer B2 is written into the LBA1 of the HDD3. As a result, the HDD1 and HDD3 are restored into the respective states maintained before the start of the writing process and therefore, consistency of the data is assured between the HDD1 and HDD3, and the data D2 can be restored that is stored in the LBA1 of the HDD2 that is off line.

<Writing Back Duplicated Data Di and Duplicated Parity Data Pj When Writing is Failed>

In the above, the data Di and the parity data Pj that are duplicated in the writing buffer B are written into the LBA of the duplication source when the HDD is re-started for which the writing process is executed in response to the write request. However, the manner of writing is not limited to this.

The turning off and on of the power of the storage system 300 may occur due to a momentary power failure, etc. Therefore, after the writing process is normally completed in response to the write request, the power of the storage system 300 may be turned off and on due to a momentary power failure and the storage system 300 may be re-started. In this case, when the data Di and the parity data Pj that are duplicated in the writing buffer B are written into the LBA of the duplication source after the re-starting up, the storage content of the LBA of the duplication source is returned to the storage content maintained therein before the writing process is executed in response to the write request.

Therefore, when the success and failure determining unit 506 determines that the writing process has failed and the determining unit 508 determines that the HDD is re-started, the writing instructing unit 509 may write the data Di duplicated in the writing buffer B into the LBA of the duplication source and similarly, may write the parity data Pj duplicated in the writing buffer B into the LBA of the duplication source.

For example, the writing instructing unit 509 determines whether the writing state flag of the writing state table 700 depicted in FIG. 7 is "0". When the writing instructing unit 509 determines that the writing state flag is "0", this indicates that the writing process is not yet executed and therefore, the writing instructing unit 509 does not execute the writing of the data Di and the parity data Pj duplicated in the writing buffer B into the LBA of the duplication source even when the determining unit 508 determines that the HDD is re-started.

On the other hand when the writing instructing unit 509 determines that the writing state flag of the writing state table 700 is "1" and the determining unit 508 determines that the HDD is re-started, this indicates that the HDD is re-started during the writing process and the writing process in response to the write request is not normally completed. Therefore, the writing instructing unit 509 writes the data Di and the parity data Pj duplicated in the writing buffer B into the LBA of the duplication source. Thereby, even when the HDD is re-started because of a reason such as a momentary power failure after the writing process is successfully executed in response to the write request, the writing is prevented of the data Di and the parity data Pj duplicated in the writing buffer B back into the LBA of the duplication source.

<Restoration from Multi-Dead State to Redundant Configuration>

In the above, the case has been described where, when the storage system 300 in the system down state is restored, the storage system 300 is restored to the non-redundant configuration maintained immediately before the storage system 300 changes to the system down state. However, the flow of the restoration is not limited to this.

For example, in the writing process executed in the redundant configuration of (A) above, the writing of the data D1# to be written into the HDD1 may be failed; the writing of the parity data P1# into the HDD3 may be failed; and therefore, the storage system 300 may run to the multi-dead state. In this case, when the storage system 300 in the system down state is restored, the storage system 300 may be restored from the multi-dead state to the redundant configuration.

For example, the hardware of the storage system 300 in the system down state is first reset by the CPU 301 or an operational input by the user. The storage system 300 is re-started by the CPU 301 or another operational input by the user. In this case, both of the HDD1 and HDD3 in which the faults occur are caused to be on line. Thereby, the configuration of the storage system 300 can be returned to the redundant configuration.

Thereafter, when the determining unit 508 determines that the HDD is re-started for which the writing process is executed in response to the write request, the writing instructing unit 509 writes the data Di duplicated in the writing buffer B into the LBA of the duplication source through the HDD controller 309 at the start of the writing process, and writes the parity data Pj duplicated in the writing buffer B into the LBA of the duplication source through the HDD controller 309.

An example will be described of a transition of the storage content of the LBA1 of each of the HDD1 to HDD3 occurring when the storage system 300 is restored from the multi-dead state to the redundant configuration. The description will be made taking an example of the case where the writing process (in (A) above) is executed in response to the write request 600 in the storage system 300 in the redundant configuration.

Figure 12:
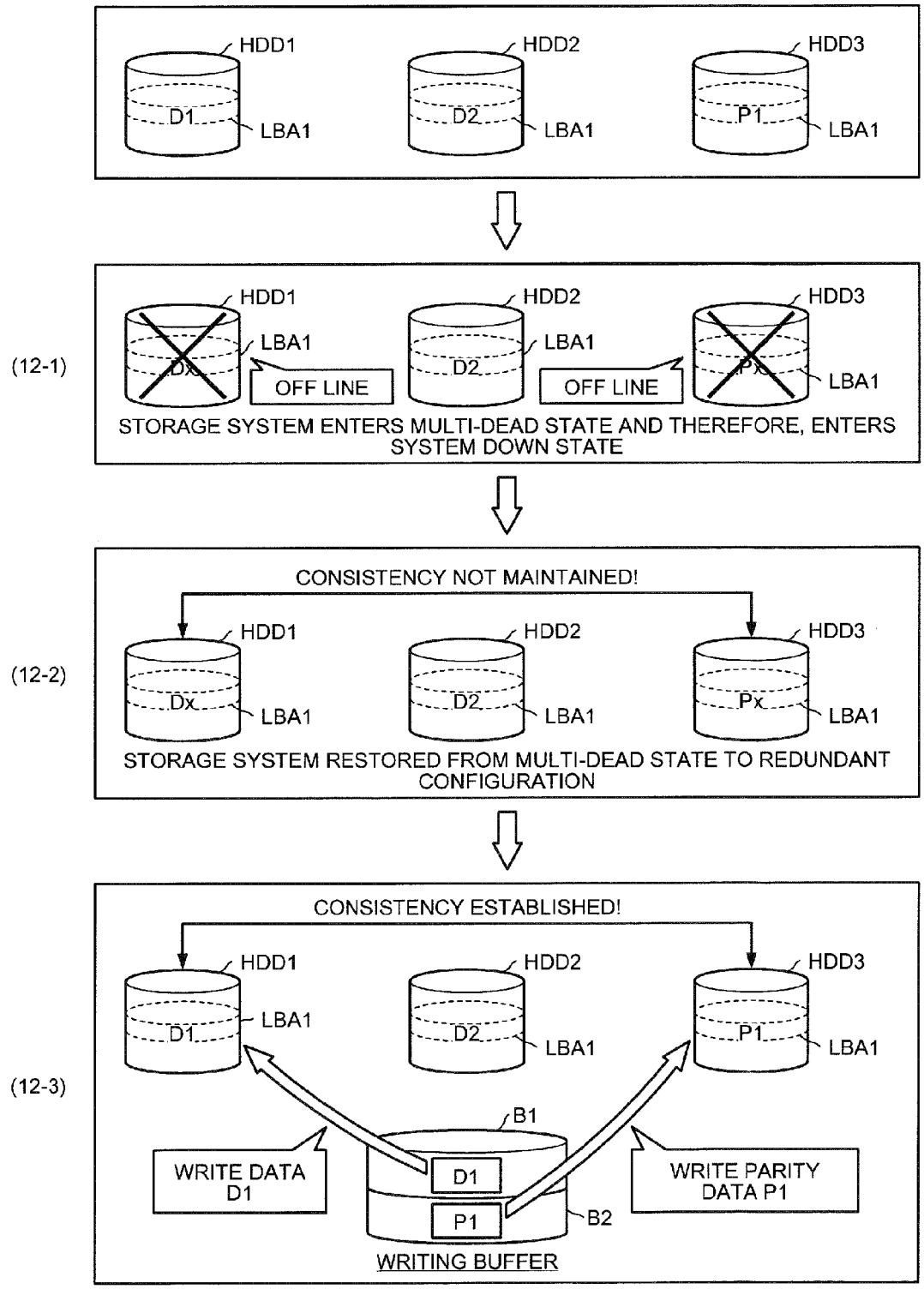
FIG. 12 is an explanatory diagram (Part II) of the example of the transition of the storage content of the LBA1 of each of the HDD1 to HDD3.

FIG. 12 is an explanatory diagram (Part II) of the example of the transition of the storage content of the LBA1 of each of the HDD1 to HDD3. In (12-1) of FIG. 12, the writing process is executed in response to the write request 600 and as a result, the writing of the data D1# to be written into the LBA1 of the HDD1 has failed and the writing of the parity data P1# into the LBA1 of the HDD3 is simultaneously failed.

For example, a portion of the data D1# to be written can not be written into the LBA1 of the HDD1 and therefore, the storage content of the LBA1 of the HDD1 is the data Dx that is different from the data D1# to be written; and a portion of the parity data P1# can not be written into the LBA1 of the HDD3 and therefore, the storage content of the LBA1 of the HDD3 is the parity data Px that is different from the parity data P1#. In this case, the HDD1 and HDD3 are detected as the HDDs in which the faults occur and are caused to be off line. Therefore, the storage system 300 changes to the multi-dead state and changes to the system down state.

In (12-2) of FIG. 12, the hardware of the storage system 300 is reset and as a result, the HDD1 and HDD3 are re-started and the storage system 300 is restored from the multi-dead state to the redundant configuration. The data Dx stored in the LBA1 of the HDD1 is data that is different from both of the data D1 and the data D1# to be written that are initially stored in the HDD1. The parity data Px stored in the LBA1 of the HDD3 is data that is different from both of the parity data P1 and the parity data P1# that are initially stored in the HDD3. Therefore, at this moment, inconsistency of the data occurs between the HDD1 and HDD3.

In (12-3) of FIG. 12, the data D1 duplicated in the writing buffer B1 at the start of the writing process is written into the LBA1 of the HDD1 and the parity data P1 duplicated in the writing buffer B2 is written into the LBA1 of the HDD3. As a result, the consistency of the data is assured between the HDD1 and HDD3. The data D2 stored in the LBA1 of the HDD2 can thereafter be restored even when the HDD2 is caused to be off line.

In the writing process executed in the redundant configuration in response to the write request, even when the writing of the data Di into the HDDk of the request destination or the parity data Pj into the parity drive has failed and the storage system 300 changes into the non-redundant configuration, the system can be operated. Therefore, even when the storage system 300 changes into the non-redundant configuration from the redundant configuration as a result of the execution of the writing process in response to the write request, the updating unit 502 changes the writing state flag of the writing state table 700 from "1" to "0".

<When HDDk of Request Destination of Write Request is Off Line>

When the data D2 of the LBA1 of the HDD2 that is off line is updated to the data D2# to be written as in (C) above, only the parity data P1 is updated that is stored in the LBA1 of the HDD3. Therefore, when a write request is issued for the HDD2 that is off line, duplication of only the parity data P1 stored in the LBA1 of the HDD3 into the writing buffer only has to be executed.

The object determining unit 510 has a function of determining whether any fault occurs at the HDDk of the request destination of the write request based on the result of the detection. For example, the object determining unit 510 determines whether the state of the HDDk of the request destination is "abnormal" by referring to the management data 410 to 430 of the HDD1 to HDD3 through the HDD controller 309.

When the state of the HDDk of the request destination is "abnormal" in any one of the management data 410 to 430, the object determining unit 510 determines that a fault occurs at the HDDk. On the other hand, when the state of the HDDk of the request destination is "normal" in all of the management data 410 to 430, the object determining unit 510 determines that no fault occurs at the HDDk.

The object determining unit 510 may determine whether any fault occurs at the HDDk of the request destination by referring to the detection result table 1000 depicted in FIG. 10. For example, the object determining unit 510 determines whether a record corresponding to the HDD number included in the write request is present in the detection result table 1000.

When the object determining unit 510 determines that a record is present that corresponds to the HDD number included in the write request, the object determining unit 510 determines that a fault occurs at the HDDk of the request destination. On the other hand when the object determining unit 510 determines that no record is present that corresponds to the HDD number included in the write request, the object determining unit 510 determines that no fault occurs at the HDDk of the request destination.

When the object determining unit 510 determines that a fault occurs at the HDDk of the request destination, the duplication instructing unit 504 duplicates the parity data Pj whose generation source is the data Di stored in the LBAj of the HDDk of the request destination, into the writing buffer B through the HDD controller 309. When the object determining unit 510 determines that a fault occurs at the HDDk of the request destination, the duplication instructing unit 504 does not duplicate the data Di stored in the LBAj of the HDDk of the request destination, into the writing buffer B.

In this case, the determining unit 508 determines whether the HDD for which the writing process is executed in response to the write request is re-started, after the parity data Pj is duplicated into the writing buffer B. For example, when the determining unit 508 determines that the HDD for which the writing process is executed in response to the write request is re-started, the writing instructing unit 509 writes the parity data Pj duplicated in the writing buffer B into the LBAj of the duplication source through the HDD controller 309.

<When Parity Drive is Off Line>

When the parity drive is off line, updating is executed of only the data Di of the LBAj of the HDDk of the request destination of the write request. Therefore, when the parity drive is off line, duplication of only the data Di stored in the LBAj of the HDDk of the request destination of the write request only has to be executed.

The object determining unit 510 has a function of determining whether any fault occurs at the HDD of the storage destination of the parity data Pj whose generation source is the data Di stored in the LBAj of the HDDk of the request destination of the write request based on the result of the detection. For example, the object determining unit 510 determines whether the state of the parity drive (the HDD3) is "abnormal" by referring to the management data 410 to 430 of the HDD1 to HDD3 through the HDD controller 309.

When the state of the parity drive is "abnormal" in at least any one of the management data 410 to 430, the object determining unit 510 determines that a fault occurs at the parity drive. On the other hand, when the state of the parity drive is "normal" in all of the management data 410 to 430, the object determining unit 510 determines that no fault occurs at the parity drive.

The object determining unit 510 may determine whether any fault occurs at the parity drive by referring to the detection result table 1000 depicted in FIG. 10. For example, the object determining unit 510 determines whether a record corresponding to the HDD number "3" of the HDD3 that is the parity drive is present in the detection result table 1000.

When the object determining unit 510 determines that a record corresponding to the HDD number "3" of the HDD3 is present, the object determining unit 510 determines that a fault occurs at the parity drive. On the other hand, when the object determining unit 510 determines that no record corresponding to the HDD number "3" of the HDD3 is present in the detection result table 1000, the object determining unit 510 determines that no fault occurs at the parity drive.

When the object determining unit 510 determines that a fault occurs at the parity drive, the duplication instructing unit 504 duplicates the data Di stored in the LBAj of the HDDk of the request destination into the writing buffer B through the HDD controller 309, and does not duplicate the parity data Pj whose generation source is the data Di stored in the LBAj of the HDDk of the request destination into the writing buffer B.

In this case, after the data Di is duplicated into the writing buffer B, the determining unit 508 determines whether the HDD is re-started for which the writing process is executed in response to the write request. For example, when the determining unit 508 determines that the HDD is re-started for which the writing process is executed in response to the write request, the writing instructing unit 509 writes the data Di duplicated in the writing buffer B into the LBAj of the HDDk of the request destination through the HDD controller 309.

<Duplication of Data Di# to be Written, into Writing Buffer B>

The duplication instructing unit 504 may duplicate the data Di# to be written included in the write request into the writing buffer B through the HDD controller 309. For example, when the write request 600 is received, the duplication instructing unit 504 duplicates the data D1 stored in the LBA1 of the HDD1 into the writing buffer B1 of each of the HDD1 to HDD3 through the HDD controller 309; duplicates the parity data P1 whose generation source is the data D1 stored in the LBA1 of the HDD1 into the writing buffer B2 of each of the HDD1 to HDD3 through the HDD controller 309; and further duplicates the data D1# to be written included in the write request 600 into the writing buffer B3 (see FIG. 8) of each of the HDD1 to HDD3 through the HDD controller 309.

In this case, after the data Di, the parity data Pj, and the data Di# to be written are duplicated into the writing buffer B, the determining unit 508 determines whether the HDD is re-started for which the writing process is executed in response to the write request. For example, after the data D1, the parity data P1, and the data D1# to be written are respectively duplicated into the writing buffers B1 to B3, the determining unit 508 determines whether the HDD is re-started for which the writing process is executed in response to the write request 600.

When the determining unit 508 determines that the HDD is re-started, the writing instructing unit 509 writes the data Di duplicated in the writing buffer B into the LBAj of the request destination through the HDD controller 309 and writes the parity data Pj duplicated in the writing buffer B into the LBAj of the duplication source through the HDD controller 309.

Thereafter, the writing instructing unit 509 writes the data Di# to be written duplicated in the writing buffer B into the LBAj of the request destination through the HDD controller 309 and write the parity data Pj# whose generation source is the data Di# to be written, into the LBAj of the duplication source of the parity data Pj through the HDD controller 309.

For example, when the determining unit 508 determines that the HDD is re-started for which the writing process is executed in response to the write request 600, the writing instructing unit 509 writes the data D1 duplicated in the writing buffer B1 into the LBA1 of the HDD1 of the request destination through the HDD controller 309 and writes the parity data P1 duplicated in the writing buffer B2 into the LBA1 of the HDD3 through the HDD controller 309.

Thereafter, the writing instructing unit 509 calculates the parity data P1# whose generation source is the data D1# to be written duplicated in the writing buffer B3 through the HDD controller 309; writes the data D1# to be written duplicated in the writing buffer B3 into the LBA1 of the HDD1 of the request destination through the HDD controller 309; and writes the calculated parity data P1# into the LBA1 of the HDD3 of the duplication source of the parity data P1 through the HDD controller 309.

Thereby, the data Di and the parity data Pj duplicated in the writing buffer B are written back, thereby, the consistency of the data between the HDDs after re-starting up is assured, and thereafter, the writing process executed in response to the write request can again be executed using the data Di# to be written duplicated in the writing buffer B.

When the writing processes of the various data items instructed by the writing instructing unit 509 (hereinafter, each referred to as "data writing process") are successfully executed, the updating unit 502 changes the writing state flag of the writing state table 700 from "1" to "0". For example, the consistency of the data between the HDDs is assured by writing back the data Di and the parity data Pj that are duplicated in the writing buffer B into the LBAj of the duplication source and therefore, the updating unit 502 changes the writing state flag of the writing state table 700 from "1" to "0".

When the updating unit 502 changes the writing state flag of the writing state table 700 from "1" to "0", the updating unit 502 may initialize the writing buffer B. When the writing process or the data writing process in response to the write request is successfully executed, the updating unit 502 discards the data Di, the parity data Pj, and the data Di# to be written that are duplicated in the writing buffers B1 to B3.

In the case where the data writing processes instructed by the writing instructing unit 509 are failed, the data Di duplicated in the writing buffer B may thereafter be used as the read data when the data Di is read. In the case where the data writing processes are failed, the parity data Pj duplicated in the writing buffer B may thereafter be used as the read data when the parity data Pj is read, and the data Di# to be written duplicated in the writing buffer B may thereafter be used as the read data when the data Di# to be written is read. Thereby, the storage system 300 can normally be operated until a new write request is received.

<Patterns that do not Need Duplication of Data Di and Parity Data Pj>

When the data Di# included in the write request is duplicated into the writing buffer B, the duplication may be unnecessary of the data Di of the LBAj of the HDDk of the request destination and the parity data Pj whose generation source is the data Di into the writing buffer B. The writing process may be able to again be executed in response to the write request without restoring the state to that maintained immediately before the reception of the write request by writing back the data Di and the parity data Pj into the LBAj of the duplication source.

For example, in the case where the data of the HDD that is off line does not need to be restored when the writing process is executed in response to the write request, the duplication is unnecessary of the data Di and the parity data Pj into the writing buffer B. Patterns 1 to 3 will be described that do not need the duplication of the data Di and the parity data Pj into the writing buffer B.

(Pattern 1) When Write Request is Received in Redundant Configuration

When the storage system 300 is in the redundant configuration, the writing process executed in response to the write request can again be executed using the data Di# to be written duplicated in the writing buffer B without writing the data Di and the parity data Pj duplicated in the writing buffer B into the LBAj of the duplication source. The determining unit 508 determines whether the storage system 300 is in the redundant configuration.

The RAID-3, -5, and -6 storage system, etc. are each in the redundant configuration when the number x of HDDs to which faults occur is smaller than the number Y of parity drives. Therefore, the determining unit 508 determines whether the number x of HDDs to which faults occur is smaller than the number Y of parity drives. The number Y of parity drives of the storage system 300 is "Y=1" and therefore, the determining unit 508 determines whether the number x of HDDs to which faults occur is "x=0".

When the determining unit 508 determines that the number x of HDDs to which faults occur is smaller than the number Y of parity drives, the duplication instructing unit 504 duplicates the data Di# to be written included in the write request into the writing buffer B through the HDD controller 309 and does not duplicate the data Di and the parity data Pj into the writing buffer B.

In this case, the determining unit 508 determines whether the HDD is re-started for which the writing process is executed in response to the write request, after the data Di# to be written included in the write request is duplicated into the writing buffer B. When the determining unit 508 determines that the HDD is re-started, the writing instructing unit 509 writes the data Di# to be written duplicated in the writing buffer B into the LBAj of the request destination through the HDD controller 309 and writes the parity data Pj# whose generation source is the data Di# to be written, into the LBAj of the duplication source of the parity data Pj through the HDD controller 309.

Thereby, such processes can be omitted as the duplication processes of the data Di and the parity data Pj into the writing buffer B and the data writing processes of the data Di and the parity data Pj duplicated in the writing buffer B into the LBAj of the duplication source.

An example will be described of the transition of the storage content of the LBA1 of each of the HDD1 to HDD3 occurring when the write request is received in the redundant configuration. The description will be made taking an example of the case where the writing process (in (A) above) is executed in response to the write request 600 in the storage system 300 in the redundant configuration.

Figure 13:
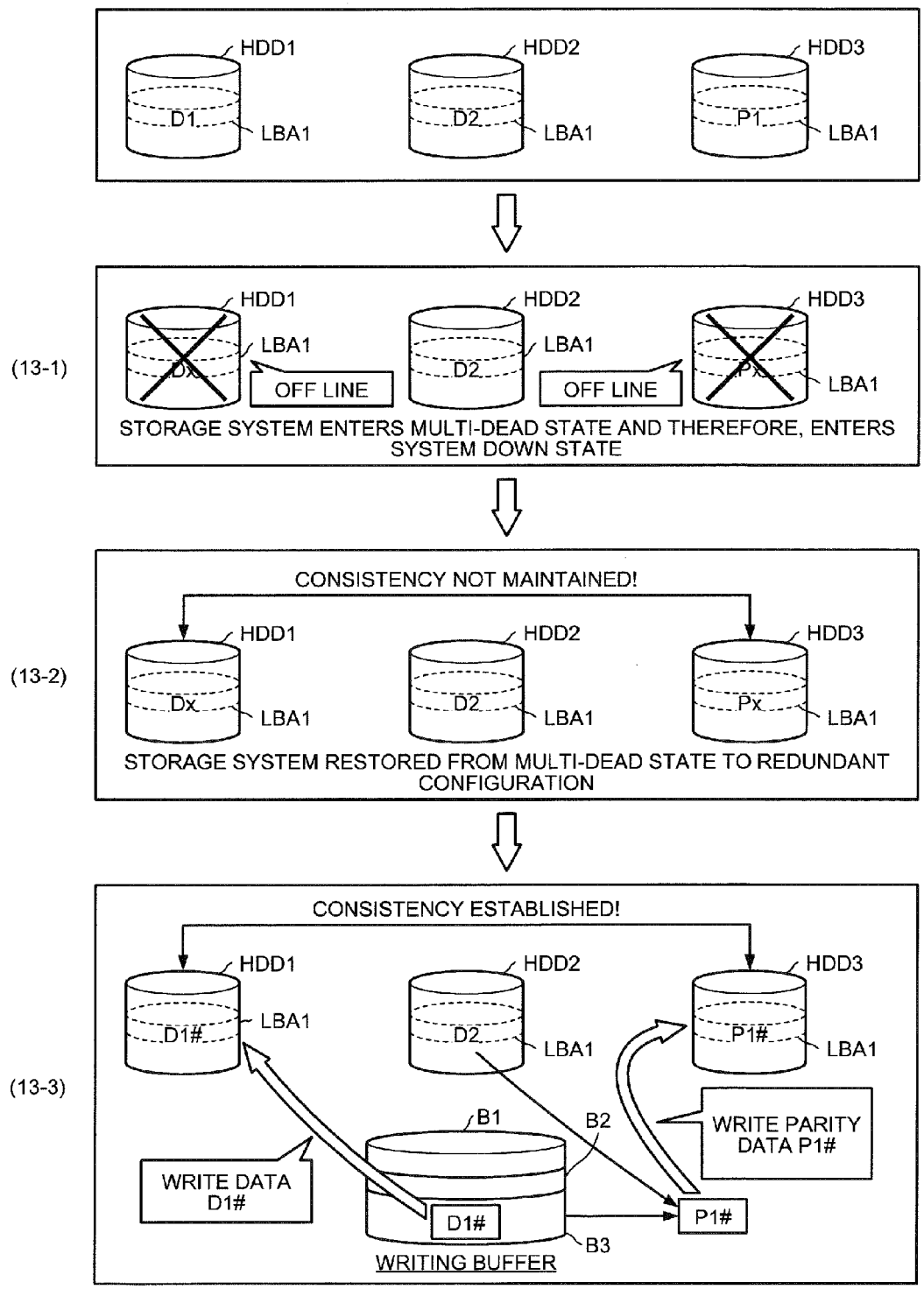
FIG. 13 is an explanatory diagram (Part III) of the example of the transition of the storage content of the LBA1 of the HDD1 to HDD3.

FIG. 13 is an explanatory diagram (Part III) of the example of the transition of the storage content of the LBA1 of the HDD1 to HDD3. In (13-1) of FIG. 13, the writing process is executed in response to the write request 600 and as a result, the writing of the data D1# to be written, into the LBA1 of the HDD1 has failed and the writing of the parity data P1# into the LBA1 of the HDD3 has failed. In this case, the HDD1 and HDD3 are detected as the HDDs to which faults occur and are caused to be off line. Therefore, the storage system 300 changes to the multi-dead state and changes to the system down state.

In (13-2) of FIG. 13, the hardware of the storage system 300 is reset and as a result, the HDD1 and HDD3 are re-started and the storage system 300 is restored from the multi-dead state to the redundant configuration. The data Dx stored in the LBA1 of the HDD1 is data that is different from both of the data D1 and the data D1# to be written. The parity data Px stored in the LBA1 of the HDD3 is data that is different from both of the parity data P1 and the parity data P1#. Therefore, at this moment, inconsistency of the data occurs between the HDD1 and HDD3.

In (13-3) of FIG. 13, the data D1# to be written duplicated in the writing buffer B3 is written in the LBA1 of the HDD1 and the parity data P1# whose generation source is the data D1# to be written duplicated in the writing buffer B3 (P1#=D1#xorD2) is written in the LBA1 of the HDD3. As a result, the consistency of the data is assured between the HDD1 and HDD3 and therefore, the data D2 stored in the LBA1 of the HDD2 can be restored even when the HDD2 is off line.

(Pattern 2) When HDDk of Request Destination is Off Line

When the HDDk of the request source is off line, the writing process executed in response to the write request can again be executed using the data Di# to be written duplicated in the writing buffer B without writing the parity data Pj duplicated in the writing buffer B into the LBAj of the request source.

When the object determining unit 510 determines that a fault occurs at the HDDk of the request destination, the duplication instructing unit 504 duplicates the data Di# to be written included in the write request into the writing buffer B through the HDD controller 309 and does not duplicate the data Di and the parity data Pj into the writing buffer B.

In this case, the determining unit 508 determines whether the HDD is re-started for which the writing process is executed in response to the write request, after the data Di# to be written included in the write request is duplicated into the writing buffer B. When the determining unit 508 determines that the HDD is re-started, the writing instructing unit 509 writes the parity data Pj# whose generation source is the data Di# to be written, into the LBAj of the duplication source of the parity data Pj through the HDD controller 309.

Thereby, such processes can be omitted as the duplication process of the parity data Pj into the writing buffer B and the data writing process of the parity data Pj duplicated in the writing buffer B into the LBAj of the duplication source.

An example will be described of the transition of the storage content of the LBA1 of each of the HDD1 to HDD3 occurring when the write request is received in the state where the HDDk of the request destination is off line. The description will be made taking an example of the case where the writing process (in (C) above) is executed in response to a write request for updating the data D2 of the LBA1 of the HDD2 to the data D2# to be written in the non-redundant configuration whose HDD2 is off line.

Figure 14:
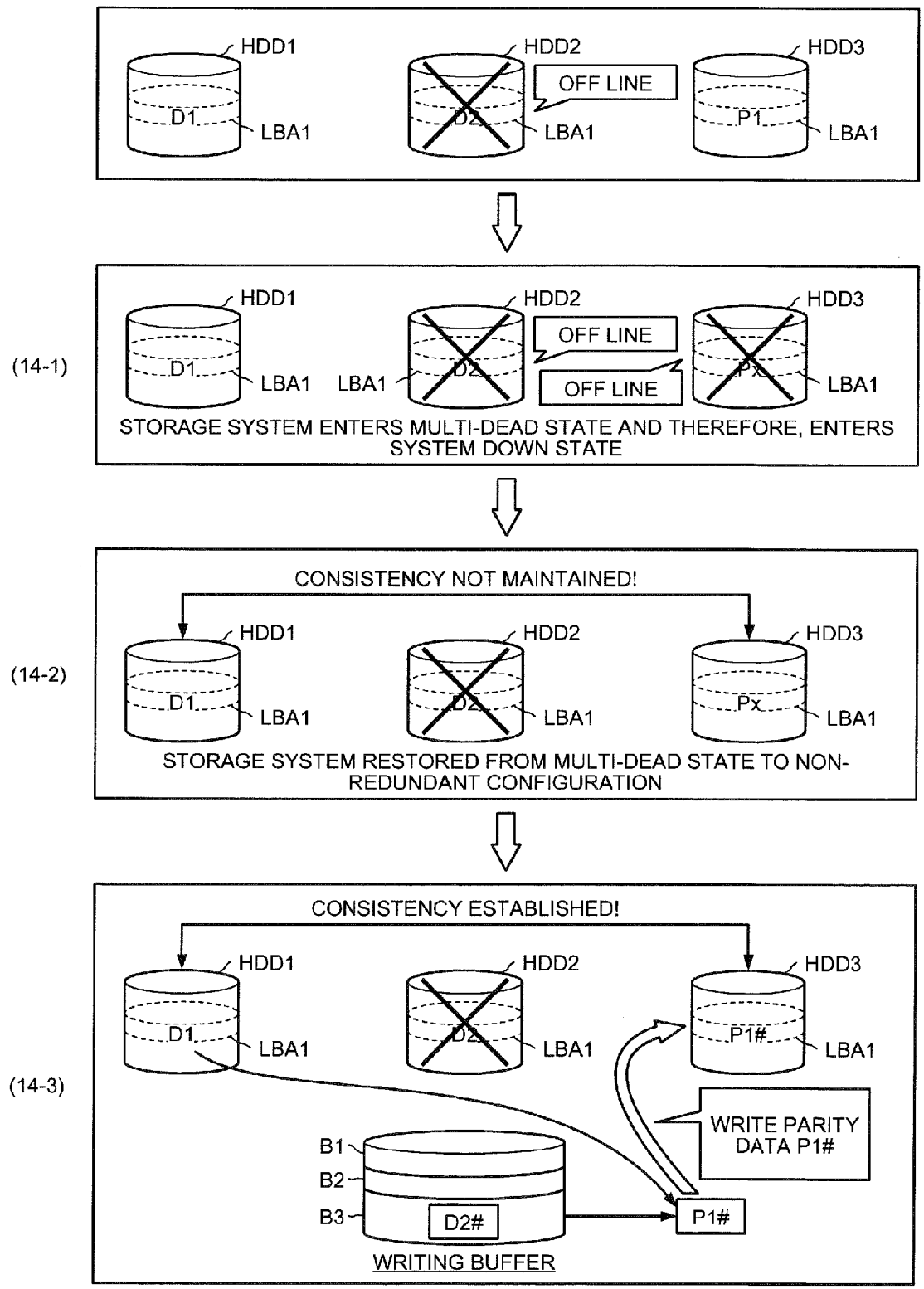
FIG. 14 is an explanatory diagram (Part IV) of the example of the transition of the storage content of the LBA1 of the HDD1 to HDD3.

FIG. 14 is an explanatory diagram (Part IV) of the example of the transition of the storage content of the LBA1 of the HDD1 to HDD3. In (14-1) of FIG. 14, the writing process is executed in response to the write request for updating the data D2 of the LBA1 of the HDD2 to the data D2# and as a result, the writing of the parity data P1# into the LBA1 of the HDD3 has failed. In this case, the HDD3 is detected as the HDD at which a fault occurs and is caused to be off line. Therefore, the storage system 300 changes to the multi-dead state and changes to the system down state.

In (14-2) of FIG. 14, the hardware of the storage system 300 is reset and as a result, the HDD3 is re-started and the storage system 300 is restored from the multi-dead state to the non-redundant configuration. The parity data Px stored in the LBA1 of the HDD3 is data that is different from the parity data P1. Therefore, at this moment, inconsistency of the data occurs between the HDD1 and HDD3.

In (14-3) of FIG. 14, the parity data P1# whose generation source is the data D2# to be written duplicated in the writing buffer B3 (P1#=D1xorD2#) is written in the LBA1 of the HDD3. As a result, the consistency of the data is assured between the HDD1 and HDD3 and thereafter, the data D2# to be written can be restored of the LBA1 of the HDD2 that is off line.

(Pattern 3) When Parity Drive is Off Line

When the parity drive is off line, the write request executed in response to the write request can again be executed using the data Di# to be written duplicated in the writing buffer B without writing the data Di duplicated in the writing buffer B into the LBAj of the duplication source.

When the object determining unit 510 determines that a fault occurs at the parity drive, the duplication instructing unit 504 duplicates the data Di# to be written included in the write request into the writing buffer B through the HDD controller 309 and does not duplicate the data Di and the parity data Pj into the writing buffer B.

In this case, the determining unit 508 determines whether the HDD is re-started for which the writing process is executed in response to the write request, after the data Di# to be written included in the write request is duplicated into the writing buffer B. When the determining unit 508 determines that the HDD is re-started, the writing instructing unit 509 writes the data Di# to be written duplicated in the writing buffer B into the LBAj of the request destination through the HDD controller 309. Thereby, such processes can be omitted as the duplication process of the data Di into the writing buffer B and the data writing process of the data Di duplicated in the writing buffer B into the LBAj of the duplication source.

An example of a transition of the storage content of the LBA1 of each of the HDD1 to HDD3 occurring when the write request is received in the case where the parity drive is off line. The description will be made taking an example of the case where the writing process is executed in response to the write request 600 in the non-redundant configuration whose HDD3 is off line.

Figure 15:
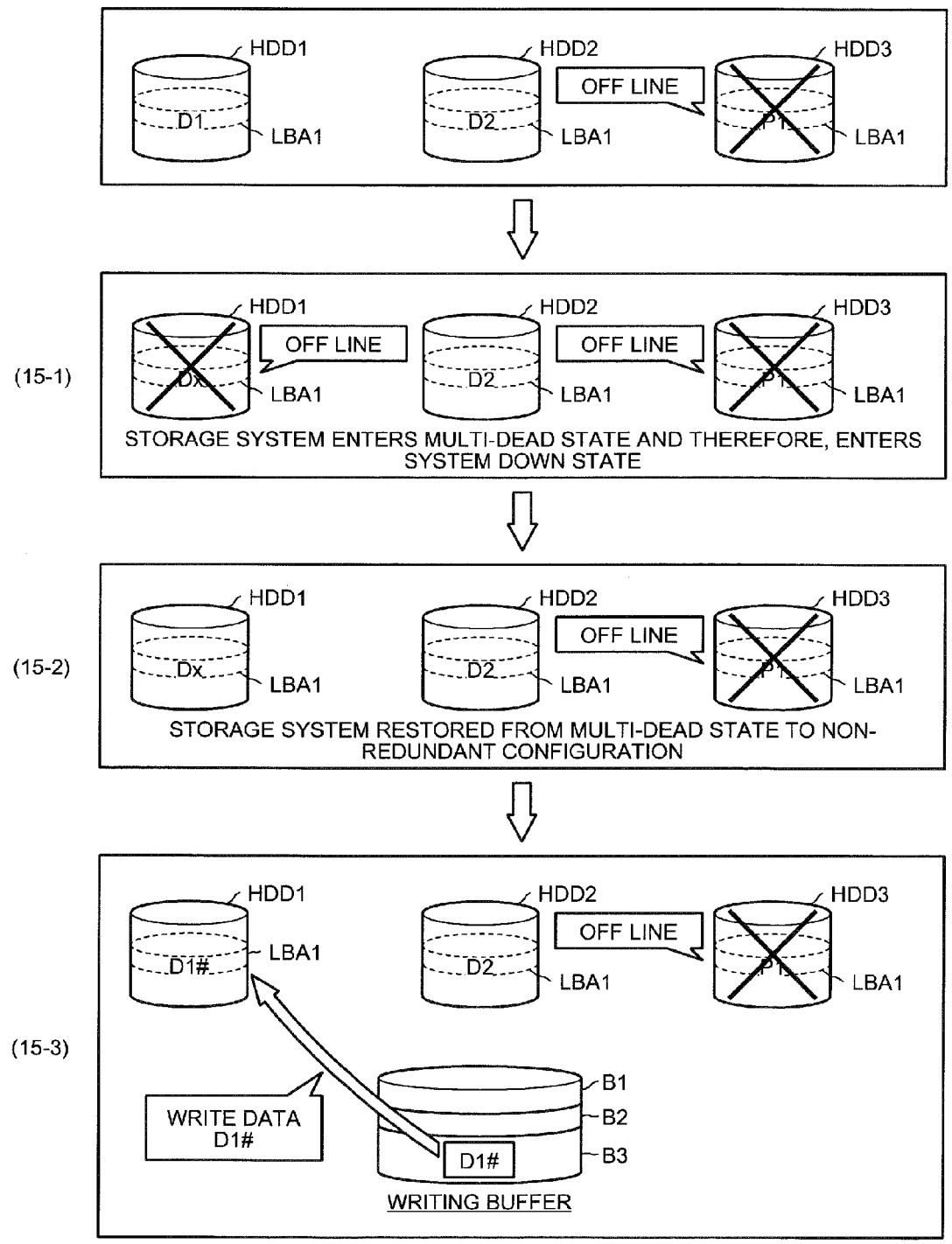
FIG. 15 is an explanatory diagram (Part V) of the example of the transition of the storage content of the LBA1 of each of the HDD1 to HDD3.

FIG. 15 is an explanatory diagram (Part V) of the example of the transition of the storage content of the LBA1 of each of the HDD1 to HDD3. In (15-1) of FIG. 15, the writing process is executed in response to the write request 600 and as a result, the writing of the data D1# to be written, into the LBA1 of the HDD1 has failed. In this case, the HDD1 is detected as the HDD at which a fault occurs and is caused to be off line. Therefore, the storage system 300 changes to the multi-dead state and changes to the system down state.

In (15-2) of FIG. 15, the hardware of the storage system 300 is reset and as a result, the HDD1 is re-started and the storage system 300 is restored from the multi-dead state to the non-redundant configuration. The data Dx stored in the LBA1 of the HDD1 is data that is different from both of the data D1 and the data D1# to be written.

In (15-3) of FIG. 15, the data D1# to be written duplicated in the writing buffer B3 is written in the LBA1 of the HDD1.

In the above, the description has been made taking the example of the case where the writing buffer B is disposed in each of the system areas 314, 315, and 316 of the HDD1 to HDD3. However, the writing buffer B may be disposed in the non-volatile memory 308. When the writing buffer B is disposed in the non-volatile memory 308, the duplication instructing unit 504 and the writing instructing unit 509 can directly access the writing buffer B without using the HDD controller 309. The duplication instructing unit 504 does not need to access the plural HDD1 to HDD3 to duplicate the data Di, the parity data Pj, etc., into the writing buffer B.

Therefore, when the writing buffer B is disposed in the non-volatile memory 308, an increase of the speed can be facilitated of the data duplication process by the duplication instructing unit 504 and the data writing process by the writing instructing unit 509, compared to the case where the writing buffer B is disposed in each of the HDD1 to HDD3. On the other hand when the writing buffer B is disposed in each of the system areas 314 to 316 of the HDD1 to HDD3, the amount of data stored in the non-volatile memory 308 can be suppressed.

<Identification of Order of HDDs to which Faults Occur>

An example will be described of a specific content of a process of identifying the order of occurrences of faults for the plural HDDs in which the faults occur. The case will first be described where the order of occurrences of the faults is identified using the management data 410 to 430 of the HDD1 to HDD3 depicted in (9-2) of FIG. 9.

For example, the processor 306 refers to the management data 410 to 430 of the HDD1 to HDD3 through the HDD controller 309 and identifies the HDD2 and HDD3 whose states are "abnormal" in at least any one of the management data 410 to 430.

The processor 306 refers to an access log of the management data 420 of the identified HDD2 through the HDD controller 309 and identifies an access time at which the HDD2 is accessed last (hereinafter, referred to as "access time t1") and refers to an access log of the management data 430 of the identified HDD3 through the HDD controller 309 and identifies an access time at which the HDD3 is accessed last (hereinafter, referred to as "access time t2").

The processor 306 compares the identified access times t1 and t2 with each other and identifies the order of the occurrences of the faults for the HDD2 and HDD3. For example, the processor 306 identifies the order of the occurrences of the faults to the HDD2 and HDD3 as the sequence of the access times.

It is assumed that the access time t1 is previous compared to the access time t2. Therefore, after the fault occurs at the HDD2, the processor 306 identifies the occurrence of the fault to the HDD3. The description has been made taking the example of the case where the order of the occurrences of the faults is identified from the access logs of the management data 410 to 430. However, the order of the occurrences of the faults may be identified from the start-up times of the HDD1 to HDD3. For example, the processor 306 may identify the order of the occurrences of the faults as the sequence of the start-up times for the HDD2 and HDD3.

The case will be described where the order of occurrences of the faults is identified using the detection result table 1000 depicted in FIG. 10. The management data 410 to 430 of the HDD1 to HDD3 may not properly be updated due to the faults of the HDDs. Therefore, the processor 306 may identify the order of the occurrences of the faults for the plural HDDs to which faults occur by referring to the detection result table 1000.

In the example of (10-2) depicted in FIG. 10, the processor 306: refers to the HDD numbers in the detection result table 1000; identifies the HDD2 and HDD3 in which the faults occur; refers to the detection times in the detection result table 1000; and identifies the order of the occurrences of the faults for the plural HDD2 and HDD3 in which the faults occur.

For example, the processor 306 identifies the order of the occurrences of the faults as the sequence of the detection times for the HDD2 and HDD3. In this case, the detection time "02:11:55 on 2010/Aug/23" of the HDD2 is previous to the detection time "12:09:22 on 2010/Aug/24" of the HDD3. Therefore, after the fault occurs at the HDD2, the processor 306 identifies the occurrence of the fault to the HDD3.

A storage control process procedure of the storage control apparatus 101 according to the first embodiment will be described.

FIGS. 16 and 17 are flowcharts of an example of a data duplication process procedure of the storage control apparatus according to the first embodiment. In the flowchart of FIG. 16, the receiving unit 501 determines whether a write request for the LBAj of the HDDk has been received (step S1601).

The receiving unit 501 waits for the write request to be received (step S1601: NO). When the receiving unit 501 receives a write request (step S1601: YES), the determining unit 508 determines whether the number x of the HDDs to which faults occur is "x=0" (step S1602).

If the determining unit 508 determines that the number x of the HDDs is "x=0" (step S1602: YES), the updating unit 502 changes the writing state flag of the writing state table 700 from "0" to "1" (step S1603) and writes the HDD number "k" and the LBA number "j" included in the received write request into the writing state table 700 (step S1604).

The duplication instructing unit 504 duplicates the data Di# to be written and included in the write request, into the writing buffer B3 of each of the HDD1 to HDD3 through the HDD controller 309 (step S1605). Thereafter, the executing unit 505 executes the writing process in response to the received write request (step S1606) and the procedure progresses to step S1701 depicted in FIG. 17.

If the determining unit 508 determines at step S1602 that the number x of the HDDs to which faults occur is "x≠0" (step S1602: NO), the updating unit 502 determines whether the writing state flag of the writing state table 700 is "1" (step S1607).

If the updating unit 502 determines that the writing state flag is "0" (step S1607: NO), the updating unit 502 changes the writing state flag of the writing state table 700 from "0" to "1" (step S1608). The updating unit 502 writes the HDD number "k" and the LBA number "j" included in the received write request, into the writing state table 700 (step S1609).

The object determining unit 510 determines whether any fault occurs at the parity drive (step S1610). If the object determining unit 510 determines that a fault occurs at the parity drive (step S1610: YES), the procedure progresses to step S1605.

On the other hand, if the object determining unit 510 determines that no fault occurs at the parity drive (step S1610: NO), the object determining unit 510 determines whether any fault occurs at the HDDk of the request destination of the write request (step S1611). If the object determining unit 510 determines that a fault occurs at the HDDk of the request destination of the write request (step S1611: YES), the procedure progresses to step S1605.

On the other hand, if the object determining unit 510 determines that no fault occurs at the HDDk of the request destination of the write request (step S1611: NO), the procedure progresses to step S1612. The duplication instructing unit 504 duplicates the data Di stored in the LBAj of the HDDk of the request destination of the write request, into the writing buffer B1 of each of the HDD1 to HDD3 through the HDD controller 309 (step S1612).

The duplication instructing unit 504 duplicates the parity data Pj whose generation source is the data Di duplicated in the writing buffer B1, into the writing buffer B2 of each of the HDD1 to HDD3 through the HDD controller 309 (step S1613) and duplicates the data Di# to be written and included in the write request, into the writing buffer B3 of each of the HDD1 to HDD3 (step S1614), and the procedure progresses to step S1606.

If the updating unit 502 determines at step S1607 that the writing state flag is "1" (step S1607: YES), the procedure progresses to step S1615. The detecting unit 507 changes from "normal" to "abnormal", the state of the HDD for which the writing has failed in each of the management data 410 to 430 of the HDD1 to HDD3 that are on line, through the HDD controller 309 (step S1615). The HDD for which the writing has failed is identified from, for example, the HDD number set in the writing failed HDD number field of the writing state table 700.

Thereafter, the detecting unit 507 causes the HDD for which the writing has failed to be off line (step S1616). The determining unit 508 notifies the CPU 301 that the number of HDDs in which the faults occur is greater than or equal to two and thereby, the storage system 300 changes to the system down state (step S1617) and the series of process steps according to the flowchart come to an end.

A case where the updating unit 502 determines at step S1607 that the writing state flag is "1" (step S1607: YES) is a case where the data writing process has failed at step S1804 depicted in FIG. 18 described later (step S1804: NO).

In the flowchart of FIG. 17, the success and failure determining unit 506 determines whether the writing process in response to the write request executed at step S1606 depicted in FIG. 16 is successfully executed (step S1701). If the success and failure determining unit 506 determines that the writing process in response to the write request is successfully executed (step S1701: YES), the updating unit 502 changes the writing state flag of the writing state table 700 from "1" to "0" (step S1702) and the procedure progresses to step S1704.

On the other hand, if the success and failure determining unit 506 determines that the writing process in response to the write request has failed (step S1701: NO), the updating unit 502 writes the HDD number of the HDD for which the data writing has failed into the writing failed HDD number field of the writing state table 700 (step S1703). Thereafter, the detecting unit 507 determines whether any HDD is detected at which a fault occurs (step S1704).

If the detecting unit 507 determines that no HDD is detected to which a fault occurs (step S1704: NO), the series of process steps according to the flowchart come to an end. On the other hand, if the detecting unit 507 determines that an HDD is detected at which a fault occurs (step S1704: YES), the procedure progresses to step S1705. The detecting unit 507 changes the state of the HDD in which the fault occurs in each of the management data 410 to 430 of the HDD1 to HDD3 that are on line, from "normal" to "abnormal" through the HDD controller 309 (step S1705).

Thereafter, the detecting unit 507 causes the HDD at which the fault occurs to be off line through the HDD controller 309 (step S1706). The determining unit 508 determines whether the number x of HDDs to which any faults occur is "x≥2" (step S1707). The determining unit 508 determines that the number x is "x<2" (step s1707: NO), the updating unit 502 changes the writing state flag of the writing state table 700 from "1" to "0" (step S1708) and the series of process steps according to the flowchart come to an end.

On the other hand the determining unit 508 determines that the number x is "x≥2" (step s1707: YES), the procedure progresses to step S1709. The determining unit 508 notifies the CPU 301 that the number of HDDs in which the faults occur is greater than or equal to two and thereby, the storage system 300 changes to the system down state (step S1709) and the series of process steps according to the flowchart come to an end.

Thus, when the data Di is updated associated with the updating of the parity data Pj; the data Di, the parity data Pj, and the data Di# to be written that are not yet updated can be saved to the writing buffer B. When the write request is received in the redundant configuration, only the data Di# to be written can be saved to the writing buffer B. When the HDDk of the request destination or the parity drive is off line, only the data Di# to be written can be saved to the writing buffer B.

A system restoration process procedure of the storage control apparatus 101 according to the first embodiment will be described. The description will be made taking an example of a case where the storage system 300 is restored from the system down state to the non-redundant configuration maintained immediately before the storage system 300 changes to the system down state. However, the case is assumed where, after the hardware of the storage system 300 is reset, the HDD caused last to be off line is caused to be on line among the plural HDDs in which the faults occur and the storage system 300 is re-started.

FIG. 18 is a flowchart of an example of a system restoration process procedure of the storage control apparatus 101 according to the first embodiment. In the flowchart of FIG. 18, the determining unit 508 first determines whether the HDD for which the writing process is executed in response to the write request is re-started (step S1801).

The determining unit 508 waits for the HDD to be re-started (step S1801: NO). When the determining unit 508 determines that the HDD is re-started (step S1801: YES), the writing instructing unit 509 determines whether the writing state flag of the writing state table 700 is "1" (step S1802). If the writing instructing unit 509 determines that the writing state flag is "0" (step S1802: NO), the series of process steps according to the flowchart comes to an end.

On the other hand, if the writing instructing unit 509 determines that the writing state flag is "1" (step S1802: YES), the writing instructing unit 509 executes the data writing process (step S1803). The specific process procedure of the data writing process will be described later. Thereafter, the success and failure determining unit 506 determines whether the data writing process is successfully executed (step S1804).

If the success and failure determining unit 506 determines that the data writing process is successfully executed (step S1804: YES), the updating unit 502 changes the writing state flag of the writing state table 700 from "1" to "0" (step S1805) and the series of process steps according to the flowchart come to an end. On the other hand, if the success and failure determining unit 506 determines that the data writing process has failed (step S1804: NO), the series of process steps according to the flowchart come to an end.

An example will be described of a specific process procedure of the data writing process at step S1803. The data writing process at step S1803 differs depending on through which process steps the writing process at step S1606 depicted in FIG. 16 is executed. The specific process procedure of the data writing process executed employing a case of (step S1611: NO) depicted in FIG. 16 will be described as the example.

FIG. 19 is a flowchart of the example of the specific process procedure of the data writing process at step S1803. In the flowchart of FIG. 19, the writing instructing unit 509 first writes the data Di duplicated in the writing buffer B1 into the LBAj of the request destination through the HDD controller 309 (step S1901).

The writing instructing unit 509 writes the parity data Pj duplicated in the writing buffer B2 into the LBAj of the duplication source through the HDD controller 309 (step S1902) and thereafter, calculates the parity data Pj# whose generation source is the data Di# to be written duplicated in the writing buffer B3 through the HDD controller 509 (step S1903).

The writing instructing unit 509 writes the data Di# to be written duplicated in the writing buffer B3 into the LBAj of the request destination through the HDD controller 309 (step S1904) and writes the calculated parity data Pj# into the LBAj of the duplication source of the parity data Pj through the HDD controller 309 (step S1905) and the procedure progresses to step S1804.

Thereby, the writing process executed in response to the write request can again be executed using the data Di# to be written saved to the writing buffer B after the consistency of the data is assured between the HDDs after their re-starting up by writing back the data Di and the parity data Pj saved to the writing buffer B into their original storage area.

If the data writing process at step S1804 has failed, the data Di, the parity data Pj, and the data Di# to be written saved to the writing buffer B can be used as the pieces of read data until a new write request is received; or such a message may be displayed on the display 304 depicted in FIG. 3 and thereby, may be informed of to the user as that notifying that the writing process in response to the write request has failed even when the HDD is re-started. The storage system 300 may be restored to the redundant configuration by re-building the system by replacing the HDDs in which the faults occur after the above system restoration process is executed.

According to the storage control apparatus 101 according to the first embodiment, the data Di stored in the LBAj of the HDDk of the request destination and the parity data Pj whose generation source is the data Di can be duplicated into the writing buffer B before the writing process is executed in response to the write request. Thereby, the data Di and the parity data Pj before the updating can be saved to the writing buffer B when the data Di is updated associated with the updating of the parity data Pj.

According to the storage control apparatus 101, when the HDD is re-started for which the writing process is executed in response to the write request, the data Di duplicated in the writing buffer B can be written into the LBAj of the HDDk of the request destination; and the parity data Pj duplicated in the writing buffer B can be written into the LBAj of the request destination. Thereby, even when the writing into the HDD has failed due to a fault such as thermal off-tracking, the consistency of the data can be established between the HDDs by writing back the data Di and the parity data Pj saved to the writing buffer B into the LBAj of the original storage area after the HDD is re-started.

According to the storage control apparatus 101, when the writing process in response to the write request has failed and the HDD is re-started for which the writing process is executed, the data Di and the parity data Pj duplicated in the writing buffer B can be written into the LBAj of the duplication source. Thereby, after the writing process is successfully executed in response to the write request, even when the HDD is re-started for the reason such as a momentary power failure, the data Di and the parity data Pj saved to the writing buffer B can be prevented from being written back into the LBAj of their original storage area.

According to the storage control apparatus 101: before the writing process is executed in response to the write request, the data Di# included in the write request can be duplicated into the writing buffer B; and the wiring process executed in response to the write request can again be executed using the data Di# to be written duplicated in the writing buffer B after the data Di and the parity data Pj duplicated in the writing buffer B are written back into the LBAj of the duplication source. Thereby, the writing process executed in response to the write request can again be executed after the consistency of the data is assured between the HDDs after their re-starting up by writing back the data Di and the parity data Pj into their original storage area.

According to the storage control apparatus 101, when the HDDk of the request destination is off line, the writing process executed in response to the write request can again be executed using the duplicated data Di# to be written, after the data Di# to be written is duplicated into the writing buffer B and the HDD is re-started due to the failure in the writing.

According to the storage control apparatus 101, when the parity drive is off line, the writing process executed in response to the write request can again be executed using the duplicated data Di# to be written, after the data Di# to be written is duplicated into the writing buffer B and the HDD is re-started due to the failure in the writing.

According to the storage control apparatus 101, when the write request is received in the redundant configuration, the writing process executed in response to the write request can again be executed using the duplicated data Di# to be written, after the data Di# to be written is duplicated into the writing buffer B and the HDD is re-started due to the failure in the writing.

Based on the above, according to the storage control apparatus 101 according to the first embodiment, the consistency of the data can be assured between the HDDs when the storage system is restored. Thereby, the data corruption of the read data can be prevented that occurs caused by the inconsistency of the data between the HDDs due to the failure in the writing, and the state can be avoided where the system can not be started up or where the system malfunctions.

Though the storage control apparatus 101 includes the control unit 503 in the above, each of the HDD1 to HDD3 may include the control unit 503. In this case, the control units 503 of the HDD1 to HDD3 control the accesses to the HDD1 to HDD3 according to, for example, the instructions of the duplication instructing unit 504, the executing unit 505, and the writing instructing unit 509 of the storage control apparatus 101.

A storage control apparatus 101 according to a second embodiment will be described. In the second embodiment, the storage control apparatus 101 is applied to a RAID-5 storage system 2000. The "RAID 5" is a scheme of recording the data items of the data group in plural HDDs distributing the data items thereto, and recording the pieces of parity data generated from the data group in the plural HDDs distributing the pieces of parity data thereto.

In the RAID-5 storage system 2000, the parity data are not recorded in the dedicated HDD (the parity drive) as recorded in the RAID-3 storage system but rather the parity data are distributed and recorded in the plural HDDs. Portions identical to those described in the first embodiment will be given the same reference numerals and will not again be depicted and described.

FIG. 20 is a block diagram of a hardware configuration of the storage system 2000 according to the second embodiment. In FIG. 20, the storage system 2000 includes the CPU 301, the main memory 302, the display controller 303, the display 304, the communication controller 305, the storage control apparatus 101, and the HDD1 to HDD3. The storage control apparatus 101 includes the processor 306, the memory 307, the non-volatile memory 308, the HDD controller 309, and the bus controller 310.

Access of the HDD1 to HDD3 is made for each strip in the storage system 2000. A "strip" refers to a storage area that is formed by bundling plural blocks of the hard disk. A "block" refers to a storage area that is formed by bundling plural sectors each formed by dividing a track that is formed by partitioning the hard disk in a concentric manner.

In FIG. 20, the data area 311 of the HDD1 includes strips A, C, and P3. The data area 312 of the HDD2 includes strips B, P2, and E. The data area 313 of the HDD3 includes strips P1, D, and F.

The strip A of the HDD1 stores data a0. The strip B of the HDD2 stores data b0. The strip P1 of the HDD3 stores parity data p1 that is formed by taking the exclusive OR of the data a0 in the strip A and the data b0 in the strip B.

The strip C of the HDD1 stores data c0. The strip D of the HDD3 stores data d0. The strip P2 of the HDD2 stores parity data p2 that is formed by taking the exclusive OR of the data c0 in the strip C and the data d0 in the strip D.

The strip E of the HDD2 stores data e0. The strip F of the HDD3 stores data f0. The strip P3 of the HDD1 stores parity data p3s that is formed by taking the exclusive OR of the data e0 in the strip E and the data f0 in the strip F.

A specific example of a writing state table 2100 according to the second embodiment will be described. The writing state table 2100 stores the writing state information to identify whether the writing process is normally completed in response to the write request, and is realized by, for example, the non-volatile memory 308 depicted in FIG. 20.

Figure 21:
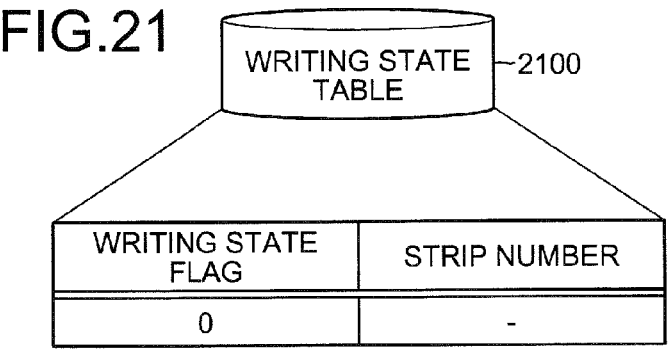
FIG. 21 is an explanatory diagram of the specific example of the writing state table 2100.

FIG. 21 is an explanatory diagram of the specific example of the writing state table 2100. In FIG. 21, the writing state table 2100 has therein fields for the writing state flag and the strip number. The writing state information is stored as a record by setting information in each of the fields.

The writing state flag is the flag that indicates whether the writing process is normally completed in response to the write request. The writing state flag represents "0" in the initial state, is changed from "0" to "1" when the write request is received, and is changed from "1" to "0" when the writing process is normally completed in response to the write request. The strip number is the identifier of the strip of the request destination of the write request.

A storage control process procedure of the storage control apparatus 101 according to the second embodiment will be described. The case will be described where the storage system 2000 is applied to an on-line system such as that of a bank and a user makes cash deposits and cash withdrawals using an automated teller machine (ATM).

A case is assumed where, as a precondition, the power of the storage system 2000 is turned on and as a result, the data a0 in the strip A and the data b0 in the strip B are read and an OS is normally started up. In the initial state, the state of each of the HDD1 to HDD3 is "normal". The storage control process procedure of the storage control apparatus 101 in the redundant configuration will be described.

<Storage Control Process Procedure in Redundant Configuration>

Figure 22:
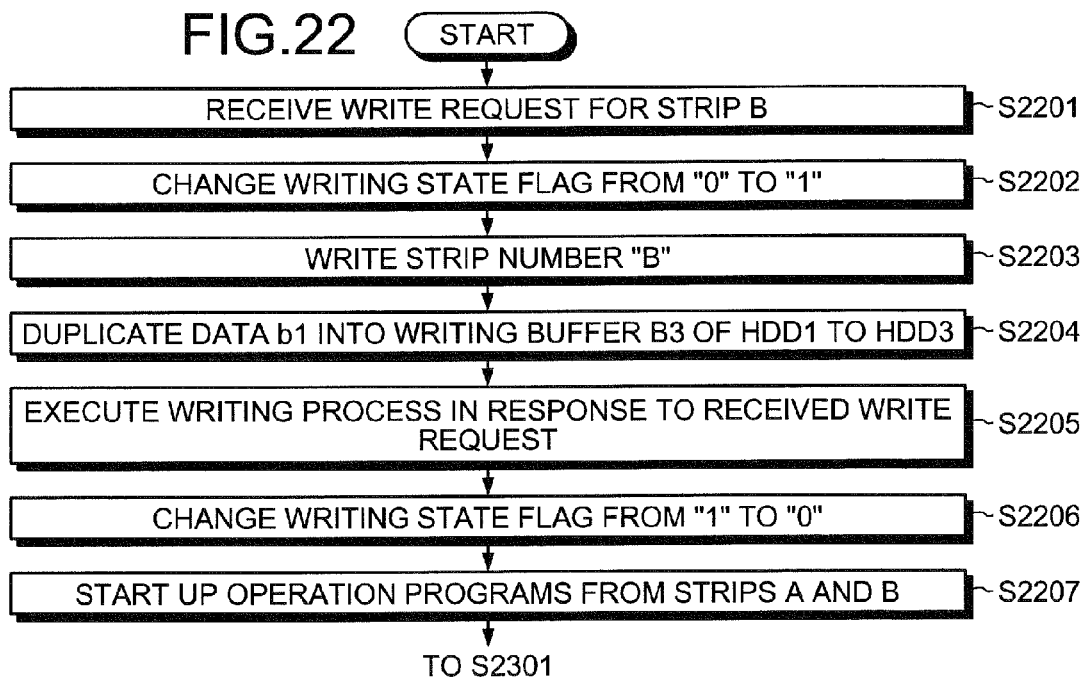
FIGS. 22, 23, and 24 are flowcharts of the example of the storage control process procedure of the storage control apparatus 101 in a redundant configuration.
Figure 23:
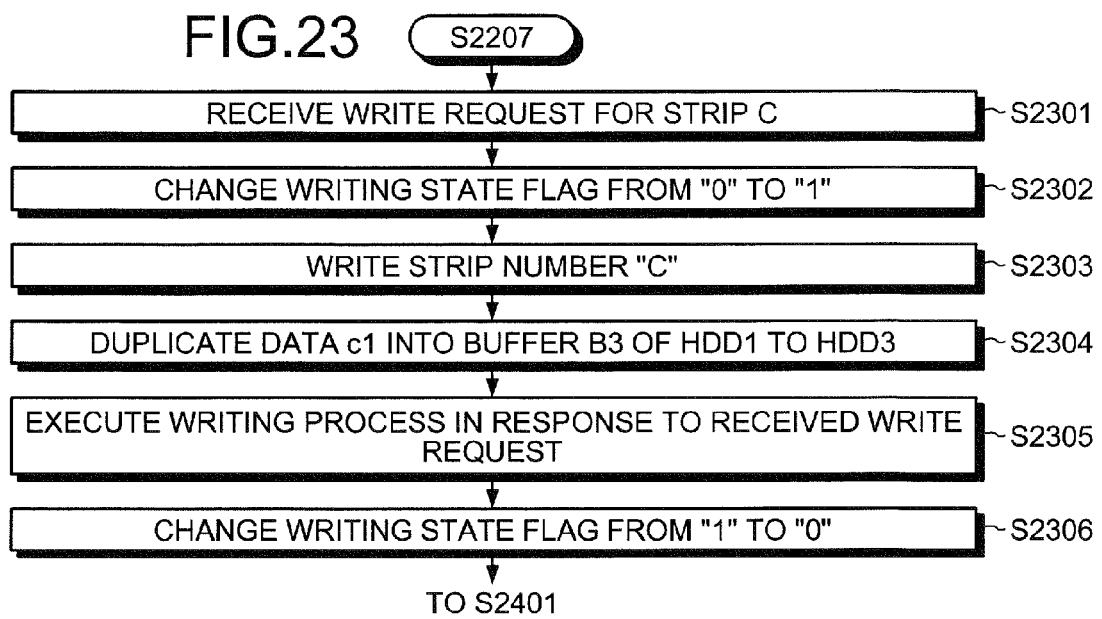
Figure 24:
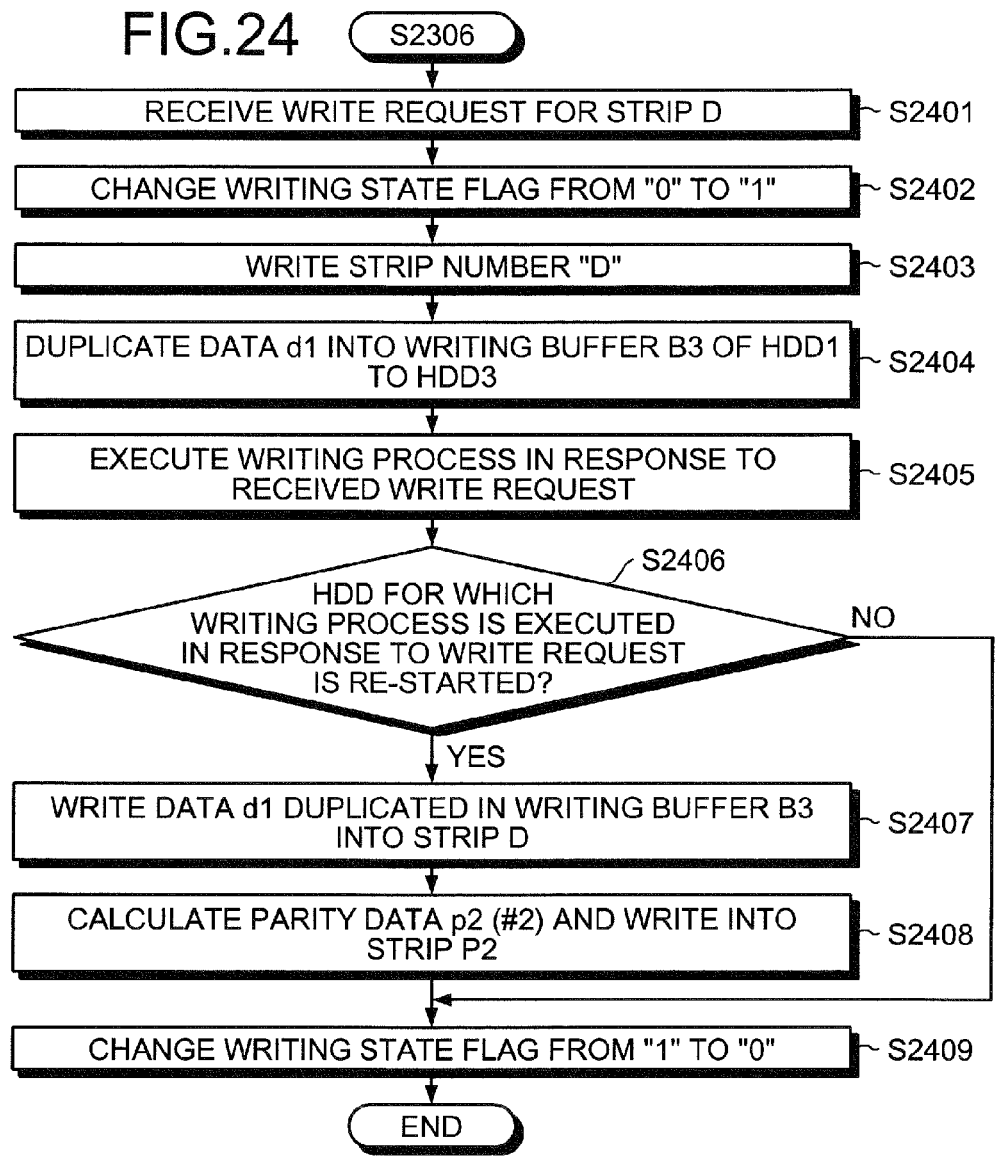

FIGS. 22, 23, and 24 are flowcharts of the example of the storage control process procedure of the storage control apparatus 101 in the redundant configuration. In the flowchart of FIG. 22, the receiving unit 501 receives a write request to update the data b0 in the strip B to the data b1 (step S2201). The write request includes the strip number "B" of the strip B of the request destination and the data b1 to be written. In this example, the data b1 is an event log that represents that the OS is started up.

The updating unit 502 changes the writing state flag of the writing state table 2100 depicted in FIG. 21 from "0" to "1" (step S2202). The updating unit 502 writes the strip number "B" included in the received write request into the strip number field of the writing state table 2100 (step S2203).

The duplication instructing unit 504 duplicates the data b1 included in the write request into the writing buffer B3 of each of the HDD1 to HDD3 through the HDD controller 309 (step S2204). Thereafter, the executing unit 505 executes the writing process in response to the received write request (step S2205).

For example, the executing unit 505 writes the data b1 included in the write request into the strip B through the HDD controller 309 and writes the parity data p1 (#1) formed by taking the exclusive OR of the data b1 included in the write request and the data a0 recorded in the strip A into the strip P1. In the example, the case is assumed where the writing process is successfully executed in response to the write request.

The updating unit 502 changes the writing state flag of the writing state table 2100 from "1" to "0" (step S2206). Thereafter, the processor 306 reads the data a0 from the strip A and the data b1 from the strip B and starts up operation programs (step S2207) and the procedure progresses to step S2301 depicted in FIG. 23.

In the flowchart of FIG. 23, the receiving unit 501 receives a write request to update the data c0 in the strip C to the data c1 (step S2301). The write request includes the strip number "C" of the strip C of the request destination and the data c1 to be written. In this example, the data c1 is deposit data for 100,000 yen.

The updating unit 502 changes the writing state flag of the writing state table 2100 from "0" to "1" (step S2302) and writes the strip number "C" included in the received write request into the strip number field of the writing state table 2100 (step S2303).

The duplication instructing unit 504 duplicates the data c1 included in the write request into the buffer B3 of each of the HDD1 to HDD3 through the HDD controller 309 (step S2304). Thereafter, the executing unit 505 executes the writing process in response to the received write request (step S2305).

For example, the executing unit 505 writes the data c1 included in the write request into the strip C through the HDD controller 309, and calculates the parity data p2 (#1) formed by taking the exclusive OR of the data c1 included in the write request and the data d0 recorded in the strip D and writes the calculated parity data p2 (#1) into the strip P2 through the HDD controller 309. In the example, the case is assumed where the writing process is successfully executed in response to the write request.

The updating unit 502 changes the writing state flag of the writing state table 2100 from "1" to "0" (step S2306) and the procedure progresses to step S2401 depicted in FIG. 24. As a result, the deposit data for 100,000 yen is recorded in the strip C.

In the flowchart of FIG. 24, the receiving unit 501 receives a write request to update the data d0 in the strip D to data d1 (step S2401). The write request includes the strip number "D" in the strip D of the request destination and the data d1 to be written. The data d1 is withdrawal data for 5,000 yen.

The updating unit 502 changes the writing state flag of the writing state table 2100 from "0" to "1" (step S2402) and writes the strip number "D" included in the received write request into the strip number field of the writing state table 2100 (step S2403).

The duplication instructing unit 504 duplicates the data d1 included in the write request into the writing buffer B3 of each of the HDD1 to HDD3 through the HDD controller 309 (step S2404). Thereafter, the executing unit 505 executes the writing process in response to the received write request (step S2405).

For example, the executing unit 505 writes the data d1 included in the write request into the strip D through the HDD controller 309, and calculates the parity data p2 (#2) formed by taking the exclusive OR of the data d1 included in the write request and the data c1 recorded in the strip C and writes the calculated parity data p2 (#2) into the strip P2 through the HDD controller 309.

In this example, both of the cases are assumed where the writing process is successfully executed in response to the write request and where the writing process in response to the write request has failed. The case as an exemplary failure is assumed where the supply of the power of the storage system 2000 is suspended due to a momentary power failure during the writing of the data d1 included in the write request into the strip D and a portion of the data d1 can not be written into the strip D.

In this case, the data stored in the strip D is data dx that is different from both of the data d0 and the data d1. On the other hand when the writing of the parity data into the strip P2 is successfully executed, the parity data p2 (#2) stored in the strip P2 is the data calculated using the data d1. Therefore, at this moment, inconsistency of the data occurs between the strips D and P2. When the supply of the power of the storage system 2000 is suspended due to a momentary power failure, the CPU 301 again turns on the power of the storage system 2000 and thereby, the HDD1 to HDD3 are re-started.

Returning to the description of the flowchart with reference to FIG. 24, the determining unit 508 thereafter determines whether the HDD is re-started (step S2406). If the determining unit 508 determines that the HDD is re-started (step S2406: YES), the writing instructing unit 509 writes the data d1 duplicated in the writing buffer B3 into the strip D through the HDD controller 309 (step S2407).

The writing instructing unit 509 calculates the parity data p2 (#2) and writes the calculated parity data p2 (#2) into the strip P2 through the HDD controller 309 (step S2408). The parity data p2 (#2) is calculated from the data d1 duplicated in the writing buffer B3 and the data c1 stored in the strip C. The updating unit 502 changes the writing state flag of the writing state table 2100 from "1" to "0" (step S2409) and the series of process steps according to the flowchart come to an end.

On the other hand, if the determining unit 508 determines at step S2406 that the HDD is not re-started (step S2406: NO), the updating unit 502 changes the writing state flag of the writing state table 2100 from "1" to "0" (step S2409) and the series of process steps according to the flowchart come to an end.

As described, the writing process executed in response to the write request can again be executed using the data d1 duplicated in the writing buffer B3 after the power is turned on even when the supply of the power is suspended due to a momentary power failure, etc., during the writing process executed in response to the write request. As a result of executing again the writing process, the withdrawal data for 5,000 yen is recorded in the strip D. Therefore, when an inquiry on the account balance is made thereafter, the data on the account balance of 95,000 yen can be referred to from the data c1 in the strip C and the data d1 in the strip D.

<Storage Control Process Procedure in Non-Redundant Configuration>

A storage control process procedure of the storage control apparatus 101 in the non-redundant configuration will be described. The description will be made taking an example of the case where a fault occurs at the HDD1 and the HDD1 is not accessible. An example will be described of updating the management data 410 to 430 respectively stored in the system areas 314 to 316 of the HDD1 to HDD3.

Figure 25:
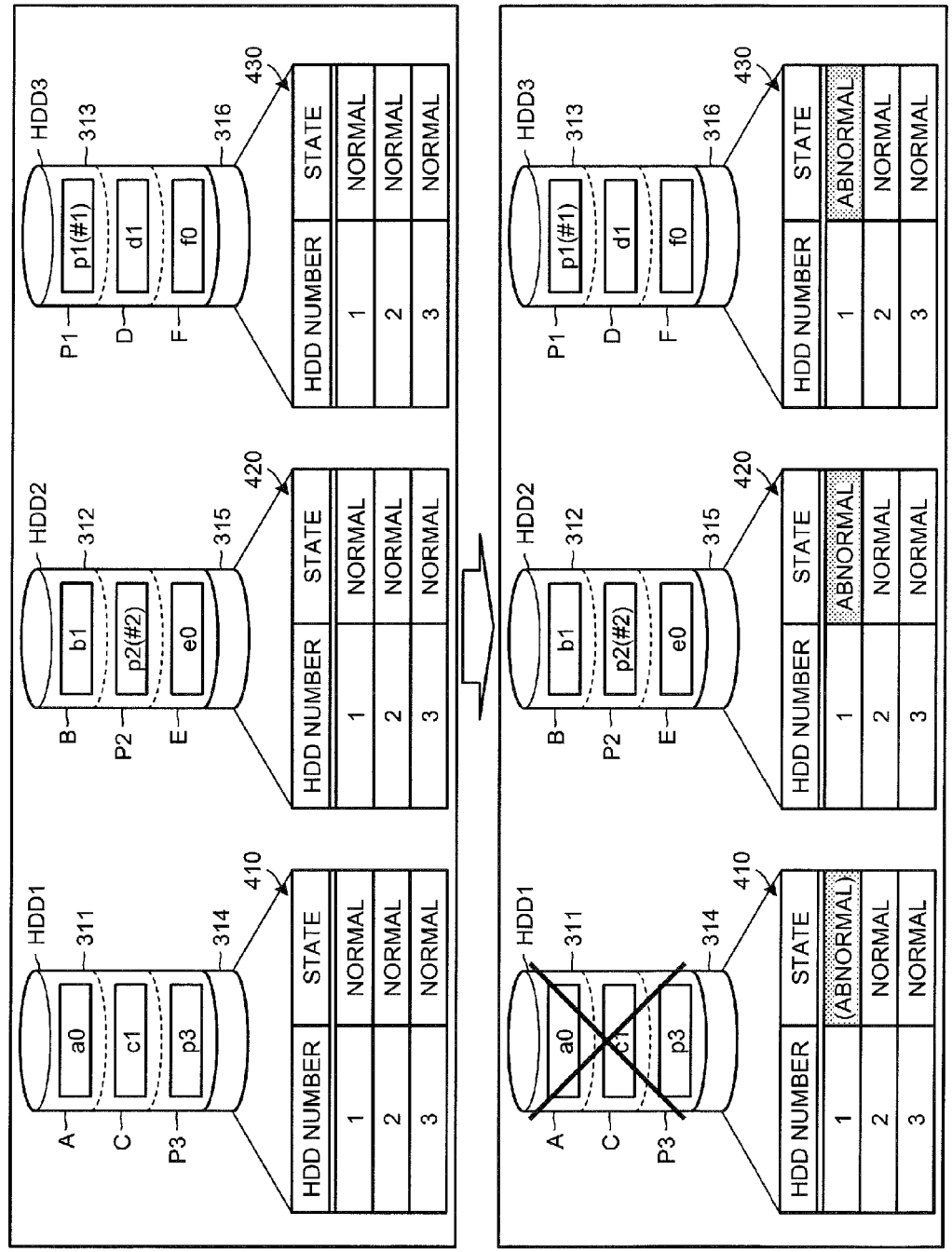
FIG. 25 is an explanatory diagram (Part II) of the example of the updating of the management data 410 to 430.

FIG. 25 is an explanatory diagram (Part II) of the example of the updating of the management data 410 to 430. In FIG. 25, the example is depicted of the updating of the management data 410 to 430 of the HDD1 to HDD3 executed when the fault occurs at the HDD1. An upper portion of FIG. 25 depicts the management data 410 to 430 maintained when the HDD1 to HDD3 are in their normal conditions and an lower portion thereof depicts the management data 410 to 430 maintained after the fault occurs at the HDD1.

For example, the state of the HDD1 of the management data 410 is already updated from "normal" to "(abnormal)". The state "(abnormal)" represents that the state of the HDD1 in the management data 410 becomes "abnormal" when the HDD controller 309 can update the management data 410. The state of the HDD1 of the management data 420 is already updated from "normal" to "abnormal". The state of the HDD1 of the management data 430 is already updated from "normal" to "abnormal".

Figure 26:
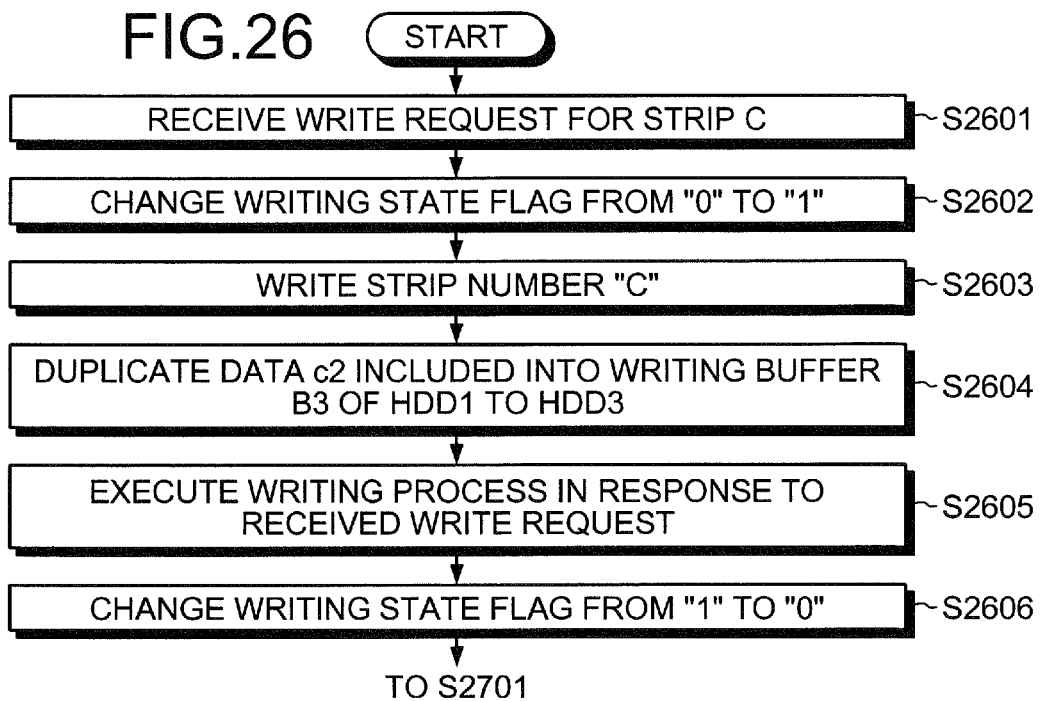
FIGS. 26 and 27 are flowcharts of an example of the storage control process procedure of the storage control apparatus 101 in the non-redundant configuration (whose HDD1 is abnormal)
Figure 27:
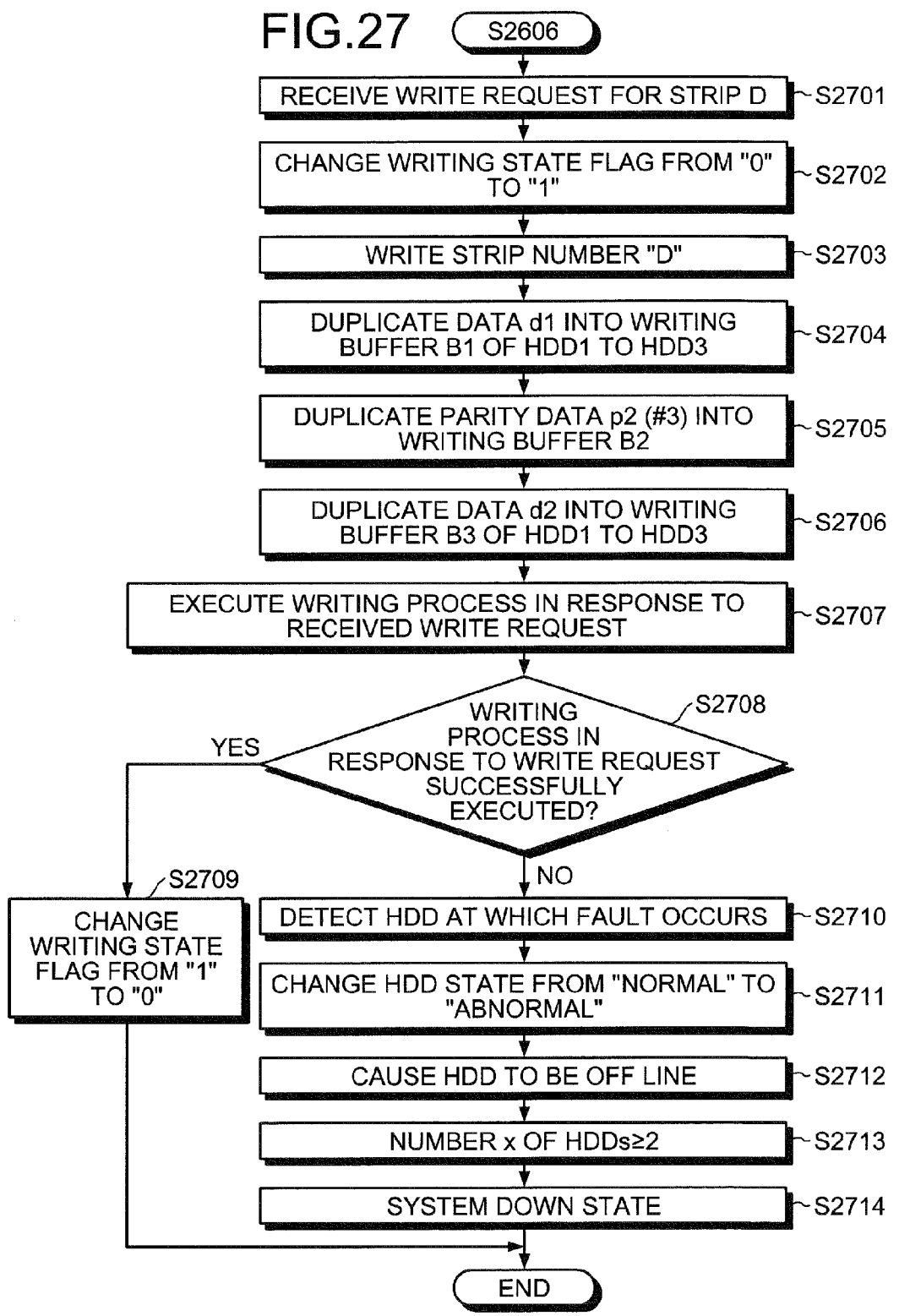

FIGS. 26 and 27 are flowcharts of an example of the storage control process procedure of the storage control apparatus 101 in the non-redundant configuration (whose HDD1 is abnormal). In the flowchart of FIG. 26, the receiving unit 501 receives a write request to update the data c1 in the strip C to data c2 (step S2601). The write request includes the strip number "C" of the strip C of the request destination and the data c2 to be written. The data c2 is deposit data for 500,000 yen.

The updating unit 502 changes the writing state flag of the writing state table 2100 from "0" to "1" (step S2602) and writes the strip number "C" included in the received write request into the strip number field of the writing state table 2100 that corresponds to the writing state flag changed to "1" (step S2603).

The duplication instructing unit 504 duplicates the data c2 included in the write request into the writing buffer B3 of each of the HDD1 to HDD3 through the HDD controller 309 (step S2604). However, when the writing buffer B3 of the HDD1 is not accessible, the duplication of the data c2 into the writing buffer B3 of the HDD1 is not executed. Thereafter, the executing unit 505 executes the writing process in response to the received write request (step S2605).

For example, the executing unit 505: reads the data d1 from the strip D through the HDD controller 309; calculates the parity data p2 (#3) by taking the exclusive OR of the data d1 and the data c2 included in the write request; and writes the calculated parity data p2 (#3) into the strip P2. The case will be assumed where the writing process is successfully executed in response to the write request.

The updating unit 502 changes the writing state flag of the writing state table 2100 from "1" to "0" (step S2606) and the procedure progresses to step S2701 depicted in FIG. 27. As a result, the parity data p2 (#3) on which the deposit data for 500,000 yen is reflected is written into the strip P2.

In the flowchart of FIG. 27, the receiving unit 501 first receives a write request to update the data d1 in the strip D to the data d2 (step S2701). The write request includes the strip number "D" of the strip D of the request destination and the data d2 to be written. The data d2 is withdrawal data for 100,000 yen.

The updating unit 502 changes the writing state flag of the writing state table 2100 from "0" to "1" (step S2702) and writes the strip number "D" included in the received write request into the strip number field of the writing state table 2100 (step S2703).

The duplication instructing unit 504 duplicates the data d1 stored in the strip D of the request destination of the write request into the writing buffer B1 of each of the HDD1 to HDD3 through the HDD controller 309 (step S2704). However, when the writing buffer B1 of the HDD1 is not accessible, the duplication of the data d1 into the writing buffer B1 of the HDD1 is not executed.

The duplication instructing unit 504 duplicates the parity data p2 (#3) recorded in the strip P2 whose generation source is the data d1 in the strip D into the writing buffer B2 of each of the HDD1 to HDD3 through the HDD controller 309 (step S2705). However, when the writing buffer B2 of the HDD1 is not accessible, the duplication of the parity data p2 (#3) into the writing buffer B2 of the HDD1 is not executed.

The duplication instructing unit 504 duplicates the data d2 included in the write request into the writing buffer B3 of each of the HDD1 to HDD3 (step S2706). Similarly to the above, when the writing buffer B3 of the HDD1 is not accessible, the duplication of the data d2 into the writing buffer B3 of the HDD1 is not executed. Thereafter, the executing unit 505 executes the writing process in response to the received write request (step S2707).

For example, the executing unit 505: restores the data c2 in the strip C by taking the exclusive OR of the parity data p2 (#3) recorded in the strip P2 and the data d1 stored in the strip D; writes the data d2 included in the write request into the strip D through the HDD controller 309; and calculates parity data p2 (#4) by taking the exclusive OR of the restored data c2 and the data d2 included in the write request and writes the calculated parity data p2 (#4) into the strip P2 through the HDD controller 309.

Returning to the description with reference to the flowchart of FIG. 27, the success and failure determining unit 506 determines whether the writing process is successfully executed in response to the write request (step S2708). If the success and failure determining unit 506 determines that the writing process is successfully executed in response to the write request (step S2708: YES), the updating unit 502 changes the writing state flag of the writing state table 2100 from "1" to "0" (step S2709) and the series of process steps according to the flowchart come to an end.

As a result, withdrawal data for 10,000 yen is recorded in the strip D. Therefore, when an inquiry on the account balance is made thereafter, the data on the account balance of 495,000 yen can be restored from the data d2 in the strip D and the parity data p2 (#3) in the strip P2, and referred to.

On the other hand, if the success and failure determining unit 506 determines that the writing process in response to the write request has failed (step S2708: NO), the detecting unit 507 detects the HDD for which the writing has failed as the HDD at which a fault occurs (step S2710) and changes the state of the HDD in which the fault occurs in the management data of the HDD that is on line from "normal" to "abnormal" through the HDD controller 309 (step S2711).

The detecting unit 507 causes the HDD in which the fault occurs at to be off line through the HDD controller 309 (step S2712). The determining unit 508 determines whether the number x of HDDs in which the faults occur is "x≥2". In the example of FIG. 27, the determining unit 508 determines that the number x of HDDs is greater than or equal to two (step S2713). The determining unit 508 notifies the CPU 301 that the number of HDDs in which the faults occur is greater than or equal to two and thereby, the storage system 2000 changes to the system down state (step S2714).

An example of updating of the management data 410 to 430 stored in the system areas 314 to 316 of the HDD1 to HDD3 will be described. The description will be made taking an example of the case where, at step S2707 depicted in FIG. 27, a fault occurs at the HDD2 and the writing of the parity data p2 (#4) into the strip P2 has failed. For example, a portion of the parity data p2 (#4) can not be written into the strip P2 of the HDD2 and therefore, the storage content of the strip P2 is parity data p2x that is different from the parity data p2 (#4). In this case, the HDD2 is detected as an HDD in which the fault occurs and is caused to be off line.

Figure 28:
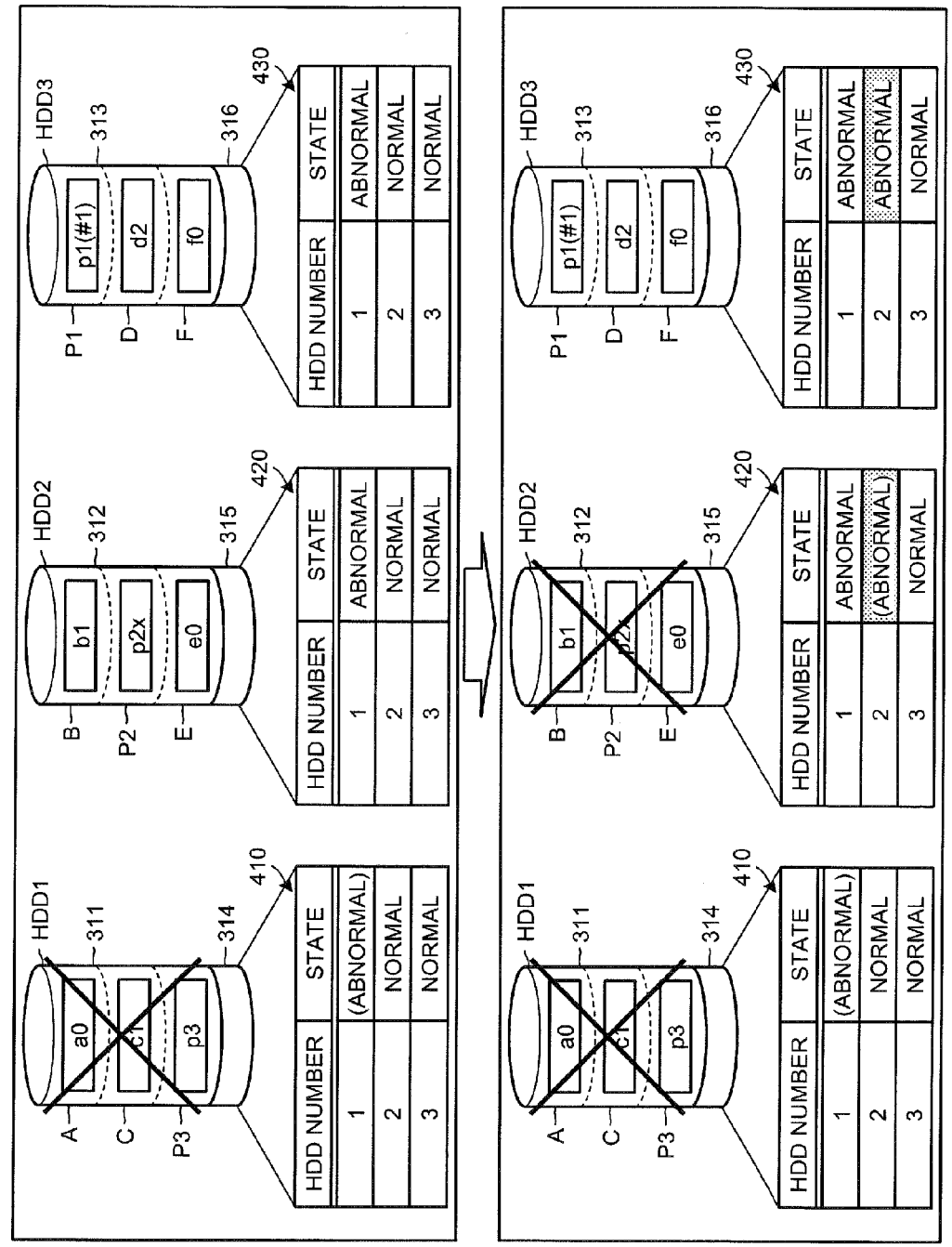
FIG. 28 is an explanatory diagram (Part III) of the example of the updating of the management data 410 to 430.

FIG. 28 is an explanatory diagram (Part III) of the example of the updating of the management data 410 to 430. FIG. 28 depicts the example of updating of the management data 410 to 430 of the HDD1 to HDD3 executed when the fault occurs at the HDD2. An upper portion of the FIG. 28 depicts the management data 410 to 430 maintained before the fault occurs at the HDD2 and a lower portion thereof depicts the management data 410 to 430 maintained after the fault occurs at the HDD2.

For example, the state of the HDD2 of the management data 420 is already updated from "normal" to "(abnormal)". The state "(abnormal)" represents that the state of the HDD2 in the management data 420 becomes "abnormal" when the HDD controller 309 can update the management data 420. The state of the HDD2 of the management data 430 is already updated from "normal" to "abnormal". On the other hand the state of the HDD2 of the management data 410 remains to be "normal" in the HDD1 that is already disconnected.

<System Restoration Process Procedure>

A system restoration process procedure of the storage control apparatus 101 will be described. The description will be made taking an example of the case where the storage system 2000 in the system down state is restored into the non-redundant configuration. A case is assumed where, as a precondition, the hardware of the storage system 2000 is reset and thereafter, the HDD2 that is caused last to be off line is caused to be on line and is re-started. In this case, the state of the HDD2 of each of the management data 420 and 430 of the HDD2 and HDD3 is changed from "abnormal" to "normal". The state of the HDD2 of the management data 410 of the HDD1 remains to be "normal".

FIG. 29 is a flowchart of an example of the system restoration process procedure of the storage control apparatus 101. In the flowchart of FIG. 29, the determining unit 508 first determines whether the HDD is re-started that is HDD2 in this case and for which the writing process is executed in response to the write request (step S2901).

The determining unit 508 waits for the HDD2 to be re-started (step S2901: NO). When the determining unit 508 determines that the HDD2 is re-started (step S2901: YES), the writing instructing unit 509 determines whether the writing state flag of the writing state table 2100 represents "1" (step S2902). If the writing instructing unit 509 determines that the writing state flag represents "0" (step S2902: NO), the series of process steps according to the flowchart come to an end.

On the other hand, if the writing instructing unit 509 determines that the writing state flag represents "1" (step S2902: YES), the writing instruction unit 509 writes the data d1 duplicated in the writing buffer B1 into the strip D of the HDD3 through the HDD controller 309 (step S2903) and writes the parity data p2 (#3) duplicated in the writing buffer B2 into the strip P2 of the re-started HDD2 through the HDD controller 309 (step S2904).

Thereafter, the writing instructing unit 509 writes the data d2 duplicated in the writing buffer B3 into the strip D through the HDD controller 309 (step S2905), and calculates the parity data p2 (#4) whose generation source is the data d2 and writes the calculated parity data p2 (#4) into the strip P2 through the HDD controller 309 (step S2906).

The success and failure determining unit 506 determines whether the data writing processes at steps S2903 to S2906 are successfully executed (step S2907). When the success and failure determining unit 506 determines that the data writing processes are successfully executed (step S2907: YES), the updating unit 502 changes the writing state flag of the writing state table 2100 to "0" (step S2908) and the series of process steps according to the flowchart come to an end.

As a result, the withdrawal data for 10,000 yen is recorded in the strip D. Therefore, when an inquiry on the account balance is made thereafter, the data on the account balance of 495,000 yen can be referred to from the data d2 in the strip D and the parity data p2 (#4) in the strip P2.

On the other hand, if the success and failure determining unit 506 determines at step S2907 that any one of the data writing processes has failed (step S2907: NO), the series of process steps according to the flowchart come to an end. In this case, the data d1, the parity data p2 (#3), and the data d2 duplicated in the writing buffers B1 to B3 can be used as the pieces of read data. For example, when a read request for the strip C is received, the data c2 in the strip C can be restored from the data d1 duplicated in the writing buffer B1 and the parity data p2 (#3) duplicated in the writing buffer B2.

According to the storage control apparatus 101 according to the second embodiment, the data and the parity data before the updating can be saved to the writing buffers B1 and B2;

the consistency of the data can be established between the HDDs by writing back the data and the parity data saved to the writing buffers B1 and B2 into the original storage area strips after the re-starting up of the HDD due to the failure in the writing; and the writing process executed in response to the write request can again be executed using the data saved to the writing buffer B3 after writing back the data and the parity data saved to the writing buffers B1 and B2 into the original storage area strips.

The storage control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The storage control apparatus described in the present embodiment can be realized by an application specific integrated circuit (ASIC) such as a standard cell or a structured ASIC, or a programmable logic device (PLD) such as a field-programmable gate array (FPGA). Specifically, for example, functional units are defined in hardware description language (HDL), which is logically synthesized and applied to the ASIC, the PLD, etc., thereby enabling manufacture of the storage control apparatus 101.

According to the storage control apparatus and the storage control method, an effect is achieved that consistency of data can be assured among the storage apparatuses.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus comprising a processor configured to:
   receive a write request for any one among storage apparatuses in a system storing for each data group, data items of the data group and correction codes generated from the data group, the data items and correction codes being stored in different storage apparatuses;
   duplicate to a specific storage area and upon receiving the write request, data stored in a storage area of the storage apparatus for which the request is received and the correction code whose generation source is the data;
   determine, after duplicating the data and the correction code into the specific storage area, whether the storage apparatus for which a writing process is executed in response to the write request has been re-started; and
   write, upon determining that the storage apparatus is re-started, the data duplicated in the specific storage area into a storage area of the storage apparatus for which the request is received and write the correction code duplicated in the specific storage area into a storage area of the storage apparatus from which the correction code is duplicated.

2. The storage control apparatus according to claim 1, the processor configured to
   determine whether the writing process is successfully executed, based on a processing result of the writing process executed in response to the write request, wherein
   upon determining that the writing process has failed and that the storage apparatus is re-started, the processor writes the data duplicated in the specific storage area into a storage area of the storage apparatus for which the request is received and writes the correction code duplicated in the specific storage area into a storage area of the storage apparatus from which the correction code is duplicated.

3. The storage control apparatus according to claim 2, wherein
   the processor further duplicates into the specific storage area, given data that is indicated in the write request to be written, and
   the processor writes the data duplicated in the specific storage area into the storage area of the storage apparatus for which the request is received, writes the correction code duplicated in the specific storage area into the storage area of the storage apparatus from which the correction code is duplicated, thereafter, writes the given data duplicated in the specific storage area into the storage area of the storage apparatus for which the request is received, and writes given correction code whose generation source is the given data, into the storage area of the storage apparatus from which the given correction code is duplicated.

4. The storage control apparatus according to claim 3, the processor configured to
   detects a storage apparatus in the system and at which a fault occurs, wherein
   the processor duplicates the given data into the specific storage area, when the storage apparatus for which the write request is received is the detected storage apparatus,
   the processor, after duplicating the given data into the specific storage area, determines whether the storage apparatus for which the writing process is executed in response to the write request is re-started, and
   the processor, upon determining that the storage apparatus is re-started, calculates a correction code whose generation source is the given data duplicated in the specific storage area and writes the calculated correction code into a storage area of the storage apparatus to which the correction code, whose generation source is the data stored in the storage area of the storage apparatus for which the request is received, is stored.

5. The storage control apparatus according to claim 4, wherein
   the processor duplicates the given data into the specific storage area, when the storage apparatus to which the correction code, whose generation source is the data stored in the specific storage area, is stored is the detected storage apparatus,
   the processor, after duplicating the given data into the specific storage area, determines whether the storage apparatus for which the writing process is executed in response to the write request is re-started, and
   the processor, upon determining that the storage apparatus is re-started, writes the given data duplicated in the specific storage area into the storage area of the storage apparatus for which the request is received.

6. The storage control apparatus according to claim 5, wherein
when detected storage apparatuses are fewer in number than storage apparatuses storing the correction code, the processor duplicates the given data into the specific storage area,
the processor, after duplicating the given data into the specific storage area, determines whether the storage apparatus for which the writing process is executed in response to the write request is re-started, and
the processor, upon determining that the storage apparatus is re-started, writes the given data duplicated in the specific storage area into the storage area of the storage apparatus for which the request is received, calculates the correction code whose generation source is the given data, and writes the calculated correction code into the storage area storing the correction code whose generation source is the data stored in the storage area of the storage apparatus for which the request is received.

7. The storage control apparatus according to claim 1, wherein
the specific storage area is a non-volatile storage area that is different from the storage area of the storage apparatus in which the data items of the data groups and the correction code generated from each of the data groups are stored.

8. The storage control apparatus according to claim 7, wherein
the specific storage area is disposed in each of the storage apparatuses in the system.

9. A storage control method executed by a computer, the storage control method comprising:
receiving a write request for any one among storage apparatuses in a system storing for each data group, data items of the data group and correction codes generated from the data group, the data items and correction codes being stored in different storage apparatuses;
duplicating to a specific storage area and upon receiving the write request, data stored in a storage area of the storage apparatus for which the request is received and the correction code whose generation source is the data;
determining, after duplicating the data and the correction code into the specific storage area, whether the storage apparatus for which a writing process is executed in response to the write request has been re-started; and
writing, upon determining that the storage apparatus is re-started, the data duplicated in the specific storage area into a storage area of the storage apparatus for which the request is received and write the correction code duplicated in the specific storage area into a storage area of the storage apparatus from which the correction code is duplicated.

10. A storage control method executed by a computer, the storage control method comprising:
receiving a write request for any one among storage apparatuses in a system storing for each data group, data items of the data group and correction codes generated from the data group, the data items and correction codes being stored in different storage apparatuses;
instructing a control unit that accesses a storage apparatus in the system, to duplicate to a specific storage area, data stored in a storage area of the storage apparatus for which the request is received and the correction code whose generation source is the data, the computer instructing the control unit upon receiving the write request;
determining, after duplication of the data and the correction code into the specific storage area, whether the storage apparatus for which a writing process is executed in response to the write request has been re-started; and
instructing upon determining that the storage apparatus is re-started, the control unit to write the data duplicated in the specific storage area into a storage area of the storage apparatus for which the request is received and to write the correction code duplicated in the specific storage area into a storage area of the storage apparatus from which the correction code is duplicated.

* * * * *